US007247384B2

(12) United States Patent
Cai et al.

(10) Patent No.: US 7,247,384 B2
(45) Date of Patent: Jul. 24, 2007

(54) MODIFICATION OF SILICON-CONTAINING SCANNING PROBE MICROSCOPY TIPS AND GROWTH OF OLIGO-OR POLY (ETHYLENE GLYCOL) FILMS ON SILICON SURFACES THROUGH FORMATION OF SI-C BONDS

(75) Inventors: Chengzhi Cai, Houston, TX (US); Chi Ming Yam, Stafford, TX (US); Zhongdang Xiao, Nanjing (CN); Jianhua Gu, Houston, TX (US)

(73) Assignee: The University of Houston, Houston, TX (US)

( * ) Notice: Subject to any disclaimer, the term of this patent is extended or adjusted under 35 U.S.C. 154(b) by 363 days.

(21) Appl. No.: 10/742,047

(22) Filed: Dec. 19, 2003

(65) Prior Publication Data

US 2004/0213910 A1    Oct. 28, 2004

Related U.S. Application Data

(60) Provisional application No. 60/434,899, filed on Dec. 20, 2002, provisional application No. 60/497,148, filed on Aug. 22, 2003.

(51) Int. Cl.
*B32B 9/04* (2006.01)
(52) U.S. Cl. ...................................... 428/446; 427/301
(58) Field of Classification Search ...................... None
See application file for complete search history.

(56) References Cited

U.S. PATENT DOCUMENTS

2002/0160139 A1* 10/2002 Huang et al. ............... 428/36.9

FOREIGN PATENT DOCUMENTS

JP           2-191211 A   *  7/1990

OTHER PUBLICATIONS

Takano, et al., "Chemical and Biochemical Analysis Using Scanning Force Microscopy," 99 Chem Rev. 2845 (1999).
Poggi, et al., "Scanning Probe Microscopy," 74 Anal. Chem 2851 (2002).
Hoh, et al., "Quantized Adhesion Detected With the Atomic Force Microscope," 114 J. Am. Chem. Soc. 4917 (1992).
Zlatanova, et al., "Single Molecule Force Spectroscopy in Biology Using the Atomic Force Micsroscope," 74 Prog. Biophys. & Mol. Biol. 37 (2000).
Willemsen, et al., "Biomolecular Interactions Measured by Atomic Force Microscopy", 79 Biophys. J. 3267 (2000).
Nakagawa, et al., "Discriminating Molecular Length of Chemically Adsorbed Moleclues . . . ," 32 Jpn. J. Appl. Phys. Part 2-Lett L294 (1993).
Noy, et al., "Chemical Force Microscopy," 27 Annu. Rev. Mater. Sci. 381 (1997).
Hugel, et al., "The Study of Molecular Interactions by AFM Force Spectroscopy," 22 Macromol. Rapid Commun. 989 (2001).
Janshoff, et al., "Force Spectroscopy of Molecular Systems—Single Molecule . . . ," 39 Angew. Chem.-Int. Edit. 3212 (2000).
Moy, et al., "Intermolecular Forces and Energies Between Ligands and Receptors," 266 Science 257 (1994).
Hinterdorfer, et al., "Detection and Localization of Individual Antibody-Antigen . . . ," 93 Proc. Natl. Acad. Sci. U.S.A. 3477 (1996).
Hinterdorfer, et al., "Surface Attachment of Ligands and Receptors . . . ," 23 Colloids & Surf. B-Biointerfaces 115 (2002).
Raab, et al., "Antibody Recognition Imaging by Force Microscopy," 17 Nat. Biotechnol. 902 (1999).
Velert-Badt, et al., "Single Molecule Recognition of Protein Binding . . . ," 82 Biophys. J., 2767 (2002).
Noy, et al., "Stretching and Breaking Duplex DNA by Chemical Force Microscopy," 4 Chem. & Biol. 519 (1997).
Clausen-Schaumann, et al., "Mechanical Stability of Single DNA Molecules," 78 Biophys. J. 1997 (2000).
Schumakovitch, et al., "Temperature Dependence of Unbinding Forces . . . ," 82 Biophys. J. 517 (2002).
Xu, et al., "Retrieval and Amplification of Single-Copy Genomic DNA from a Nanometer . . . ," 248 Biochem. & Biophys. Res. Commun. 744 (1998).
Grandbois, et al., "How Strong Is A Covalent Bond?," 283 Science 1727 (1999).
Rief, et al., "Reversible Unfolding of Individual Titin Immunoglobulin Domains by AFM," 276 Science 1109 (1997).
Oberdorfer, et al., "Conformational Analysis of Native Fibronectin . . . ," 16 Langmuir 9955 (2000).
Muller, et al., "Atomic Force Microscopy in Cell Biology," 68 Meth. Cell Bio. 257 (2002).
Fisher, et al., "Stretching Single Molecules into Novel Conformations . . .," 7 Nat. Struct. Biol. 719 (2000).
Johnson, et al., "Surface Energy and the Contact of Elastic Solids," 324 Proc. R. Soc. London A, 301 (1971).
Stevens, et al., "Computer Modeling of Atomic Force Microscopy Force Measurements: Comparisons . . . ," 15 Langmuir 207 (1999).
Lo, et al., "Specific Interactions Between Biotin and Avidin Studied by Atomic Force Microscopy . . . ," 15 Langmuir 1373 (1999).

(Continued)

*Primary Examiner*—Marc S. Zimmer
(74) *Attorney, Agent, or Firm*—Robert C. Shaddox; Winstead Sechrest & Minick P.C.

(57) ABSTRACT

The present invention provides for a practical method of grafting oligo- and/or poly(ethyleneglycol) (OEG and/or PEG) derivatives onto hydrogen-terminated silicon surfaces, including the surfaces of silicon scanning probe microscopy (SPM) tips, by hydrosilylation of OEG and/or PEG-terminated alkenes. This invention is related to the development of silicon-based bio-devices, including biochips, biosensors such as SPM probes, microarrays, micro-fluidic systems, and implantable microdevices. This invention is also a practical method to modify (many) SPM probe tips with OEG/PEG derivatives and to subsequently modify the tip apex with functional single molecules to improve the specificity and resolution of AFM imaging and measurements. The functional molecules include the dendritic adsorbates with a functional group at their focal point and with or without a tripod-shaped framework.

20 Claims, 22 Drawing Sheets

OTHER PUBLICATIONS

Sekiguchi, et al., "Non-Destructive Force Measurement in Liquid Using Atomic Force Microscope," 188 Appl. Surf. Sci. 489 (2002).
Hafner, et al., "Structural and Functional Imaging with Carbon Nanotube AFM Probes," 77 Prog. Biophys. & Mol. Biol. 73 (2001).
Snow, et al., "Atomic force Microscopy Using Single-Wall C Nanotube Probes," 20 J. Vac. Sci, Technol. 822 (2002).
Wong, et al., "Covalently-Functionalized Single-Walled Carbon Nanotube Probe Tips . . . ," 120 J. Am. Chem. Soc. 8557 (1998).
Wong, et al., "Covalently Functionalized Nanotubes as Nanometre-Sized Probes in Chemistry and Biology.," 394 Nature 52 (1998).
Vickery, et al., "Scanning Near-Field Fluorescence Resonance Energy Transfer Microscopy," 76 Biophys. J. 1812 (1999).
Vickery, et al., "Combining AFM and FRET for High Resolution Fluorescence Microscopy," 202 J. Microscpy 408 (2001).
Shubeita, et al., "Local Fluorescent Probes for the Fluorescence Resonance Energy . . . ," 80 Appl. Phys. Lett. 2625 (2002).
Grayson, et al., "Synthesis and Surface Functionalization of Aliphatic Polyether Dendrons," 122 J. Am. Chem. Soc. 10335 (2000).
Deng, et al., "An Efficient Convergent Synthesis of Novel Anisotropic Absorbates Based . . . ," 67 J. Org. Chem 5279 (2002).
Harder, et al., "Molecular Conformation in Oligo (ethylene Glycol)-terminated Self-Assembled . . . ," 102 J. Phys. Chem. B 426 (1998).
Xiao, et al., Formation of Robust Mesoscopic Ring Structures by Self-Assembly . . . , Chem. Commun. 1442 (2001).
Xiao, et al., "The first Organosiloxane Thin Films Derived from SiC13-terminated Dendrons . . . ," 18 Langmuir 7728-7739 (2002).
Mansfield, et al., "Surface Adsorption of Model Dendrimers," 37 Polymer 3835 (1996).
Yao, et al., "Facile Convergent Route to Molecular Caltrops," 64 J. Org. Chem 1968 (1999).
Rukavishnikov, et al., "A Tower-Shaped Prototypic Molecule Designed as an Atomically Sharp Tip . . . ," 40 Tetrahedron Lett. 6353 (1999).
Li, et al., "Visualization and Characterization of Poly(amidoamine) Dendrimers . . . ," 16 Langmuir 5613 (2000).
Tokuhisa, et al., "Preparation and Characterization of Dendrimer Monolayers . . . ," 120 J. Am. Chem., Soc. 4492 (1998).
Ulman, "Formation and Structure of Self-Assembled Monolayers," 96 Chem. Rev. 1533 (1996).
Linford, et al., "Alkyl Monolayers on Silicon Prepared from 1-Alkenes and Hydrogen-Terminated . . . ," 117 Am. Chem. Soc. 3145 (1995).
Kidoaki, et al., "Adhesion Forces of the Blood Plasma Proteins on Self-Assembled . . . ," 15 Langmuir 7639 (1999).
Ortega-Vinuesa, et al., "Molecular Packing of HSA, IgG, and Fibrinogen Adsorbed on Silicon by AFM Imaging," 324 Thin Solid Films 257 (1998).
Veiseh, et al., "Highly Selective Protein Patterning on Gold-Silicon Substrates for Biosensor Applications," 18 Langmuir 6671 (2002).
Marrian, et al., "Low-Voltage Electron-Beam Lithography in Self-Assembled Ultrathin . . . ," 64 Appl. Phys. Lett. 390 (1994).
Sugimura, et al., "Scanning Probe Nanofabrication of Chemically Active Areas . . . ," 15 J. Vac. Sci. Technol. B 1394 (1997).
Sugimura, et al., "Nanoscale Patterning of an Organosilane Monolayer on the Basis . . . ," 14 J. Vac. Sci. Technol. B 4140 (1996).
Sigal, et al., "A Self-Assembled Monolayer for the Binding and Study of Histidine-Tagged Proteins . . . ," 68 Anal. Chem. 490 (1996).
Dittrich, et al., "Photobleaching and Stablization of Fluorophores Used for Single-Molecule Analysis . . . ," 73 Appl. Phys. B 829 (2001).
Maher, et al., "Single Molecule Photo-Bleaching Observed by Surface Enhanced Resonant . . . ," 352 Chem. Phys. Lett 378 (2002).
Hamann, et al., "Near-Field Fluorescence Imaging by Localized Field Enhancement Near a Sharp Probe Tip," 76 Appl. Phys Lett. 1953 (2000).

Azoulay, et al., "Quenching and Enhancement of Single-Molecule Fluorescence . . . ," 51 Europhys. Lett. 374 (2000).
Yakovleva, et al., "Microfluidic Enzyme Immunoassay Using Silicon Microchip with Immobilized Antibodies . . . ," 74 Anal. Chem. 2994 (2002).
Leoni, et al., "Nanoporous Platforms for Cellular Sensing and Delivery" 2002 Sensors 2, 111 (2002).
Sharma, et al., "Ultrathin Poly(ethylene glycol) Films for Silicon-Based Microdevices," 206 Appl. Surf. Sci. 219 (2003).
Lee, et al., "Protein-Resistant Coatings for Glass and Metal Oxide Surfaces Derived . . . ," 19 Biomaterials 1669 (1998).
Papra, et al., "Characterization of Ultrathin Poly(Ethylene Glycol) Monolayers on Silicon Substrates," 17 Langmuir 1457 (2001).
Zhu, et al., "Grafting of High-Density Poly(Ethylene Glycol) Monolayers on Si(111)," 17 Langmuir 7798 (2001).
Cicero, et al., "Photoreactivity of Unsaturated Compounds with Hydrogen-Terminated Silicon (111)," 16 Langmuir 5688 (2000).
Buriak, Organometallic Chemistry on Silicon and Germanium Surfaces, 102 Chem. Revs. 1271 (2002).
Strother, et al., "Synthesis and Characterization of DNA-Modified Silicon (111) Surfaces," 122 J. Am. Chem. Soc. 1205 (2000).
Stewart, et al., "Photopatterned Hydrosilylation on Porous Silicon," 37 Angew. Chem. Int. Ed. 3257 (1998).
Stewart, et al., "Photostrukturierbare Hydrosilylierung von Porosem Silicum," 110 Angew. Chem. 3447 (1998).
Sieval, et al., "Amino-Terminated Organic Monolayers on Hydrogen-Terminated Silicon Surfaces," 17 Langmuir 7554 (2001).
Nivens, et al, "Photoactive Poly(Ethylene Glycol) Organosilane Films for Site-Specific Protein Immobilization," 18 Langmuir 499 (2002).
Boukherroub, et al., "Controlled Functionalized and Multistep Chemical Manipulation . . . ," 121 J. Am. Chem. Soc. 11513 (1999).
Sieval, et al., "An Improved Method for the Preparation of Organic Monolayers of I-Alkenes . . . ," 15 Langmuir 8288 (1999).
Yam, et al., "Modification of Silicon AFM Cantilever Tips with an Oligo (Ethylene Glycol) Derivative . . .," 125 J. Am. Chem. Soc. 7498 (2003).
Fischer, et al., "Amphiphilic Liquid-Crystalline Networks—Phase Behavior and Alignment . . . ," 16 Macromol. Rapid Commun. 435 (1995).
Prime, et al., "Adsorption of Proteins onto Surfaces Containing End-Attached Oligo (Ethylene Oxide): A Model . . . ," 115 J. Am. Chem. Soc. 10714 (1993).
Harder, et al., "Molecular Conformation in Oligo(Ethylene Glycol)-Terminated Self-Assembled . . . ," 102 J. Phys. Chem. B 426 (1998).
Snyder, et al., "Temperature and Phase Behavior of Infrared Intensities: The Poly(methylene) Chain," 90 J. Phys. Chem. 5623 ( 1986).
Vanderah, et al., "Self-Assembled Monolayers of Methyl 1-Thiahexa (ethylene oxide) . . . ," 18 Langmuir 4674 (2002).
Sieval, et al., "Molecular Modeling of Covalently Attached Alkyl Monolayers on the Hydrogen-Terminated . . . ," 17 Langmuir 2172 (2001).
Zhu, et al., "Chain-Length Dependence of the Protein and Cell Resistance of Oligo(Ethylene . . . ," 56 J. Biomed. Mater. Res. 406 (2001).
Campbell, et al., "Low-Frequency Raman-Active Models in a-Methyl, w-Hydroxyoligo (Oxyethylene)s," 95 J. Phys. Chem. 4647 (1991).
Selve, et al., "Monodisperse Perfluoro-Polyethoxylated Amphiphilic Compounds . . . ," 47 Tetrahedron 411 (1991).
Hines, "The Picture Tells the Story: Using Surface Morphology to Probe Chemical Etching Reactions," 20 Int. Revs. Phys. Chem. 645 (2001).
Wade, et al., "Etch-Pit Initiation by Dissolved Oxygen on Terraces of H-Si (111)," 71 Appl. Phys. Lett. 1679 (1997).

* cited by examiner

METHOD 1

METHOD 2

4

R = -Si(OET)$_3$, -NH$_2$,
-OCH$_2$CONHCH$_2$CH$_2$NH$_2$

R$^1$, R$^2$, R$^3$, R$^4$, R$^5$, R$^6$ = PEG,
PEG-SH, PEG-biotin, PEG-NTA,
DNA, dye, PEG-N$_3$, PEG-COOMe,
PEG-NHBoc, or H

1a n - 33                      1b n - 0

↓ SMAT-CONHS              ↓

SMAT-CONH-PEG-Biotin      SMAT-CONH-$CH_2$-$CH_2$-Biotin

E

F

G

H

AFM CANTILEVER (SIDE VIEW)
AFM TIP
TIP APEX
OEG LAYER

AFM CANTILEVER (TOP VIEW)

STEP 1:
SELECTIVE REMOVAL OF OEG LAYER AT TIP APEX

A

STEP 2:
EVALUATION BY FORCE MEASUREMENT

B

STEP 1:
GROWTH OF DIFFERENT
TYPES (B, C, D) OF SAMs
ON THE CHIP $EG_n$: $CH_2=CH(CH_2)_9(OCH_2CH_2)_nOCH_3$
n = 3, 6, 9

MODIFICATION OF SILICON-CONTAINING SCANNING PROBE MICROSCOPY TIPS AND GROWTH OF OLIGO-OR POLY (ETHYLENE GLYCOL) FILMS ON SILICON SURFACES THROUGH FORMATION OF SI-C BONDS

CROSS REFERENCE TO RELATED APPLICATIONS

The present application claims priority to the following U.S. Provisional Applications: Ser. No. 60/434,899, filed Dec. 20, 2002, and Ser. No. 60/497,148 filed Aug. 22, 2003.

This invention was made in part with government support under CTS-0210840 awarded by the National Science Foundation (NSF). This invention was also made with support in part from The Welch Foundation under E-1498 and the Texas Higher Education Coordinating Board—ARP.

FIELD OF THE INVENTION

This invention relates to the field of Scanning Probe Microscopy. This invention particularly relates to the modification of Atomic Force Microscopy (AFM) probe tips. Method and apparatus of the present invention are useful for creating a multi-functional AFM probe tip for single molecular studies by anchoring of a few or even one functional molecule to an AFM probe tip. This invention also generally relates to the fields of nanotechnology and molecular biology. This invention particularly relates to modification of silicon-based surfaces with organic coatings. Such surfaces are found in, but not limited to, bio-devices.

BACKGROUND

Scanning Probe Microscope Tips

Sophisticated protein molecules are like people in that the behaviors of individuals of the same population are different. While studying these molecules with traditional methods such as X-ray diffraction resembles the "social science of molecules," providing a statistically averaged property of an ensemble of molecules at static states, the heterogeneity, dynamics, and distribution of the properties among individual molecules is masked. Recent advances in single molecule methods has allowed study of the structure-function relationship of individual molecules, and exploration of heterogeneity among different molecules within a population, as well as observation of action of individual molecules in real time. The research in this new field, "single molecule biochemistry," promises to provide fundamentally new information of biological processes for a better understanding of cellular function. The progress in this field has heavily relied on the development of tools for detection and manipulation of single molecules.

AFM has become a powerful tool for biological research at nanoscale [Binnig, G., Quate, C. F. & Gerber, C. Atomic force microscope. *Phys. Rev. Lett.* 56, 930 (1986); Science Citation Index. Search keyword: AFM or atomic force microscopy]. AFM uses a cantilever spring with a sharp tip to sense the repulsive and attractive forces between the tip and a sample surface. Commercial AFM can measure the forces as low as 10 piconewtons needed to rapidly rupture a single hydrogen bond [Takano, H., Kenseth, J. R., Wong, S. S., O'Brien, J. C. & Porter, M. D. Chemical and biochemical analysis using scanning force microscopy. *Chem. Rev.* 99, 2845 (1999); Poggi, M. A., Bottomley, L. A. & Lillehei, P. T. Scanning probe microscopy. *Anal. Chem.* 74, 2851 (2002); Hoh, J. H., Cleveland, J. P., Prater, C. B., Revel, J. P. & Hansma, P. K. Quantized adhesion detected with the atomic force microscope. *J. Am. Chem. Soc.* 114, 4917 (1992); Zlatanova, J., Lindsay, S. M. & Leuba, S. H. Single molecule force spectroscopy in biology using the atomic force microscope. *Prog. Biophys. Mol. Biol.* 74, 37 (2000)]. While scanning over the surface, the data of tip-sample interaction provides images of the surface with a high spatial resolution. Both the high force and spatial resolutions render AFM feasible to probe non-covalent inter- and intramolecular interactions at molecular level. To this end, the surface of AFM tips, mostly made of silicon or silicon nitride, have been chemically or biochemically modified for probing specific interactions between the molecules attached to the tip and their partners immobilized on surfaces [Willemsen, O. H., Snel, M. M. E., Cambi, A., Greve, J., De Grooth, B. G. & Figdor, C. G. Biomolecular interactions measured by atomic force microscopy. *Biophys. J.* 79, 3267 (2000); Tamayo, J., Humphris, A. D. L., Owen, R. J. & Miles, M. J. High-Q dynamic force microscopy in liquid and its application to living cells. *Biophys. J.* 81, 526 (2001); Wang, T., Arakawa, H. & Ikai, A. Force measurement and inhibitor binding assay of monomer and engineered dimer of bovine carbonic anhydrase B. *Biochem. Biophys. Res. Commun.* 285, 9 (2001); Nakagawa, T., Ogawa, K., Kurumizawa, T. & Ozaki, S. Discriminating Molecular Length of Chemically Adsorbed Molecules Using an Atomic Force Microscope Having a Tip Covered with Sensor Molecules (an Atomic Force Microscope Having Chemical Sensing Function). *Jpn. J. Appl. Phys. Part 2*—Lett. 32, L294 (1993); Frisbie, C. D., Rozsnyai, L. F., Noy, A., Wrighton, M. S. & Lieber, C. M. Functional-Group Imaging by Chemical Force Microscopy. *Science* 265, 2071 (1994); Noy, A., Vezenov, D. V. & Lieber, C. M. Chemical force microscopy. *Annu. Rev. Mater. Sci.* 27, 381 (1997); Hugel, T. & Seitz, M. The study of molecular interactions by AFM force spectroscopy. *Macromol. Rapid Commun.* 22, 989 (2001); Janshoff, A., Neitzert, M., Oberdorfer, Y. & Fuchs, H. Force spectroscopy of molecular systems—Single molecule spectroscopy of polymers and biomolecules. *Angew. Chem.-Int. Edit.* 39, 3213 (2000); Tromas, C. & Garcia, R. in *Host-Guest Chemistry* 115 (2002)], such as biotin-streptavidin/aviding [Schonherr, H., Beulen, M. W. J., Bugler, J., Huskens, J., van Veggel, F., Reinhoudt, D. N. & Vancso, G. J. Individual supramolecular host-guest interactions studied by dynamic single molecule force spectroscopy. *J. Am. Chem. Soc.* 122, 4963 (2000); Lee, G. U., Kidwell, D. A. & Colton, R. J. Sensing Discrete Streptavidin Biotin Interactions with Atomic-Force Microscopy. *Langmuir* 10, 354 (1994)], antigen-antibody [Moy, V. T., Florin, E. L. & Gaub, H. E. Intermolecular Forces and Energies between Ligands and Receptors. *Science* 266, 257 (1994); Hinterdorfer, P., Baumgartner, W., Gruber, H. J., Schilcher, K. & Schindler, H. Detection and localization of individual antibody-antigen recognition events by atomic force microscopy. *Proc. Natl. Acad. Sci. U.S.A.* 93, 3477 (1996); Hinterdorfer, P., Gruber, H. J., Kienberger, F., Kada, G., Riener, C., Borken, C. & Schindler, H. Surface attachment of ligands and receptors for molecular recognition force microscopy. *Colloid Surf. B-Biointerfaces* 23, 115 (2002)], and complementary strands of DNA [Raab, A., Han, W. H., Badt, D., Smith-Gill, S. J., Lindsay, S. M., Schindler, H. & Hinterdorfer, P. Antibody recognition imaging by force microscopy. *Nat. Biotechnol.* 17, 902 (1999); Wielert-Badt, S., Hinterdorfer, P., Gruber, H. J., Lin, J. T., Badt, D., Wimmer, B., Schindler, H. & Kinne, R. K. H. Single molecule recognition of protein binding epitopes in brush border membranes by force microscopy. *Biophys. J.* 82, 2767 (2002); Lee, G. U., Chrisey, L. A. & Colton, R. J. Direct Measurement of the Forces between Complementary Strands of DNA. *Science* 266, 771 (1994); Boland, T. & Ratner, B. D. Direct Measurement of Hydrogen-Bonding in DNA Nucleotide Bases by Atomic-Force Microscopy. *Proc. Natl. Acad. Sci. U.S.A.* 92, 5297 (1995); Noy, A., Vezenov, D. V., Kayyem, J. F., Meade, T. J. & Lieber, C. M. Stretching and breaking duplex DNA by chemical force microscopy. *Chem. Biol.* 4, 519 (1997); Clausen-Schaumann, H., Rief, M. & Gaub, H. E. Sequence dependent mechanics of single DNA molecules. *Biophys. J.* 76, A151 (1999)]. Chemically modified AFM tips have also been used to harvest strands of genomic DNA at a specific region of a chromosome, and the DNA amplified by PCR [Clausen-Schaumann, H., Rief, M., Tolksdorf, C. & Gaub, H. E. Mechanical stability of single DNA molecules. *Biophys. J.* 78, 1997 (2000); Schumakovitch, I., Grange, W., Strunz, T., Bertoncini, P., Guntherodt, H. J. & Hegner, M. Temperature dependence of unbinding forces between complementary DNA strands. *Biophys. J.* 82, 517 (2002)]. By tethering a polymer strand both to an AFM tip and a solid surface, the polymer can be pulled by the AFM while the force-extension curves are recorded, which provide insight into the structural and mechanical properties of the molecule, including rupture force of a single covalent bond [Xu, X. M. & Ikai, A. Retrieval and amplification of single-copy genomic DNA from a nanometer region of chromosomes: A new and potential application of atomic force microscopy in genomic research. *Biochem. Biophys. Res. Commun.* 248, 744 (1998)], and the intramolecular forces associated with protein folding [Hoh, J. H., Cleveland, J. P., Prater, C. B., Revel, J. P. & Hansma, P. K. Quantized adhesion detected with the atomic force microscope. *J. Am. Chem. Soc.* 114, 4917 (1992); Grandbois, M., Beyer, M., Rief, M., Clausen-Schaumann, H. & Gaub, H. E. How strong is a covalent bond? *Science* 283, 1727 (1999); Rief, M., Gautel, M., Oesterhelt, F., Fernandez, J. M. & Gaub, H. E. Reversible unfolding of individual titin immunoglobulin domains by AFM. *Science* 276, 1109 (1997)] and elasticity and conformational transitions in such as polysacchharides [Oberdorfer, Y., Fuchs, H. & Janshoff, A. Conformational analysis of native fibronectin by means of force spectroscopy. *Langmuir* 16, 9955 (2000); Muller, D. J. & Engel, A. in *Atomic Force Microscopy in Cell Biology* 257 (2002)] and DNA [Noy, A., Vezenov, D. V., Kayyem, J. F., Meade, T. J. & Lieber, C. M. Stretching and breaking duplex DNA by chemical force microscopy. *Chem. Biol.* 4, 519 (1997); Clausen-Schaumann, H., Rief, M. & Gaub, H. E. Sequence dependent mechanics of single DNA molecules. *Biophys. J.* 76, A151 (1999); Li, H. B., Rief, M., Oesterhelt, F., Gaub, H. E., Zhang, X. & Shen, J. C. Single-molecule force spectroscopy on polysaccharides by AFM—nanomechanical fingerprint of alpha-(1,4)-linked polysaccharides. *Chem. Phys. Lett.* 305, 197 (1999); Marszalek, P. E., Li, H. B., Oberhauser, A. F. & Fernandez, J. M. Chair-boat transitions in single polysaccharide molecules observed with force-ramp AFM. *Proc. Natl. Acad. Sci. U.S.A.* 99, 4278 (2002); Fisher, T. E., Marszalek, P. E. & Fernandez, J. M. Stretching single molecules into novel conformations using the atomic force microscope. *Nat. Struct. Biol.* 7, 719 (2000); Bustamante, C., Macosko, J. C. & Wuite, G. J. L. Grabbing the cat by the tail: Manipulating molecules one by one. *Nat. Rev. Mol. Cell Biol.* 1, 130 (2000)].

Most of the chemically and biochemically modified AFM tips were derived from a layer of small molecules either on a gold-coated or directly on a Si/Si$_3$N$_4$ tip. When these tips are in contact with a sample surface, multiple to more than tens of molecules on the tip can participate semi-simultaneously in the binding or unbinding events. With such systems, the mean value of single-molecule interaction force can be derived by statistical treatment of data obtained from many repeated measurements of the pull-off force [Takano, H., Kenseth, J. R., Wong, S. S., O'Brien, J. C. & Porter, M. D. Chemical and biochemical analysis using scanning force microscopy. *Chem. Rev.* 99, 2845 (1999); Poggi, M. A., Bottomley, L. A. & Lillehei, P. T. Scanning probe microscopy. *Anal. Chem.* 74, 2851 (2002); Williams, M. C. & Rouzina, I. Force spectroscopy of single DNA and RNA molecules. *Curr. Opin. Struct. Biol.* 12, 330 (2002); Johnson, K. L., Kendall, K. & Roberts, A. D. *Proc. R. Soc. London, Ser. A* 324, 301 (1971); Stevens, F., Lo, Y. S., Harris, J. M. & Beebe, T. P. Computer modeling of atomic force microscopy force measurements: Comparisons of Poisson, histogram, and continuum methods. *Langmuir* 15, 207 (1999)]. However, this value is an average over an ensemble of multiple interaction sites. The ultimate goal of AFM is to address individual molecule at a specific site, especially if the molecule has multiple binding sites [Zlatanova, J., Lindsay, S. M. & Leuba, S. H. Single molecule force spectroscopy in biology using the atomic force microscope. *Prog. Biophys. Mol. Biol.* 74, 37 (2000)].

Most measurements of intra-molecular forces of single molecules including proteins and polysaccharides start with "fishing" a molecule with a "sticky" AFM tip [Hoh, J. H., Cleveland, J. P., Prater, C. B., Revel, J. P. & Hansma, P. K. Quantized adhesion detected with the atomic force microscope. *J. Am. Chem. Soc.* 114, 4917 (1992); Noy, A., Vezenov, D. V. & Lieber, C. M. Chemical force microscopy. *Annu. Rev. Mater. Sci.* 27, 381 (1997); Hugel, T. & Seitz, M. The study of molecular interactions by AFM force spectroscopy. *Macromol. Rapid Commun.* 22, 989 (2001); Li, H. B., Rief, M., Oesterhelt, F., Gaub, H. E., Zhang, X. & Shen, J. C. Single-molecule force spectroscopy on polysaccharides by AFM—nanomechanical fingerprint of alpha-(1,4)-linked polysaccharides. *Chem. Phys. Lett.* 305, 197 (1999); Marszalek, P. E., Li, H. B., Oberhauser, A. F. & Fernandez, J. M. Chair-boat transitions in single polysaccharide molecules observed with force-ramp AFM. *Proc. Natl. Acad. Sci. U.S.A.* 99, 4278 (2002); Fisher, T. E., Marszalek, P. E. & Fernandez, J. M. Stretching single molecules into novel conformations using the atomic force microscope. *Nat. Struct. Biol.* 7, 719 (2000)]. (Reference FIG. 9 for "fishing.") The molecules are immobilized on a solid surface, and the tip is brought in contact with the molecules to establish a strong binding before the tip retracts away from the surface. The probability of "fishing" one or more molecules depends on the density of the molecules on the surface and the nature of the interaction including binding strength and number of binding sites on the tip and the molecule. Also, multiple bindings can occur randomly if the molecule possesses multiple binding sites. To minimize the attachment of multiple molecules, the so-called "fly-fishing mode" [Lo, Y. S., Huefner, N. D., Chan, W. S., Stevens, F., Harris, J. M. & Beebe, T. P. Specific interactions between biotin and avidin studied by atomic force microscopy using the Poisson statistical analysis method. *Langmuir* 15, 1373 (1999); Rief, M., Oesterhelt, F., Heymann, B. & Gaub, H. E. Single molecule force spectroscopy on polysaccharides by atomic force microscopy. *Science* 275, 1295 (1997)] has been used, in which the tip approaches the surface step by step, retracting partly after each approach until a binding event is observed in the force-extension curve upon pulling back.

The presence of only one molecule between the tip and the surface is indicated by the characteristic conformational transitions of the molecule.

Few Single Molecule AFM Tips (SMAT) designed for studying intermolecular interactions have been reported. Hinterdorfer et al were the first to demonstrate the preparation of SMATs containing a polyethylene glycol (PEG) linker tethering with a polyclonal anti-HAS antibody molecule for interacting with an immobilized HSA antigen molecule [Moy, V. T., Florin, E. L. & Gaub, H. E. Intermolecular Forces and Energies between Ligands and Receptors. *Science* 266, 257 (1994)]. They measured the unbind force of the single antibody-antigen pair, and discovered that both binding sites of the antibody could bind simultaneously and independently with the same probability. In addition, they demonstrated the mapping of binding probability over the surface of the antigen molecule with a lateral resolution of 1.5 nm. Notably, the antibody molecules in the SMATs did not deteriorate after measuring thousands of force-extension curves and storage in buffer for more than two months [Moy, V. T., Florin, E. L. & Gaub, H. E. Intermolecular Forces and Energies between Ligands and Receptors. *Science* 266, 257 (1994)]. These SMATs were prepared by solution deposition of the PEG linker molecues to the tip using a condition leading to a surface density of about one molecule per 50 $nm^2$ (about the area of an AFM tip apex). However, the precise number and location of the molecules at a given tip apex cannot be controlled by this method. The PEG molecules were flexible and long (8 nm) for overcoming misorientation, steric hindrance, and conformational changes for efficient antibody-antigen binding [Moy, V. T., Florin, E. L. & Gaub, H. E. Intermolecular Forces and Energies between Ligands and Receptors. *Science* 266, 257 (1994)]. The antibody at various locations at the tip apex may reach the antigen. However, the advantage of long and flexible PEG linker is limited for molecules anchored slightly away from the tip apex. In addition, the non-specific interactions between the bulk tip and the sample varies with the different locations of the molecules. Therefore, the reproducibility of the results obtained with different "SMATs" prepared by the above method is questionable.

Recently, Lieber and co-workers demonstrated the fabrication of SMATs on carbon nanotube modified tips [Sekiguchi, H., Arakawa, H., Okajima, T. & Ikai, A. Non-destructive force measurement in liquid using atomic force microscope. *Appl. Surf. Sci.* 188, 489 (2002); Dai, H. J., Hafner, J. H., Rinzler, A. G., Colbert, D. T. & Smalley, R. E. Nanotubes as nanoprobes in scanning probe microscopy. *Nature* 384, 147 (1996); Hafner, J. H., Cheung, C. L. & Lieber, C. M. Direct growth of single-walled carbon nanotube scanning probe microscopy tips. *J. Am. Chem. Soc.* 121, 9750 (1999); Hafner, J. H., Cheung, C. L. & Lieber, C. M. Growth of nanotubes for probe microscopy tips. Nature 398, 761 (1999)]. Single wall carbon nanotubes (SWNTs) have a small diameter (0.7–5 nm), and are the stiffest material, rendering SWNT-modified AFM tips ideal for high resolution imaging [Hafner, J. H., Cheung, C. L. & Lieber, C. M. Growth of nanotubes for probe microscopy tips. *Nature* 398, 761 (1999); Hafner, J. H., Cheung, C. L., Woolley, A. T. & Lieber, C. M. Structural and functional imaging with carbon nanotube AFM probes. *Prog. Biophys. Mol. Biol.* 77, 73 (2001)]. Carboxylic acids groups were generated by electrochemical etching at the tip terminal [Schnitzler, G. R., Cheung, C. L., Hafner, J. H., Saurin, A. J., Kingston, R. E. & Lieber, C. M. Direct imaging of human SWI/SNF-remodeled mono- and polynucleosomes by atomic force microscopy employing carbon nanotube tips. *Mol. Cell.* *Biol.* 21, 8504 (2001); Snow, E. S., Campbell, P. M. & Novak, J. P. Atomic force microscopy using single-wall C nanotube probes. *J. Vac. Sci. Technol. B* 20, 822 (2002); Wong, S. S., Woolley, A. T., Joselevich, E., Cheung, C. L. & Lieber, C. M. Covalently-functionalized single-walled carbon nanotube probe tips for chemical force microscopy. *J. Am. Chem. Soc.* 120, 8557 (1998); Hiura, H., Ebbesen, T. W. & Tanigaki, K. Opening and Purification of Carbon Nanotubes in High Yields. *Adv. Mater.* 7, 275 (1995)] and were used to attach biotin molecules [Hiura, H., Ebbesen, T. W. & Tanigaki, K. Opening and Purification of Carbon Nanotubes in High Yields. *Adv. Mater.* 7, 275 (1995)]. It is significant that the COOH groups thus generated are confined to the small tip end that is away from the bulk tip surface. However, the number of these groups varies with individual tips, and they may bond more than one biotin molecule, although single molecule tips can be identified by measurement of the unbinding force of the biotin-streptavidin complexes [Wong, S. S., Joselevich, E., Woolley, A. T., Cheung, C. L. & Lieber, C. M. Covalently functionalized nanotubes as nanometre-sized probes in chemistry and biology. *Nature* 394, 52 (1998); Sinnott, S. B. Chemical functionalization of carbon nanotubes. *J. Nanosci. Nanotechnol.* 2, 113 (2002)]. In addition, there exist non-specific interactions between the hydrophobic surface of carbon nanotubes and biomolecules, e.g. proteins, in many biological systems. Furthermore, nanotube tips are still relatively difficult to prepare, requiring chemical vapor deposition and transmission electron microscopy facilities [Dai, H. J., Hafner, J. H., Rinzler, A. G., Colbert, D. T. & Smalley, R. E. Nanotubes as nanoprobes in scanning probe microscopy. *Nature* 384, 147 (1996); Hafner, J. H., Cheung, C. L. & Lieber, C. M. Growth of nanotubes for probe microscopy tips. *Nature* 398, 761 (1999); Cheung, C. L., Hafner, J. H. & Lieber, C. M. Carbon nanotube atomic force microscopy tips: Direct growth by chemical vapor deposition and application to high-resolution imaging. Proc. Natl. Acad. Sci. U.S.A. 97, 3809 (2000); Wong, S. S., Joselevich, E., Woolley, A. T., Cheung, C. L. & Lieber, C. M. Covalently functionalized nanotubes as nanometre-sized probes in chemistry and biology. *Nature* 394, 52 (1998); Sinnott, S. B. Chemical functionalization of carbon nanotubes. *J. Nanosci. Nanotechnol.* 2, 113 (2002)], and so far only a few research groups have access to these tips. Therefore, it is necessary to develop more practical and economical methods for preparation of SMATs complementing the unique capabilities of nanotube tips, such as high resolution in imaging and control of tip orientation, for applications of AFM in a wide range of problems.

Silicon Surface Modification

Modification of silicon surfaces with a stable, uniform and ultrathin layer of biocompatible materials is of tremendous interest for the development of silicon-based biodevices, including biochips, biosensors, microarrays, microfluidic systems, and implantable microdevices [J. Yakovleva, R. Davidsson, A. Lobanova, M. Bengtsson, S. Eremin, T. Laurell, J. Emneux, *Anal. Chem.* 2002,74, 2994; L. Leoni, D. Attiah, T. A. Desai, *Sensors,* 2002, 2, 111; S. Sharma, R. W. Johnson, T. A. Desai, *Appl. Surf Sci.* 2003, 206, 218]. Grafting oligo- or poly(ethylene glycol)s (OEGs or PEGs)—the well-known biocompatible materials—onto silicon oxide surfaces has been mostly based on siloxane chemistry using trichloro- or trialkoxylsilane derivatives [L. Leoni, D. Attiah, T. A. Desai, *Sensors,* 2002, 2, 111; S. Sharma, R. W. Johnson, T. A. Desai, *Appl. Surf Sci.* 2003, 206, 218; S.-W. Lee, P. E. Laibinis, *Biomaterials* 1998, 19, 1669; A. Papra, N. Gadegaard, N. B. Larsen, *Langmuir*

2001, 17, 1457]. Unfortunately, these reagents easily polymerize to form large aggregates and multilayers on the surfaces, and this is problematic particularly for coating on miniature devices. One way to circumvent this problem is to graft OH-terminated PEG onto Cl—Si surfaces prepared by chlorination of hydrogen-terminated silicon surfaces [X.-Y. Zhu, D. R. Staarup, R. C. Major, S. Danielson, V. Boiadjiev, W. L. Gladfelter, B. C. Bunker, A. Guo, *Langmuir* 2001, 17, 7798]. The above methods involve the formation of Si—O bonds with the surfaces. A more practical approach was envisioned based on hydrosilylation [M. R. Linford, P. Fenter, P. M. Eisenberger, C. E. D. Chidsey, *J. Am. Chem. Soc.* 1995, 117, 3145; R. L. Cicero, M. R. Linford, C. E. D. Chidsey, *Langmuir* 2000, 16, 5688; J. M. Buriak, *Chem. Revs.* 2002, 102, 1271; T. Strother, W. Cai, X. Zhao, R. J. Hamers, L. M. Smith, *J. Am. Chem. Soc.* 2000, 122, 1205; M. P. Steward, J. M. Buriak, *Angew. Chem. Int. Ed.* 1998, 37, 3257; *Angew. Chem.* 1998, 110, 3447; A. B. Sieval, R. Linke, G. Heij, G. Meijer, H. Zuilhof, E. J. R. Sudhölter, *Langmuir* 2001, 17, 7554; D. A. Nivens, D. W. Conrad, *Langmuir* 2002, 18, 499; R. Boukherroub, D. D. M. Wayner, *J. Am. Chem. Soc.* 1999, 121, 11513; A. B. Sieval, V. Vleeming, H. Zuilhof, E. J. R. Sudhölter, *Langmuir* 1999, 15, 8288] of α-OEG-ω-alkenes directly onto H-terminated silicon surfaces, forming Si—C bonds that are more stable towards hydrolysis than Si—O bonds. Also, the reaction can be induced by light, allowing for photopatterning the surface [M. P. Steward, J. M. Buriak, *Angew. Chem. Int. Ed.* 1998, 37, 3257; *Angew. Chem.* 1998, 110, 3447]. This very useful approach has not been reported, although hydrosilylation is widely used to prepare alkyl monolayers presenting a variety of surface functional groups including esters and amides [J. M. Buriak, *Chem. Revs.* 2002, 102, 1271]. An uncertainty was the presence of multiple ethylene glycol units that might interfere with the reaction and trap trace amount of water that facilitates the oxidation of the H—Si surface. While the initial interest of this approach was to modify silicon atomic force microscopic (AFM) tips [C. M. Yam, Z. Xiao, J. Gu, S. Boutet, C. Cai, *J. Am. Chem. Soc.* 2003, 125, 7498], this approach was also explored for the growth of OEG layers on other silicon surfaces. The research resulted in the following invention that can be used in silicon-based biotechnology. The following invention as described herein details the method of growth of OEG layers by hydrosilylation of $CH_2=CH(CH_2)_{m1}(CF_2)_{m2}(OCH_2CH_2)_n$ OR where $m1>0$, $m2 \geq 0$, $n \geq 3$, and R=alkyl groups such as $CH_3$, amide, ester, thiolate, disulfide, or protected amino, hydroxy, or thiol groups, on hydrogen-terminated silicon surfaces including hydrogen-terminated flat silicon surfaces, porous silicon surfaces, and silicon nanoparticles. For example, m1=9, m2=0, n=3, 6, 7, 9, R=$CH_3$, abbreviated as $EG_3$ [S.-W. Lee, P. E. Laibinis, *Biomaterials* 1998, 19, 1669], $EG_6$ [C. P. Fischer, C. Schmidt, H. Finkelmann, *Macromol. Rapid Commun.* 1995, 16, 435], and $EG_9$ on atomically flat H—Si (111) surfaces (see FIG. 18).

SUMMARY

Scanning Probe Microscope Tips

The rapidly growing fields of nanoscience and technology, single molecule studies, and biological research in academia and industries have accelerated the growth of the SPM and probe tip markets, and has called for the development of advanced technology for production of high performance tips. This invention targets a novel way of improving AFM tip resolution and/or the specificity of the tip-sample interaction by modifying silicon-containing AFM probe tips with suitable organic molecules. Three levels of modification comprise this invention.

First level of modification—this invention provides a practical method for parallel modification of a large number of silicon-containing SPM tips with a robust, ultra-thin layer of suitable organic molecules, such as oligoethylene glycol (OEG), without substantially enlarging the tip size. The radii of the apex of these tips remain in the normal range of 5–25 nm upon modification. In a specific example, OEG-modified tips effectively resist adsorption of proteins during imaging, and hence both the contrast and imaging resolution are improved with these tips for biological samples. The modification procedure can be completed in less than an hour, and the materials and equipment cost for the modification is much lower than those for the current methods. The coating is very robust and stable producing better performance and higher durability compared to the current methods of modification. Such coated tips have the potential to replace most of the current commercial tips for biological application.

Second and third levels of modification—this invention covers a chip-based technology. The invention allows SPM users to prepare their own, highly specified tips using the chips produced in large scale by manufacturers. The preparation of single molecule tips with these chips is rapid, and the modified tips can be evaluated in situ using the same chip and thus ensure the quality of the tips. The chips contain one or many different synthesized functional molecules, encompassing surface-active groups, such as $SiX_3$ (X=Cl, OR (R=alkyl, e.g., OMe, OEt, $OCH(CH_3)_2$), and can be reused many times. Specifically, the technology allows users to pick up only one functional molecule from the chip and anchor it selectively at the apex of a SPM tip, while the rest of the tip surface is coated with a layer of suitable inert molecules. The functional molecules on the chip are specially designed to facilitate the anchoring process, and possess one or multiple different functional moieties at the defined locations of the molecule. These functional moieties have highly specific interactions with the measured sample at the level of single molecules, which can be detected by the instrument, or allow attachment of other suitable functional moieties. The specific interactions include optical interaction, e.g., Föster energy transfer between donor/acceptor dyes in the sample and acceptor/donor dyes on the tip. A method for replacing photo-bleached fluorescent dyes is also included in this invention. Included in this invention is the use of a linkage, which can be cleaved and reformed under mild physiological conditions, to connect a fluorescent dye to a surface. Specifically, the use of an acid-labile linkage, such as hydrazone linkage, for this purpose is claimed. The linkage may also contain bio-compatible moiety such as PEG to mask the dye from contacting with the sample. Working prototypes for tip modification at all three levels have been obtained.

Silicon Surface Modification

This invention provides a practical method for grafting OEG or PEG directly on hydrogen-terminated silicon surfaces. It is based on thermal- or photo-induced hydrosilylation of OEG or PEG-terminated alkenes on hydrogen-terminated silicon surfaces. It also allows for photo-patterning the silicon surfaces. Such coatings are expected to provide silicon-based devices with more biocompatibility and durability.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a detailed understanding and better appreciation of the present invention, reference should be made to the following detailed description of the invention and the preferred embodiments, taken in conjunction with the accompanying drawings.

DETAILED DESCRIPTION OF THE INVENTION

Scanning Probe Microscope Tips

Figure 1:
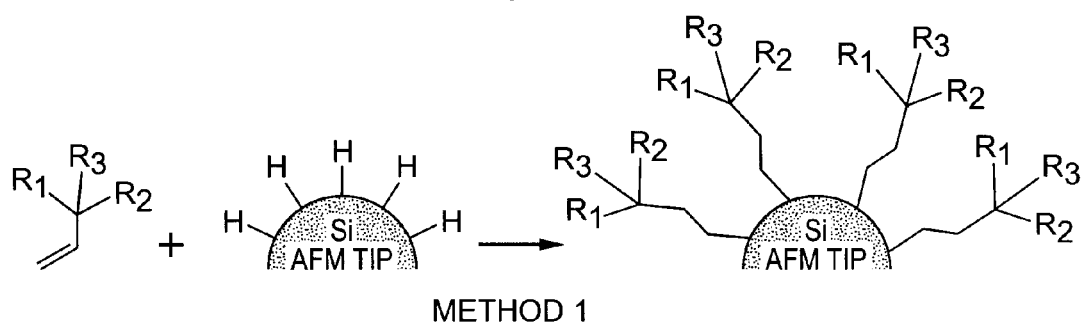
FIG. 1. Illustration of two methods for coating silicon-containing SPM tips with an ultra thin layer of suitable organic molecules. In method 1, the tip is first etching in HF or NH4F solution to remove the native oxide layer and form a hydrogen-terminated silicon surface. Suitable organic molecules containing at least one ethenyl group is chemisorbed on the surface by hydrosilylation either at elevated temperatures or under UV Method 2 is based on siloxane formation. Note that the figure is not drawn to scale.
Figure 1:
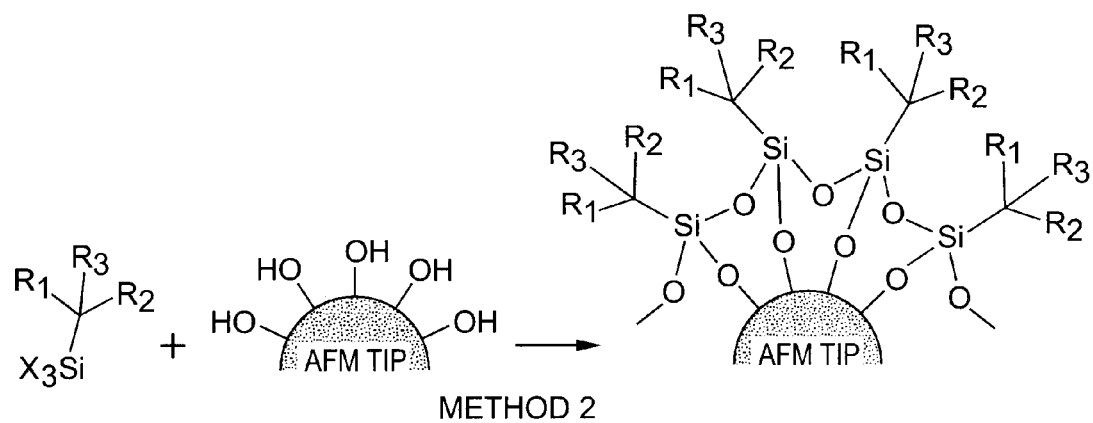

Single molecule tips with various functional groups have recently become increasingly important in probing single-pair molecular interaction in the biological and medical fields [Hiura, H., Ebbesen, T. W. & Tanigaki, K. Opening and Purification of Carbon Nanotubes in High Yields. *Adv. Mater.* 7, 275 (1995); Cheung, C. L., Hafner, J. H., Odom, T. W., Kim, K. & Lieber, C. M. Growth and fabrication with single-walled carbon nanotube probe microscopy tips. *Appl. Phys. Lett.* 76, 3136 (2000); Grunwell, J. R., Glass, J. L., Lacoste, T. D., Deniz, A. A., Chemla, D. S. & Schultz, P. G. Monitoring the conformational fluctuations of DNA hairpins using single-pair fluorescence resonance energy transfer. *J. Am. Chem. Soc.* 123, 4295 (2001); Deniz, A. A., Laurence, T. A., Beligere, G. S., Dahan, M., Martin, A. B., Chemla, D. S., Dawson, P. E., Schultz, P. G. & Weiss, S. Single-molecule protein folding: diffusion fluorescence resonance energy transfer studies of the denaturation of chymotrypsin inhibitor 2. *Proc. Natl. Acad. Sci. USA* 97, 5179 (2000); Kim, H. D., Nienhaus, G. U., Ha, T., Orr, J. W., Williamson, J. R. & Chu, S. Mg$^{2+}$-dependent conformational change of RNA studied by fluorescence correlation and FRET on immobilized single molecules. Proc. Natl. Acad. Sci. USA 99, 4284 (2002); Kuhnemuth, R. & Seidel, C. A. M. Principles of single molecule multiparameter fluorescence spectroscopy. *Single Mol.* 2, 251 (2001); Moy, V. T., Florin, E. L. & Gaub, H. E. Intermolecular Forces and Energies between Ligands and Receptors. *Science* 266, 257 (1994)]. However, the major difficulty for preparing single molecule tips is to prevent more than just one molecule from binding to an AFM tip via interaction with a vast number of active surface groups (hydroxyl) on the clean surface of commercial silicon or silicon nitride cantilevers. In addition, the surfaces of the AFM tips and the tip molecules must resist non-specific adsorption of biomolecules such as proteins to fulfill the requirement for application in biological systems. This invention encompasses a novel concept combining molecular design with a nanofabrication technique developed to overcome this problem. In addition, Applicants have addressed the requirement for application in biological systems, that is, the surfaces of the AFM tip and the tip molecule must resist non-specific adsorption of biomolecules.

Self-assembled monolayers (SAMs) of OEG-terminated thiolates on gold surfaces have been widely used as model surfaces that are known to be resistant to adsorption of proteins [Glazer, A. N. & Mathies, R. A. Energy-transfer fluorescent reagents for DNA analyses. *Anal. Biotech.* 8, 94 (1997); Garcia-Parajo, M. F., Veerman, J. A., van Noort, S. J. T., de Grooth, B. G., Greve, J. & van Hulst, N. F. Near-field optical microscopy for DNA studies at the single molecular level. *Bioimaging* 6, 43 (1998); Byassee, T. A., Chan, W. C. W. & Nie, S. Probing single molecules in single cells. *Anal. Chem.* 72, 5606 (2000); Ha, T., Enderle, T. H., Ogletree, D. F., Chemla, D. S., Selvin, P. R. & Weiss, S. Probing the interaction between two single molecules: fluorescence resonance energy transfer between a single donor and a single acceptor. *Proc. Natl. Acad. Sci. USA* 93, 6264 (1996); Hecht, B., Sick, B., Wild, U. P., Deckert, V., Zenobi, R., Martin, O. J. F. & Pohl, D. W. Scanning near-field optical microscopy with aperture probes: fundamentals and applications. *J. Chem. Phys.* 112, 7761 (2000)]. Although SAMs of OEG-terminated silanes on silicon oxide substrates were proven to be resistant to adsorption of most proteins, these surfaces attracted less attention. To our knowledge, no report has been found on the modification of silicon AFM tips with OEG-terminated siloxanes. This is probably due to the difficulty of controlling the deposition of siloxane monolayers on silicon surfaces. The conventional way for preparing OEG-coated AFM tips is based on the formation of a SAM of OEG-terminated thiolate on a gold-coated AFM tip [Ha, T., Enderle, T. H., Ogletree, D. F., Chemla, D. S., Selvin, P. R. & Weiss, S. Probing the interaction between two single molecules: fluorescence resonance energy transfer between a single donor and a single acceptor. *Proc. Natl. Acad. Sci. USA* 93, 6264 (1996); Hecht, B., Sick, B., Wild, U. P., Deckert, V., Zenobi, R., Martin, O. J. F. & Pohl, D. W. Scanning near-field optical microscopy with aperture probes: fundamentals and applications. *J. Chem. Phys.* 112, 7761 (2000)]. However, coating of silicon AFM tips with a gold film significantly increases the tip radius from 5–25 nm to more than 40 nm. This greatly decreases the resolution of imaging. In addition, the stability of thiolate films on gold is limited by the weak Au—S bonds and the susceptibility to oxidation and photochemical reactions in the presence of oxygen and day light, which considerably shorten the lifetime of these tips.

Figure 2:
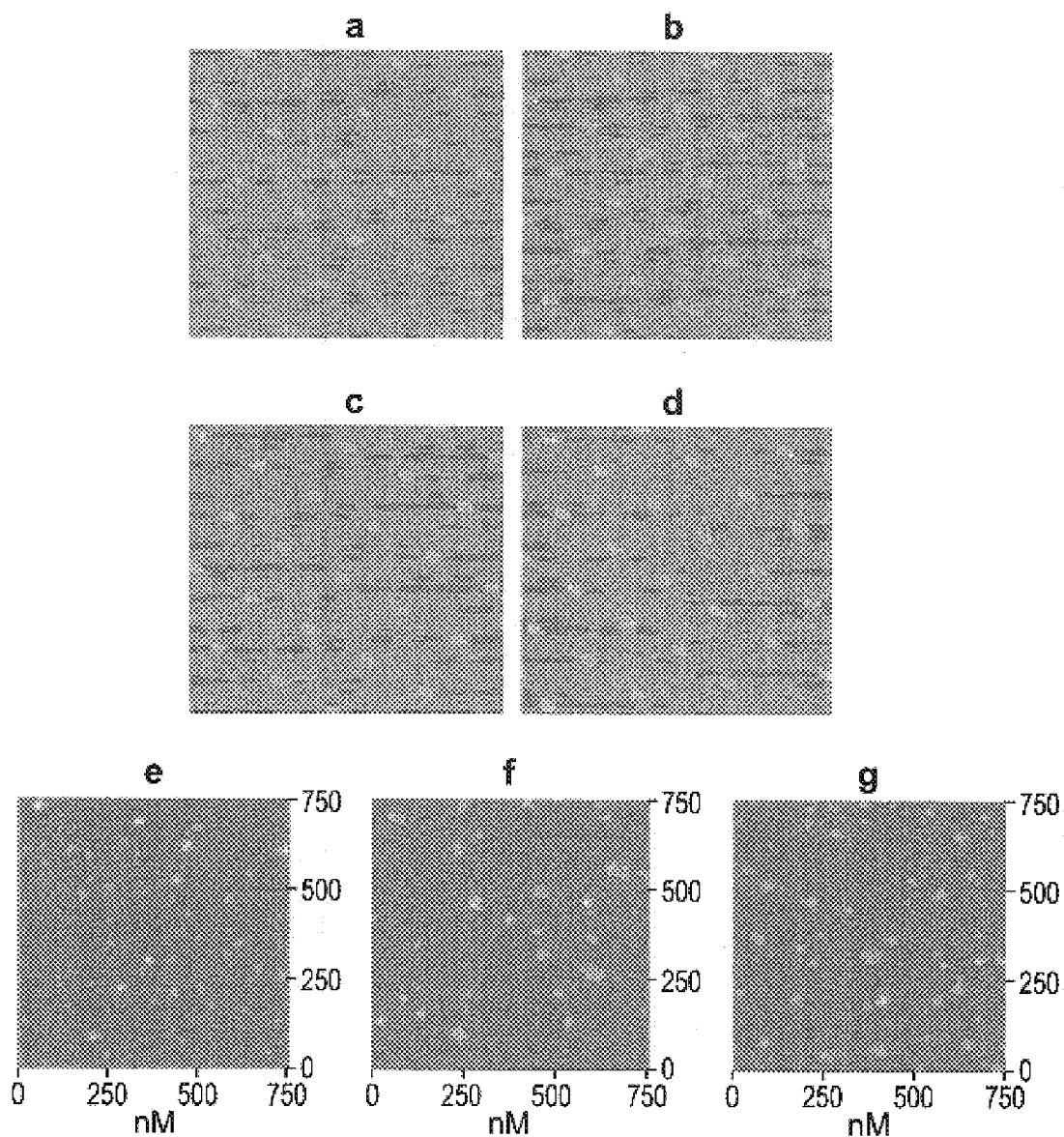
FIG. 2 AFM height images of a calibration grating with various Si tips: before (a) and after (b) etching in a HF solution for 30 s; before (c) and after (d) coating with an OEG-terminated SAM, and of a sample prepared by solution deposition of a protein, Lumazine synthase (from Vekilov's group at UH), on mica with a bare silicon tip (e), HF-etched tip (f), and OEG-coated tip (g). Since it is not possible to image the same location of the heterogeneous sample after changing the tips, the smallest features (particles) in the images are used to compare these tips. Image (g) shows that the OEG coated tip can still resolve 13 nm particles.
Figure 22:
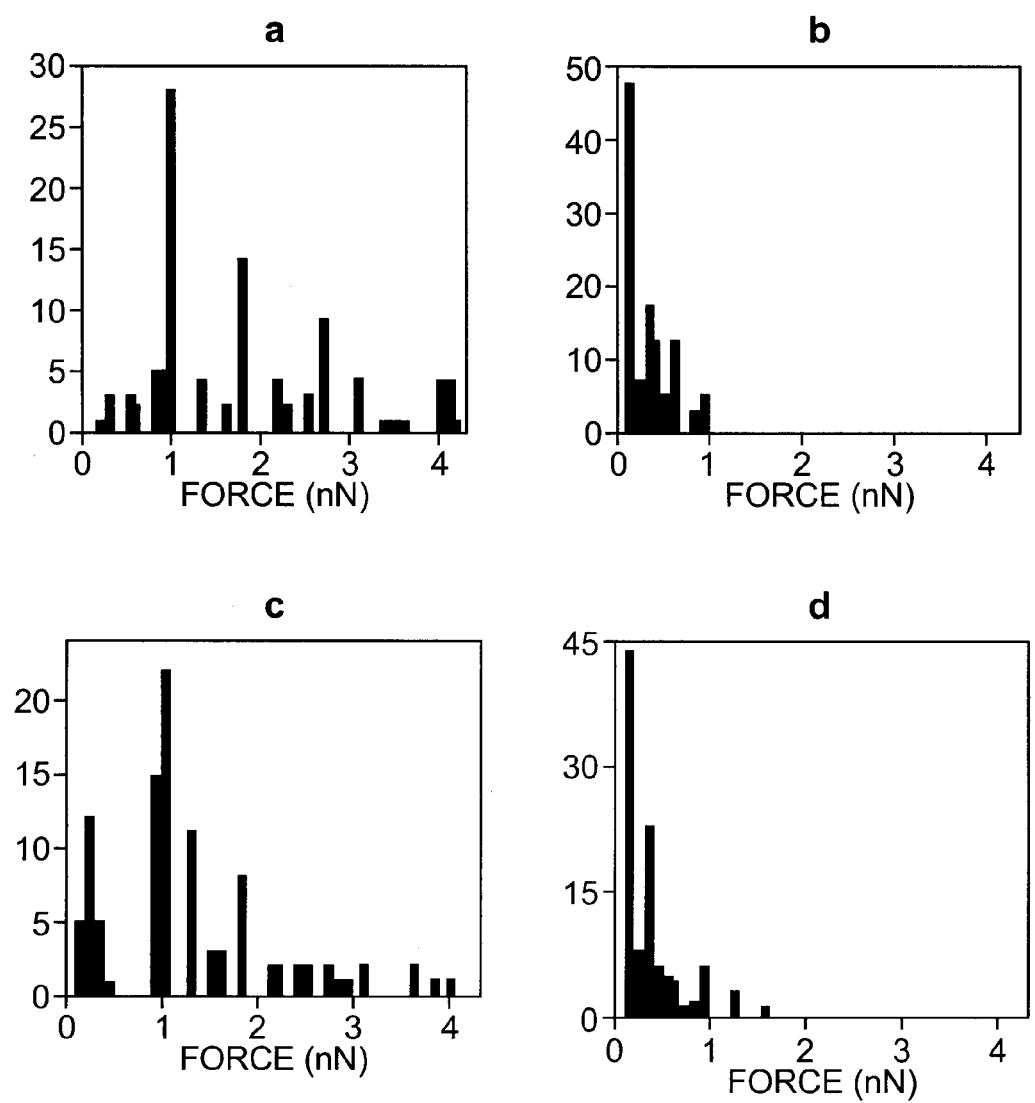
FIG. 22 Histograms of the adhesion forces between a fibrinogen film and a bare silicon tip (a) and the same tip upon OEG-modification (b), and between a BSA film and a bare silicon tip (c) and the same tip upon OEG-modification (d). The fibrinogen and BSA films, 6 nm and 2 nm in thickness, were deposited on a SAM derived from octadecyl-trichlorosilane on flat silicon surfaces. All measurements were performed with a cycle frequency of 1 Hz in PBS buffer (0.05 M, pH 7.4, Sigma) at 23° C., and the spring constants of the tips were ~0.3 N/m. (e, f): Selected tapping mode topographic AFM images (800 nm scan and 10 nm z-scale) of a fibrinogen film with an as-received tip (e, tip size 7 nm) and an OEG-modified tip (f, tip size 11 nm), both with a cantilever spring constant of 7.5 N/m and resonance frequency of 100 KHz, in PBS buffer (0.05 M, pH 7.4).

Applicants have developed two methods for direct modification of silicon tips with an OEG-terminated SAM (FIG. 1). The first method is based on surface hydrosilylation and the second on siloxane chemistry [Moy, V. T., Florin, E. L. & Gaub, H. E. Intermolecular Forces and Energies between Ligands and Receptors. *Science* 266, 257 (1994); de Lange, F., Cambi, A., Huijbens, R., de Bakker, B., Rensen, W., Garcia-Parajo, M., van Hulst, N. & Figdor, C. G. Cell biology beyond the diffraction limit: near-field scanning optical microscopy. *J. Cell Sci.* 114, 4153 (2001)]. Although the tips modified with the second method are generally satisfactory for reducing interaction with protein while remaining sharp, the deposition conditions need to be carefully controlled to obtain reproducible results. In comparison, the first method is more reliable and produces better OEG-modified silicon tips. This method is based on surface hydrosilylation of terminal alkenes on hydrogen-terminated silicon surfaces (to form C—Si bonds with the surface) [Vickery, S. A. & Dunn, R. C. Scanning near-field fluorescence resonance energy transfer microscopy. *Biophys. J.* 76, 1812 (1999); Vickery, S. A. & Dunn, R. C. Combining AFM and FRET for high resolution fluorescence microscopy. *J. Microscopy* 202, 408 (2001); Shubeita, G. T., Sekatskii, S. K., Dietler, G. & Letokhov, V. S. Local fluorescent probes for the fluorescence resonance energy transfer scanning near-field optical microscopy. *Appl. Phys. Lett.* 80, 2625 (2002)]. Specifically, the oxide layer on native silicon AFM tips is removed by treatment with aqueous HF or $NH_4F$ solution to form a $SiH/SiH_2$ surface. This process has little effect on the tip size. In fact, the tip radius (20 nm) only increases by 5% upon etching, as derived by blind-reconstruction of the tip shape based on the images obtained with the tip before and after etching (FIGS. 2a,b). These hydrogen-terminated silicon tips are then reacted with suitable molecules containing one or more ethenyl groups, such as $\alpha,\omega$-OEG-alkenes, to form a robust monolayer of the molecules on the tip. The advantage of this novel method is that the alkene molecules do not aggregate on the surface, and hence coating with monolayer instead of multilayer is ensured. As shown in FIGS. 2c,d, the tip size is barely affected by the modification. Both the etching and coating steps can be performed at large scale by immersing the sample holder containing many tips or wafers each containing hundreds of undetached tips into the etching/adsorbate solution. FIG. 22 depicts histograms of the adhesion forces between a fibrinogen film and a bare silicon tip (a) and the same tip upon OEG-modification (b), and between a BSA film and a bare silicon tip (c) and the same tip upon OEG-modification (d). The fibrinogen and BSA films, 6 nm and 2 nm in thickness, were deposited on a SAM derived from octadecyl-trichlorosilane on flat silicon surfaces.

Figure 3:
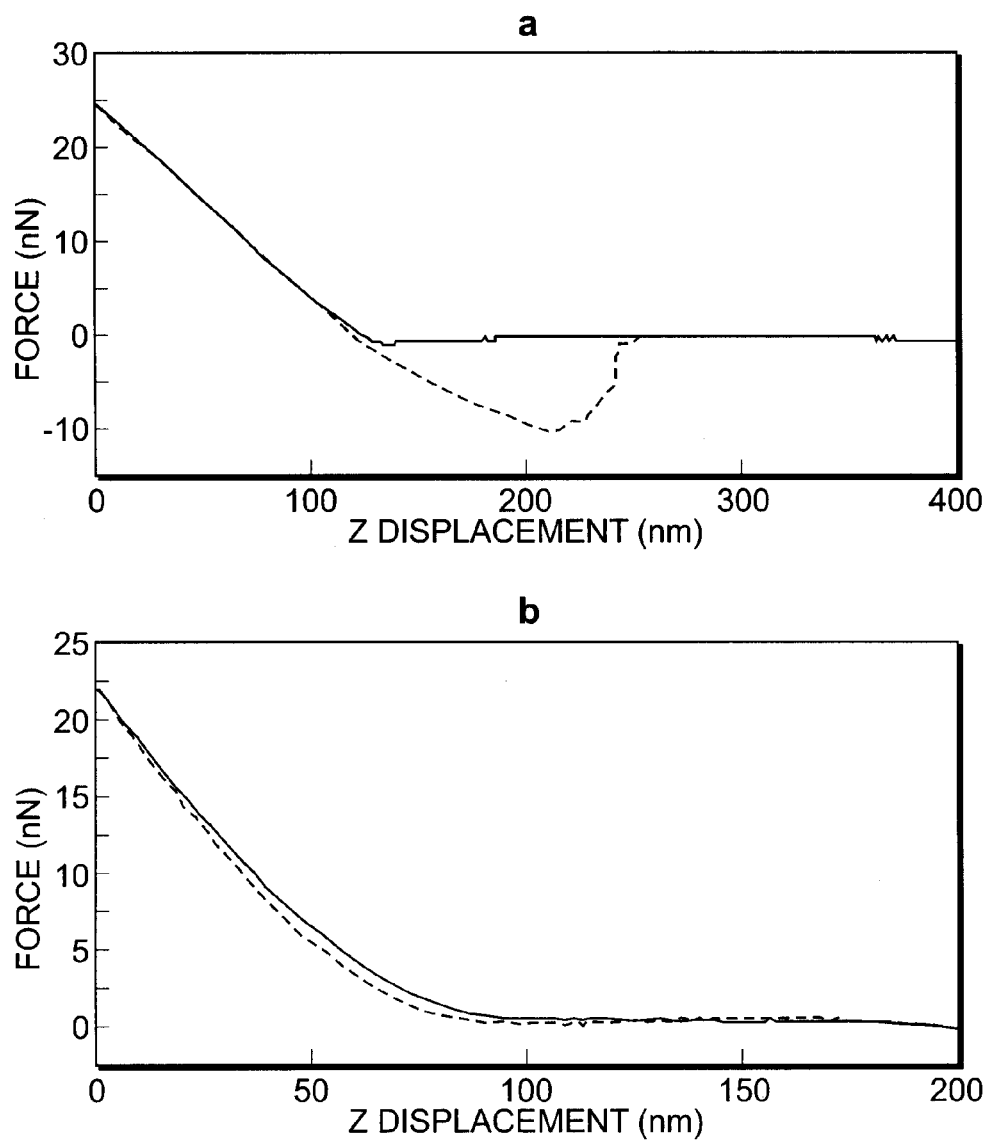
FIG. 3 Force-distance curves obtained with a bare silicon tip (a), and the same tip subsequently modified with an OEG-terminated SAM (b), in PBS buffer solution on a fibrinogen film deposited on OTS SAM.

To probe the interaction of the modified tips with protein, the force-distance curves were obtained with three proteins: fibrinogen, bovine serum albumin (BSA) and avidin, which were immobilized on surfaces using the standard procedures. Table 1 below displays attractive forces between various tips and protein surfaces. The hydrophilic (commercial bare silicon) tips and hydrophobic (OTS-modified) tips are intended to act as a reference for strong protein adsorption. These tips exhibit an attractive force with the fibrinogen-immobilized surface upon approach and strong adhesion upon retraction. However, there are no attractive and adhesion forces between the OEG-coated silicon tips and the surfaces of the above three proteins, indicating that these tips are resistant to non-specific adsorption of the proteins. Representative curves are presented in FIG. 3, showing that while significant attraction force (more than 10 nN) existed between the bare silicon tip and the fibrinogen surface, no interaction is detected upon modification of the tip with an OEG-terminated monolayer. The data clearly shows that modification of silicon AFM tips using both the first and second method greatly reduces the tip-protein interactions with the three proteins. The work is important in modification of AFM tips for use in biological systems, since the novel methods achieve the best trade-off between the needs of an organic coating for resisting non-specific interaction/adsorption and a sharp tip for high resolution of AFM imaging. Such methods may be applied to other systems such as coating with fluoro-containing alkenes or alkenes containing other functional groups.

TABLE 1

Attraction force between various tips and protein surfaces.

| tip-protein surface | attractive force (nN) |
| --- | --- |
| bare Si-fibrinogen | ~10 |
| clean Si-fibrinogen | ~2 |
| OTS-Si-fibrinogen | ~2.5 |
| OEG-Si-fibrinogen* | ~0 |
| OEG-Si-BSA | ~0 |
| OEG-Si-avidin | ~0 |

*OEG-Si refers to silicon tip coated with OEG-silane or OEG-alkene

Figure 4:
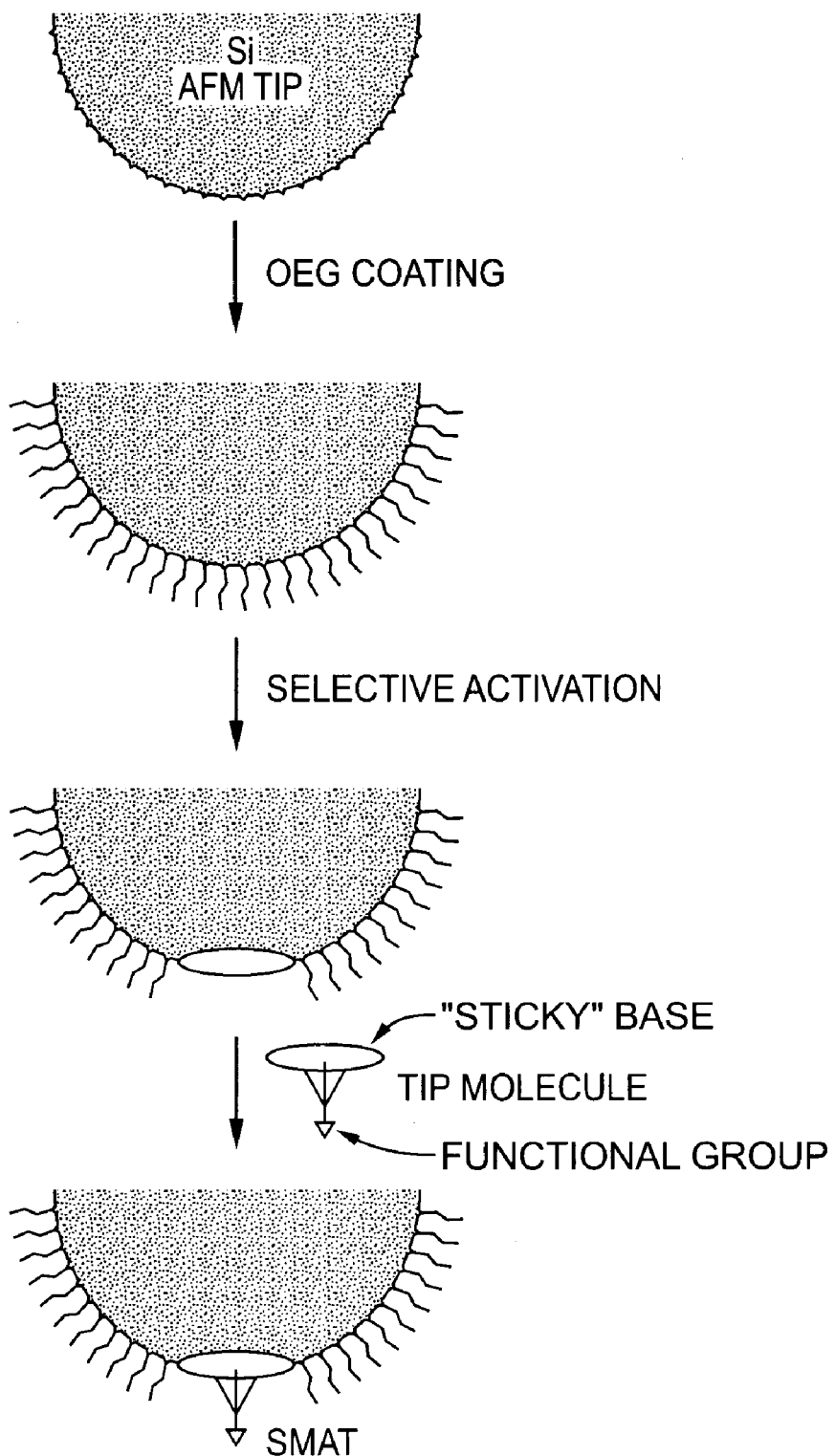
FIG. 4 Illustration for covalently attaching only one tip molecule to an OEG-coated silicon tip.
Figure 5:
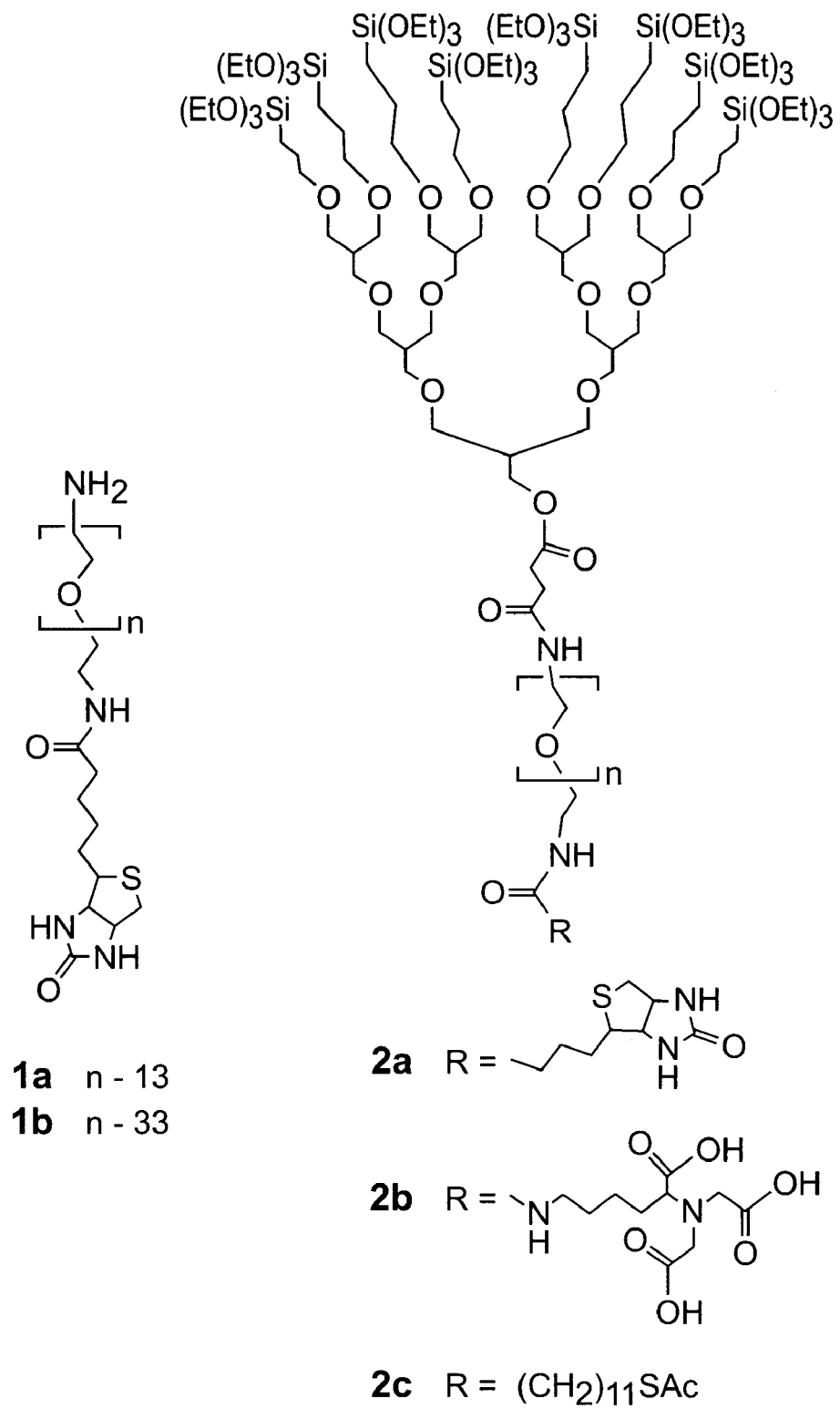
FIG. 5 Representative examples of tip molecules.
Figure 5:
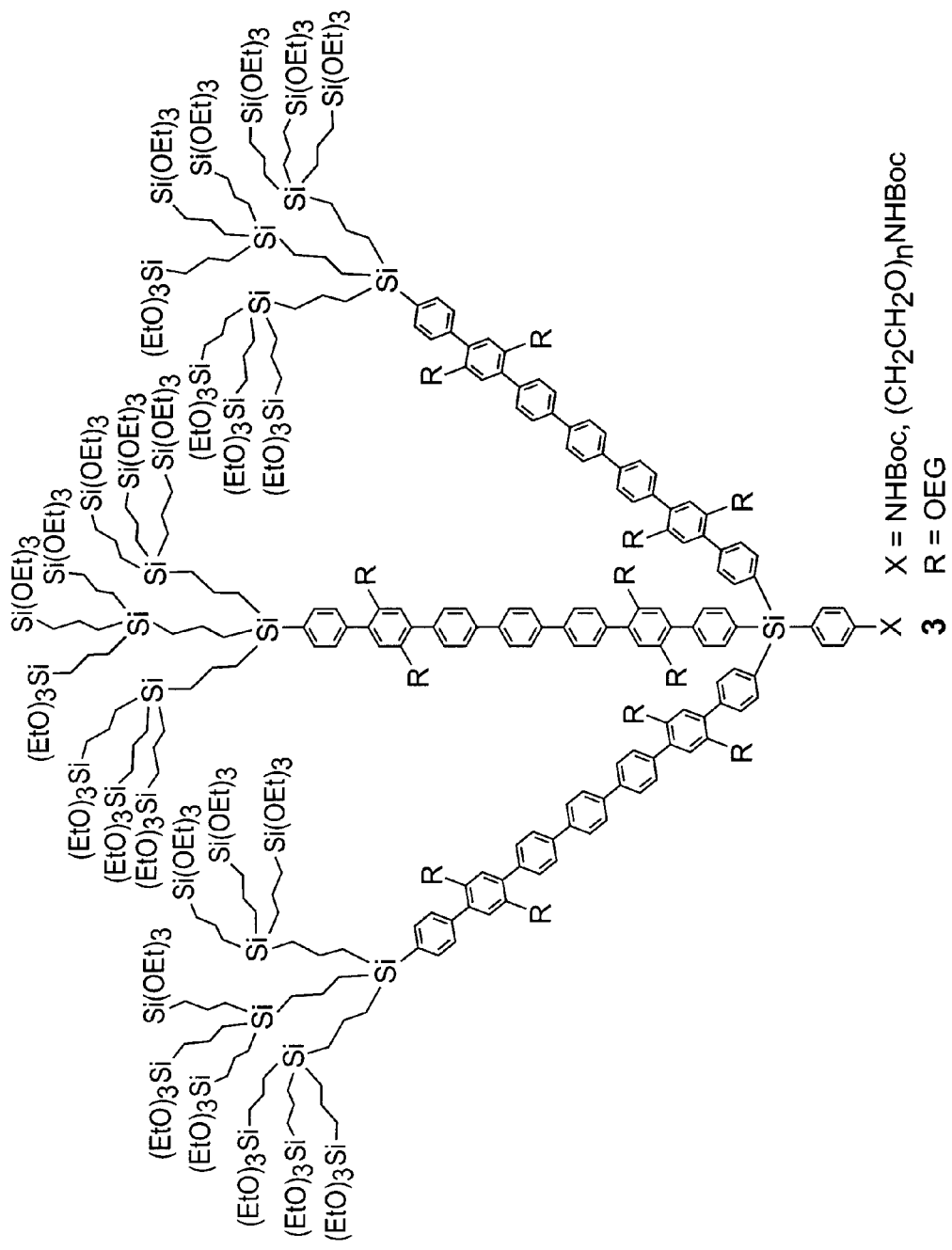

The key idea for facilitating the attachment of single molecule to AFM tip is to design tip molecules that have a nanometer-sized base from which the backbones merge into the focal point where the functional group is located (FIG. 4). A series of functionalized tip molecules have been designed and synthesized, such as the readily accessible biotin derivatives 1a and 1b (FIG. 5), and the modified Frechet-type [Grayson, S. M. & Frechet, J. M. J. Synthesis and surface functionalization of aliphatic polyether dendrons. *J. Am. Chem. Soc.* 122, 10335 (2000); Deng, X., Mayeux, A. & Cai, C. *J. Org. Chem.* 67, 5278 (2002)] dendron 2a (FIG. 5). Applicants have synthesized an analogue of the tripod-shaped oligophenylene 3 (FIG. 5), which consists of 22 phenylene units and is the largest tripod structure reported so far. In addition, Applicants have also synthesized a variety of other (tripod-shaped) dendrons including carbosilane type and polyether type dendrons terminated with $SiCl_3$, $Si(OMe)_3$, $Si(OEt)_3$, $CH_2CH=CH_2$ or SH groups [Harder, P., Grunze, M., Dahint, R., Whitesides, G. M. & Laibinis, P. E. Molecular conformation in oligo(ethylene glycol)-terminated self-assembled monolayers on gold and silver surfaces determines their ability to resist protein adsorption. *J. Phys. Chem. B* 102, 426 (1998)]. These molecules form many strong bonds with silicon oxide, hydrogen-terminated silicon, or gold surfaces [Prime, K. L. & Whitesides, G. M. Adsorption of Proteins onto Surfaces Containing End-Attached Oligo(Ethylene Oxide)—a Model System Using Self-Assembled Monolayers. *J. Am. Chem. Soc.* 115, 10714 (1993); Glazer, A. N. & Mathies, R. A. Energy-transfer fluorescent reagents for DNA analyses. *Anal. Biotech.* 8, 94 (1997); Garcia-Parajo, M. F., Veerman, J. A., van Noort, S. J. T., de Grooth, B. G., Greve, J. & van Hulst, N. F. Near-field optical microscopy for DNA studies at the single molecular level. *Bioimaging* 6, 43 (1998); Byassee, T. A., Chan, W. C. W. & Nie, S. Probing single molecules in single cells. *Anal. Chem.* 72, 5606 (2000)]. In particular, the thiol-terminated dendrons may be used as a platform to immobilize tip molecules on SMAT fabrication chips.

Tip molecules 1a and 1b (FIG. 5) were readily synthesized and used in the preparation of SMATs with the prototype SMAT-fabrication-chip described below. Tip molecules 2a–c (FIG. 5) feature a large dendron terminated with many $Si(OEt)_3$ groups that can hydrogen bond to and subsequently form Si—O bonds with a silicon oxide surface [Xiao, Z. D., Cai, C. Z. & Deng, X. B. Formation of robust mesoscopic ring structures by self-assembly of SiCl3-terminated dendrimers. *Chem. Commun.*, 1442 (2001); Z. Xiao, C. Cai, A. Mayeux, A. Milenkovic. "The first organosiloxane thin films derived from SiCl3-terminated dendrons. Thickness-dependent nano- and mesoscopic structures of the films deposited on mica by spin-coating", *Langmuir* 18, 7728–7739 (2002)]. The large base in 2 (FIG. 5) increases the chance of attachment of single molecule to the modified AFM tip while the presence of a large number of sticky groups greatly facilitates the attachment process and its monitoring by the fly-fishing mode.

While 1 and 2 (FIG. 5) with a long PEG linker are suitable for pulling experiments, the tripod-shaped dendrons 3 (FIG. 5) are designed for high-resolution imaging. They are composed of four parts: the tripod legs, the base, the tip, and the side chains. For the tripod legs and the tip, oligo(p-phenylene)s are used due to their stability and rigidity. The flexibility of the dendron base is significantly reduced upon chemisorption on surface which flattens the dendrons [Xiao, Z. D., Cai, C. Z. & Deng, X. B. Formation of robust mesoscopic ring structures by self-assembly of SiCl3-terminated dendrimers. Chem. Commun., 1442 (2001); Z. Xiao, C. Cai, A. Mayeux, A. Milenkovic. "The first organosiloxane thin films derived from SiCl3-terminated dendrons. Thickness-dependent nano- and mesoscopic structures of the films deposited on mica by spin-coating", Langmuir 18, 7728–7739 (2002); Mansfield, M. L. Surface adsorption of model dendrimers. Polymer 37, 3835 (1996); Yao, Y. X.; Tour, J. M. J. Org. Chem. 1999, 64, 1968; Rukavishnikov, A. V.; Phadke, A.; Lee, M. D.; LaMunyon, D. H.; Petukhov, P. A.; Keana, J. F. W. Tetrahedron Lett. 1999, 40, 6353; Li, J., Piehler, L. T., Qin, D., Baker, J. R., Tomalia, D. A. & Meier, D. J. Visualization and characterization of poly(amidoamine) dendrimers by atomic force microscopy. Langmuir 16, 5613 (2000); Tokuhisa, H., Zhao, M. Q., Baker, L. A., Phan, V. T., Dermody, D. L., Garcia, M. E., Peez, R. F., Crooks, R. M. & Mayer, T. M. Preparation and characterization of dendrimer monolayers and dendrimer-alkanethiol mixed monolayers adsorbed to gold. J. Am. Chem. Soc. 120, 4492 (1998)]. Therefore, the overall rigidity of the SMATs prepared with 3 (FIG. 5) is much higher than with 1 and 2 (FIG. 5), and more suitable for high resolution imaging. Keana [Rukavishnikov, A. V.; Phadke, A.; Lee, M. D.; LaMunyon, D. H.; Petukhov, P. A.; Keana, J. F. W. Tetrahedron Lett. 1999, 40, 6353] and Tour [Yao, Y. X.; Tour, J. M. J. Org. Chem. 1999, 64, 1968] and co-workers have reported the synthesis of other tripod-shaped molecules designed for tip modification. Compared to these molecules with an oligophenylacetylene framework, the oligophenylene framework in 3 (FIG. 5) is more stable especially in the presence of transition metals such as Ni(II) for site-specific bio-conjugation to biomolecules labeled with (His)6. In addition, in our design surface-active dendrons are used to strongly anchor the molecule on the surface. The size of the tripod-shaped molecules can be adjusted by the length of the legs. The tripod molecules were synthesized in a stepwise fashion, so that they are uniform, and allow modification of the molecular length, shape, end group, and side groups [Xiao, Z.; Cai, C.; Mayeux, A.; Milenkovic, A. "The first organosiloxane thin films derived from SiCl3-terminated dendrons. Thickness-dependent nano- and mesoscopic structures of the films deposited on mica by spin-coating", Langmuir. 18, 7728 (2002)]. The functional group at the focal point of 3 (FIG. 5) allows attachment of various functional fragments through coupling reactions.

Figure 6:
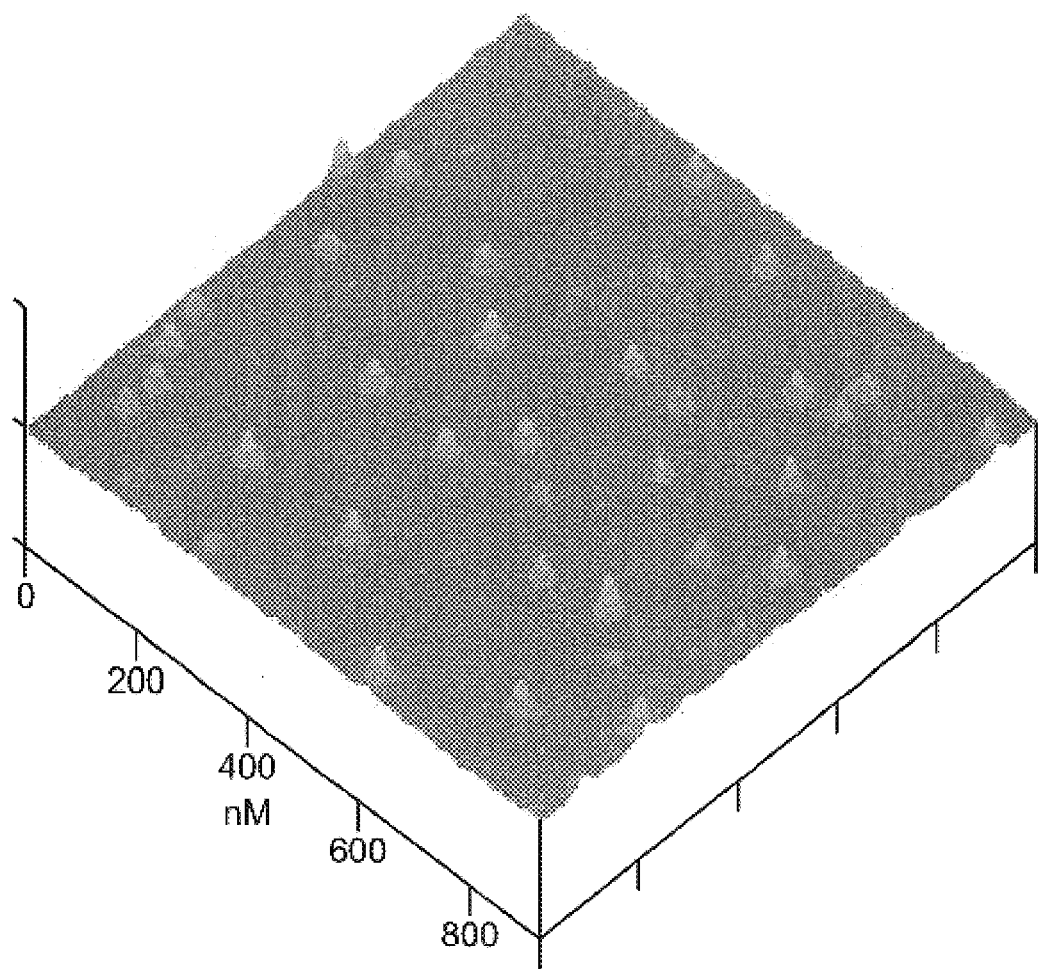
FIG. 6 A 3-D AFM image of isolated dendron molecules with 81 $SiCl_3$ terminal groups deposited on hydroxylated flat silicon (111) surfaces.

Systematic studies of the chemisorption of some of the above dendrons on mica hydroxylated flat silicon (111) and atomically flat Au(111) surfaces have been performed for the first time in our laboratory. The films have been characterized with surface sensitive analytical tools, such as AFM, ellipsometry, contact angle, angle-dependent X-ray photoelectron spectroscopy (XPS), FTIR-ATR, and SIMS. The studies have confirmed the great tendency of these dendron molecules to flatten and spread out on the surfaces, especially when the molecules are well-isolated [Ulman, A. Formation and structure of self-assembled monolayers. Chem. Rev. 96, 1533 (1996)]. This observation is in agreement with previous reported studies on other dendrimer systems [Grayson, S. M. & Frechet, J. M. J. Synthesis and surface functionalization of aliphatic polyether dendrons. J. Am. Chem. Soc. 122, 10335 (2000); Harder, P., Grunze, M., Dahint, R., Whitesides, G. M. & Laibinis, P. E. Molecular conformation in oligo(ethylene glycol)-terminated self-assembled monolayers on gold and silver surfaces determines their ability to resist protein adsorption. J. Phys. Chem. B 102, 426 (1998)]. Significantly, AFM images showed that molecularly flat monolayers could be prepared on silicon surfaces with dendrons containing up to 81 terminal groups. This shows that the molecules tend to flatten and interact strongly with the surface rather than stack on top of each other. This unique property is even more pronounced when the molecules are isolated (FIG. 6), as indicated by the heights of the individual molecules measured by AFM using the method described in ref. 61. This property is used for the design of the tip molecules. Our study also showed that cross-linking of silanol groups is a rather slow process at room temperature. This property is also highly desirable, since the tip molecule has time to adjust itself to let all the $Si(OR)_3$ groups to hydrogen-bond to the activated area, i.e., to position itself at the AFM tip apex, before forming covalent bonds with the surface.

It is well known that silicon oxide nanostructures with a width of a few nanometers can be generated on conducting silicon substrates coated with a self-assembled monolayer (SAM) by applying a voltage between the substrate and the tip that is moving in close proximity over the substrate. The organic materials under the tip are degraded by the tunneling current [Linford, M. R., Fenter, P., Eisenberger, P. M. & Chidsey, C. E. D. Alkyl Monolayers on Silicon Prepared from 1-Alkenes and Hydrogen-Terminated Silicon. J. Am. Chem. Soc. 117, 3145 (1995); Sieval, A. B., Vleeming, V., Zuilhof, H. & Sudholter, E. J. R. An improved method for the preparation of organic monolayers of 1-alkenes on hydrogen-terminated silicon surfaces. Langmuir 15, 8288 (1999); Kidoaki, S. & Matsuda, T. Adhesion forces of the blood plasma proteins on self-assembled monolayer surfaces of alkanethiolates with different functional groups measured by an atomic force microscope. Langmuir 15, 7639 (1999); Ortega-Vinuesa, J. L., Tengvall, P. & Lundstrom, I. Molecular packing of HAS, IgG, and fibrinogen adsorbed on silicon by AFM imaging. Thin Solid Films 324, 257 (1998); Veiseh, M., Zareie, M. H. & Zhang, M. Highly selective protein patterning on gold-silicon substrates for biosensor applications. Langmuir 18, 6671 (2002); Marrian, C. R. K., Perkins, F. K., Brandow, S. L., Koloski, T. S., Dobisz, E. A. & Calvert, J. M. Low-Voltage Electron-Beam Lithography in Self-Assembled Ultrathin Films with the Scanning Tunneling Microscope. Appl. Phys. Lett. 64, 390 (1994)].

In this invention, Applicants demonstrate a novel and practical method to selectively activate the apex of silicon SPM tips coated with a layer of inert organic moleucles and to evaluate the size of the activated area through force measurements. This then opens up the possibility of anchoring only one single molecule selectively at the apex of SPM tips. As an example, Applicants used a silicon cantilever coated with a layer of oligo(ethylene glycol) (OEG) which is able to resist protein adsorption and favors the studies of interaction between biological molecules [Sugimura, H. & Nakagiri, N. AFM lithography in constant current mode. Nanotechnology 8, A15 (1997)]. The OEG-coated cantilever was prepared by placing a hydrogen-terminated silicon cantilever, which was obtained by etching in 1% HF acid for 20 s, in a solution of methyl(undec-10-en-1-yl)OEG e.g., $CH_2=CH(CH_2)_9(OCH_2)_2OCH_3$, in mesitylene (vacuum distilled and degassed) of 1 mM concentration at 200° C. for 2 h, or by exposing the cantilever coated with the alkene to UV light in a pure nitrogen enviorment for 20 minutes. It should be noted that to our knowledge the chemisorption of OEG-containing alkenes on hydrogen-terminated silicon surfaces has not been reported. Included in this invention is the preparation of OEG-containing films on a H-terminated silicon substrate using the above methods [Sugimura, H. & Nakagiri, N. AFM lithography in constant current mode. *Nanotechnology* 8, A15 (1997)]. Such films are resistant to protein adsorption to the surfaces and thus have potential applications in biosensors using silicon as substrates.

Figure 7:
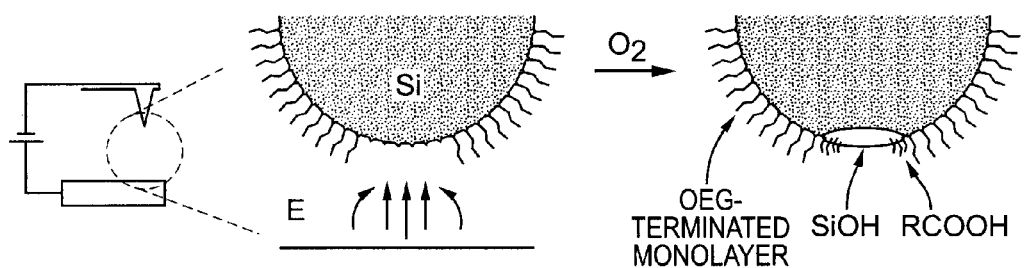
FIG. 7 Illustration of a typical process for selective activation of an OEG-coated silicon tip. An cantilever is mounted to an AFM, and brought in close proximity to an Au (111) surface before a voltage pulse is applied. The strong electric field between the tip and the Au surface fragments the monolayer selectively at the tip apex, generating a small activated area at the apex of the OEG-coated tip. The activated area contains OH and COOH groups and possibly other functional groups. Note that the polarity of the voltage pulse can be reversed.

A typical setup for tip modification is shown in FIG. 7. An OEG-coated cantilever is mounted to an AFM (Digital Instrument, Multimode IIIa) equipped with a voltage pulse supplier connecting the tip and an atomically flat Au(111) electrode. The OEG-coated silicon tip is brought in close proximity to the Au electrode surface, and a voltage pulse is applied to oxidize the organic adsorbates possibly also the underlying silicon substrate selectively at the tip apex to generate a small activated area consisting of SiOH, OH and COOH groups. To minimize the activated area, Applicants carried out intensive optimization of the experimental conditions such as the pulse duration time, the set point (height of the tip), and the voltage, and performed the activation in hexadecane and toluene to avoid the water bridge between the tip and the sample.

Figure 8:
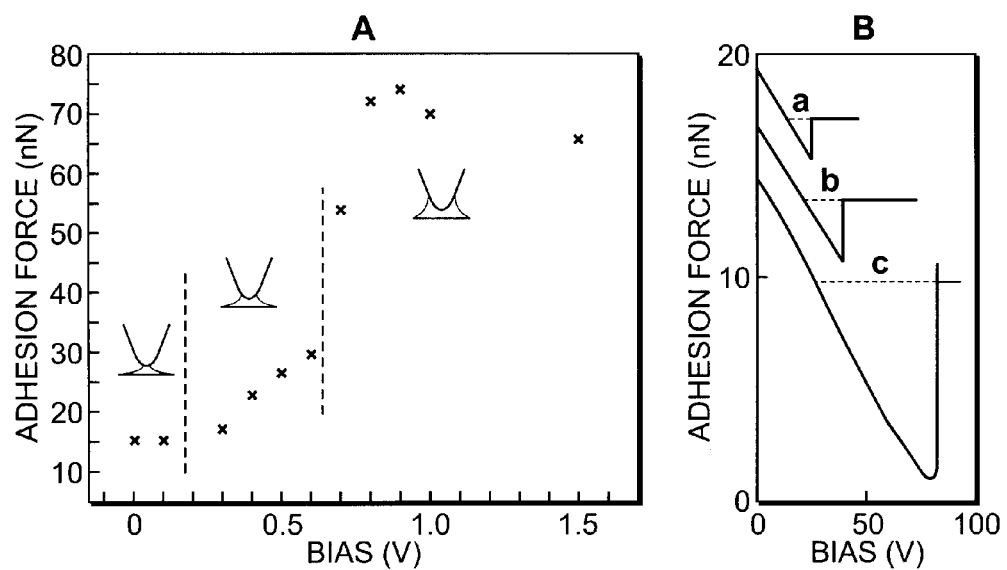
FIG. 8 The adhesion forces (nN) of an OEG-coated tip on mica as a function of activation bias (V) applied to the tip for 5 s. The adhesion forces are measured in air with a relative humidity of 40%. The inset shows the force-extension curves for the tip activated at 0.1 V (a), 0.4 V (b), and 0.8 V (c).

After the above activation process, Applicants evaluated the modified tips by measuring the adhesion force with mica under identical ambient conditions. As shown in FIG. 8, the adhesion force increases with the bias applied to the tip. No obvious change of adhesion force under low bias (<0.2 V) existed. The adhesion force increases slowly with bias between 0.3 and 0.6 V, then sharply increases at 0.7 V, and finally reaches a constant at bias higher than 0.8 V. This is expected since the adhesion force measured in ambient is mainly due to the capillary interaction between the tip and the substrate surface, which increases with the size of the activated area that contains hydrophilic OH and COOH groups. Bias below 0.2 V cannot oxidize the organic coating, resulting in low capillary force due to the lower polarity of the surface groups. In 0.3–0.6 V regions, a small-activated area is generated and increases with the bias. In the region of bias higher than 0.7, a large area of the OEG layer and even the entire face of the tip apex may be oxidized and become completely hydrophilic, resulting in a very large adhesion force (54–75 nN).

Applicants used the measured adhesion force and other data, including the estimated tip radius, the water contact angles of the tip and the substrate surface, as well as the Young's and Kelvin's equations, to estimate the size of the activated area ($S_{ac}$) [Sugimura, H. & Nakagiri, N. Scanning probe nanofabrication of chemically active areas on substrate covered with organosilane monolayers. *J. Vac. Sci. Technol. B* 15, 1394 (1997); Sugimura, H., Okiguchi, K., Nakagiri, N. & Miyashita, M. Nanoscale patterning of an organosilane monolayer on the basis of tip-induced electrochemistry in atomic force microscopy. *J. Vac. Sci. Technol. B* 14, 4140 (1996); Beese, L. S., Derbyshire, V. & Steitz, T. A. Structure of DNA polymerase I Klenow fragment bound to duplex DNA. *Science* 260, 352 (1993); Korolev, S., Nayal, M., Barnes, W., Di, Cera, E. & Waksman, G. Crystal structure of the large fragment of *Thermus aquaticus* DNA polymerase I at 2.5 Å resolution: structural basis for thermostability. *Proc. Natl. Acad. Sci. USA* 92, 9264 (1995); Li, Y., Kong, Y., Korolev, S. & Waksman, G. Crystal structures of the Klenow fragment of *Thermus aquaticus* DNA polymerase I complexed with deoxyribonucleoside triphosphates. *Protein Sci.* 7, 1116 (1998); Furey, W. S., Joyce, C. M., Osborne, M. A., Klenerman, D., Peliska, J. A. & Balasubramanian, S. Use of fluorescence resonance energy transfer to investigate the conformation of DNA substrates bound to the Klenow fragment. *Biochemistry* 37, 2979 (1998)]. The results are listed in Table 2 below. Assumptions were used in deriving the data and are only estimations. Nevertheless, the adhesion forces serve as a standard for evaluating the activated tips. The result indicates the activated areas may be controlled within a few nanometers in diameter that can fit only one large tip molecule.

TABLE 2

Estimated activated areas ($S_{ac}$) and radius of the area (r) at the apex of a PEG-coated AFM tip generated with different bias [Clausen-Schaumann, H., Rief, M. & Gaub, H. E. Sequence dependent mechanics of single DNA molecules. Biophys. J. 76, A151 (1999)]

| Bias (V) | 0–0.100 | 0.300 | 0.400 | 0.500 |
|---|---|---|---|---|
| $S_{ac}$ (nm²) | 0 | 29.6 | 160 | 358 |
| r (nm) | 0 | 3.0 | 7.1 | 10.7 |

The oxidation of the OEG-terminated SAM under the activation process is complicated. Applicants assume the activated area contains Si—OH, $CH_2OH$, and COOH groups. The presence of COOH groups at the tip apex was confirmed by force-titration experiments that measure the adhesion forces with a OH-terminated thiolate SAM on Au as a function of pH (FIG. 12A). At low pH, the carboxylic groups on the tip are mostly in the protonated form (COOH), which interacts with the OH surface more strongly than its deprotonated form (COO⁻) at high pH. Notably, these tips remain resistant to proteins, and stable for at least 3 months. To our knowledge, the use of local electrochemical oxidation to modify silicon AFM tips has not been reported. The unique advantage of this method is that the COOH groups are likely introduced only to the tip apex due to the confinement of the electric field, while the rest of the OEG-coated cantilever tip remains inert to biomaterials. In comparison, common tip modification techniques lead to a random distribution of the functional groups on the whole cantilever tip. To demonstrate the multistep derivatization of the oxidized tips, we attached a bi-functional OEG derivative to the oxidized tips via amidation (FIG. 12B). The force titration curve in FIG. 5B shows that the difference of the adhesion forces ($\Delta F_a$) at pH<3 and pH>7 dropped to zero, consistent with the absence of COOH groups. After the tip was subjected to conditions favoring removal of the t-Bu protecting group (FIG. 12C), $\Delta F_a$ returned back to the same value before the derivatization, suggesting the same number of COOH groups on the tip. Furthermore, we treated the tip with ethylene diamine to introduce amino on the tip (FIG. 12D), and indeed, the force titration curve clearly suggests the presence of amino groups on the tip.

Figure 12:
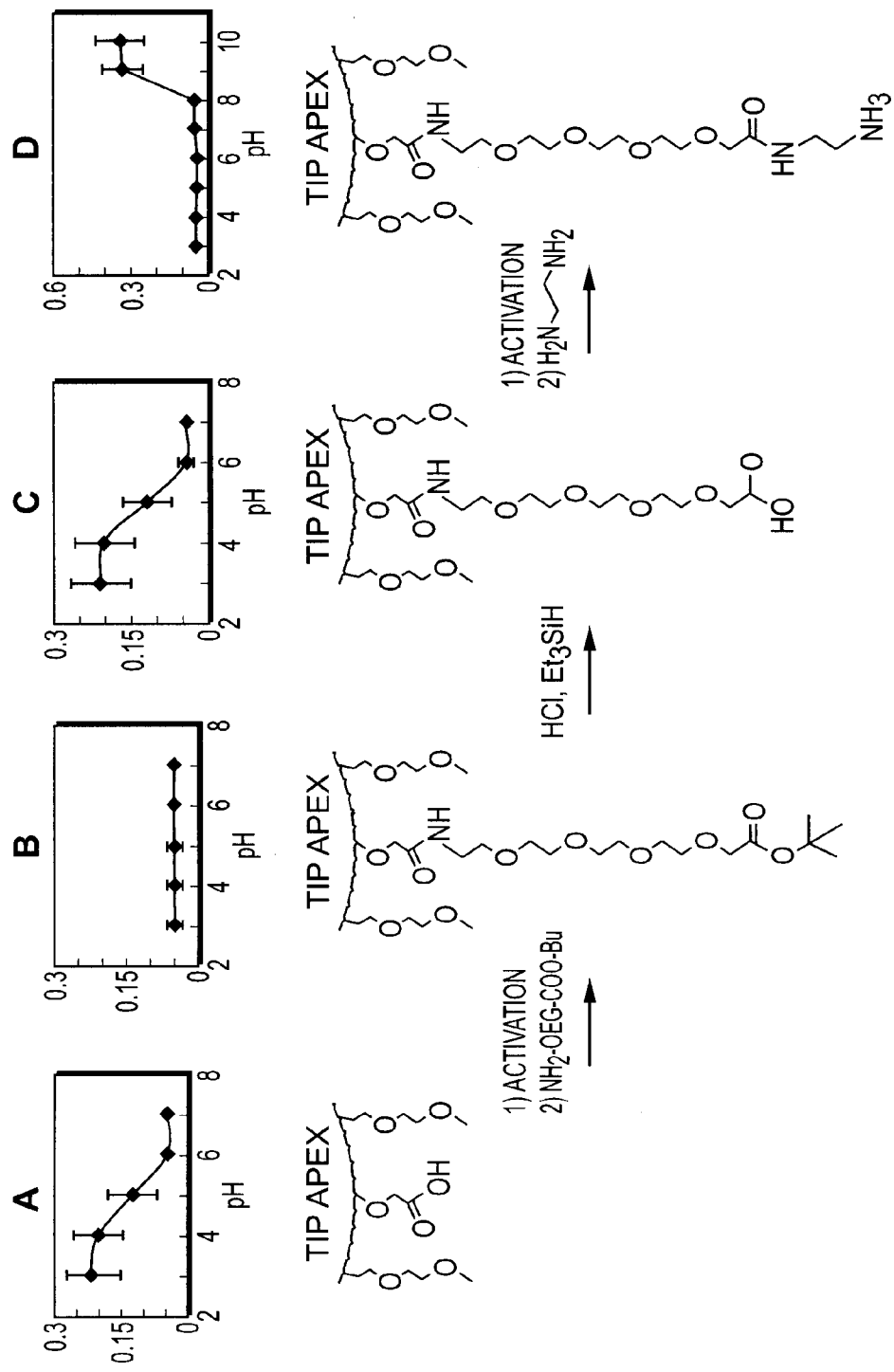
FIG. 12 Derivatization of COOH-containing tip and the resulting adhesion force vs pH curves (A–D, see text), and Histograms of adhesion forces between tips modified with 1a (E) or 1b (F) and avidin on mica before (E,F) and after (G,H) adding biotin solution.
Figure 12:
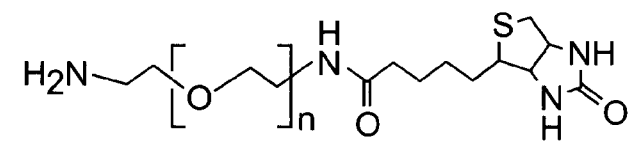
Figure 12:
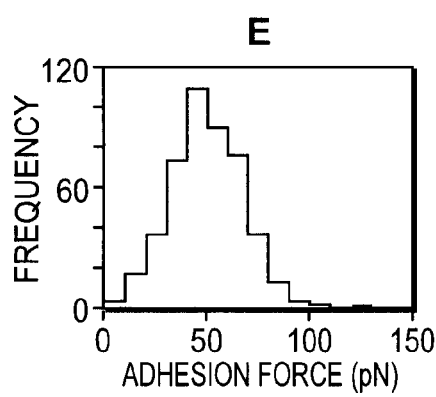
Figure 12:
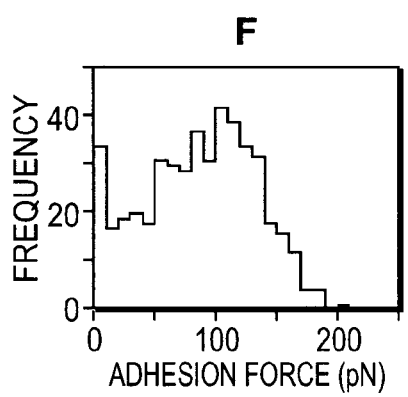
Figure 12:
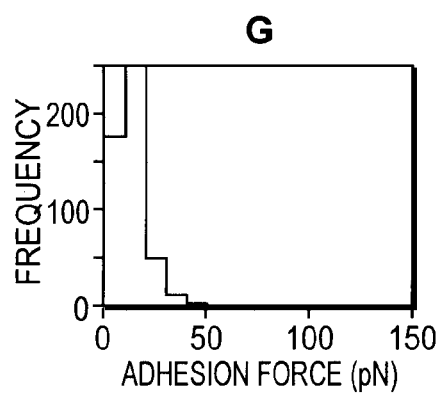
Figure 12:
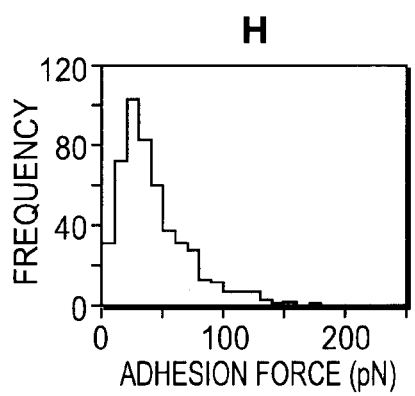

The number of COOH groups on the tip apex were related to the difference of the adhesion forces ($\Delta F_a$) at pH<3 and pH>7 in the force-titration curves. Using our briefly optimized procedure for eletrochemical oxidation, we routinely obtained tips with $\Delta F_a$ in the range of 100–400 pN, which is much lower than any reported values (500–2000 pN). Lieber et al. suggested that ~100 pN of $\Delta F_a$ corresponds to one COOH group at the end of a carbon nanotube tip [Wong, S. S., Woolley, A. T., Joselevich, E., Cheung, C. L. & Lieber, C. M. Covalently-functionalized single-walled carbon nanotube probe tips for chemical force microscopy. *J. Am. Chem. Soc.* 120, 8557 (1998)]. We believe that the value of $\Delta F_a$ per COOH group is system-dependent. To estimate this value in our system and to demonstrate that a few or even only one functional molecule can be anchored to the activated area located only at the tip apex, we attached the biotin-amine via a long (1a) or short (1b) linker (FIG. 12) to the COOH groups on the tips and measured the unbound force between the biotinated tips and avidin immobilized on mica; the biotin-avidin system has been extensively studied. Before introducing the biotin, the adhesion forces measured with the COOH-containing tips on the avidin and on mica were both within the noise level (<13 pN). Upon treatment with the amino-biotin derivatives, the tips gained affinity to avidin. FIG. 12 shows the histograms of the unbound forces between the avidin and a tip modified with the long OEG-biotin 1a (E) and a tip modified with the short OEG-biotin 1b (F). The mean adhesion forces were 50 pN for the former and about 100 pN for the latter. Previously reported forces for unbinding one biotin-avidin pair were about 45–50 pN [Moy, V. T., Florin, E. L. & Gaub, H. E. Intermolecular Forces and Energies between Ligands and Receptors. *Science* 266, 257 (1994)], measured under conditions similar to ours (force constant 0.05±0.02 N/m, loading rate ~1 nN/s, retraction velocity ~200 nm/s, loading force ~100 pN). Upon addition of a biotin solution (20 ug/ml) into the system to block the binding sites of avidin, the adhesion forces in both systems significantly decreased (FIGS. 12G,H), strongly indicating that the measured forces originated from the specific biotin-avidin interaction. On average, each immobilized avidin molecule is expected to have two free binding sites for biotin. Therefore, if multiple biotin groups are present on the tip apex, they can form multiple bindings with one or several avidin molecules. With such tips, some of the force-extension curves should show the sequential or simultaneous breakage of multiple bonds during the retraction of the AFM tip. The absence of such events in FIG. 12E indicates that this particular tip possessed only one biotin group at the tip apex, while the tip in FIG. 12F likely possessed 2–3 biotin groups at the tip apex. Among the 10 biotinated tips that we have measured so far, the unbound forces fell in the range of 45–200 pN for the tips modified with 1a, and 50–300 pN for the tip modified with 1b. Assuming that all COOH groups on the tip reacted with the biotin-amines like their analog in solution, the results suggest that the oxidized tips contained only a few COOH groups on the tip apex, and few COOH groups were present at the other locations, since a longer linker to biotin did not increase the unbound forces. If some COOH groups were a few nanometers above the tip apex, the biotin groups attached to these COOH groups via a short spacer could not touch the avidin surface, while the long (12 nm) PEG spacer should allow them to bind to the avidin surface and hence increase the unbound forces. However, the above assumption might not be valid, especially for 1a, which occupies a large volume and the already bound 1a may thus block the neighbouring COOH group from bonding the incoming 1a.

The above biotin-PEG-NH$_2$ molecules were anchored to the activated apex of an OEG-coated tip via amide formation with a carboxylic acid group in the activated using two approaches. The first step in both approaches involved activation of the carboxylic acid groups on the tip with N-hydroxysuccinimide (NHS). In the first approach, the activated tips reacted with 1 (FIG. 5) in a highly diluted solution. Solution of biotin-PEG-NH$_2$ of 1 mM concentration in DMF was prepared in a Schlenk tube. The activated COOH-terminated AFM tips in a Teflon holder were immersed in the NH$_2$-biotin solution at room temperature for 15 min under N$_2$. The tips were taken out and rinsed with DMF, followed by drying with a stream of N$_2$. Since there are multiple COOH groups in the activated area and 1 (FIG. 5) has only one NH$_2$ group, the conditions need to be carefully controlled to statistically favor the attachment of single molecule. This approach is similar to the method demonstrated in FIG. 8B, but here the attachment is confined within the activated apex of an OEG-coated tip that is resistant to non-specific interactions. Hence it represents a major improvement over the previous method in controlling the location of the molecule on the tip and in enhancing the specificity of the SMAT.

Figure 9:
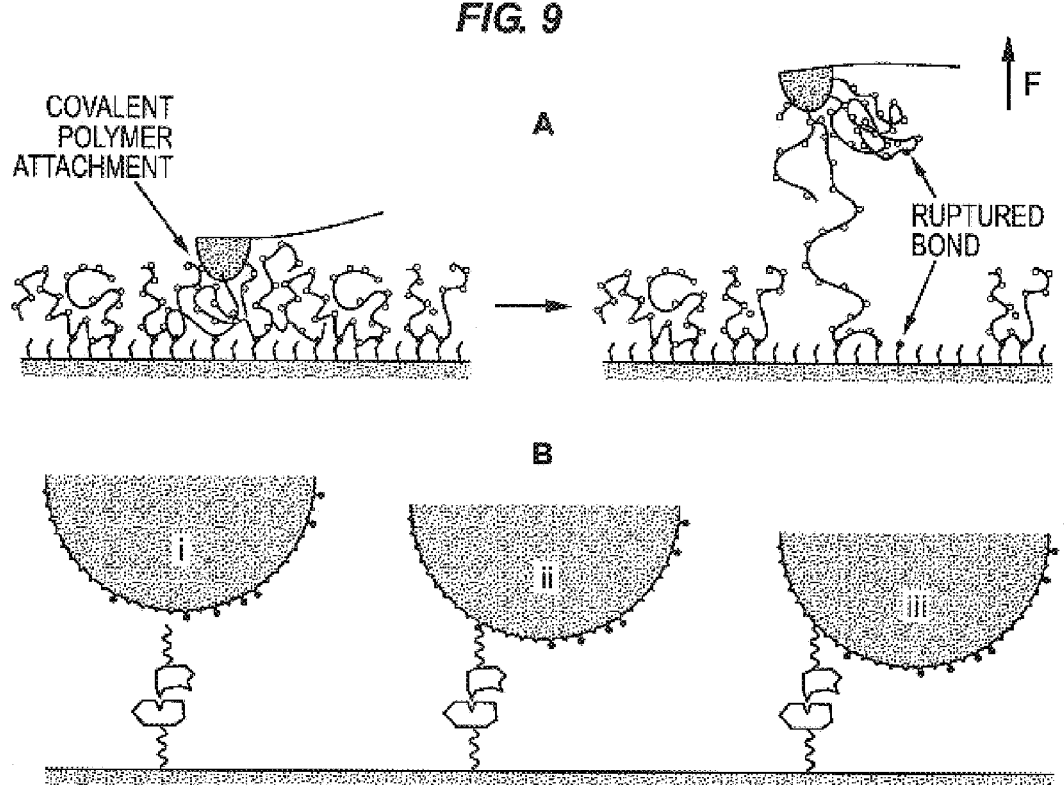
FIG. 9 A. Illustration of "fishing" a polymer molecule with a "sticky" AFM tip: the tip is brought in contact with the immobilized polymer molecules. After the binding is established, the tip pulls away from the surface. The force-extension curves characterize the intramolecular interactions. Reproduced from ref. [Noy, A., Vezenov, D. V. & Lieber, C. M. Chemical force microscopy. *Annu. Rev. Mater. Sci.* 27, 381 (1997)]. B. Illustration of situations during the interaction of a single molecule randomly attached to an AFM tip with its immobilized partner. The interaction forces measured by the AFM for situations 1–3 may be different due to the non-specific interactions with the bulk tip.
Figure 10:
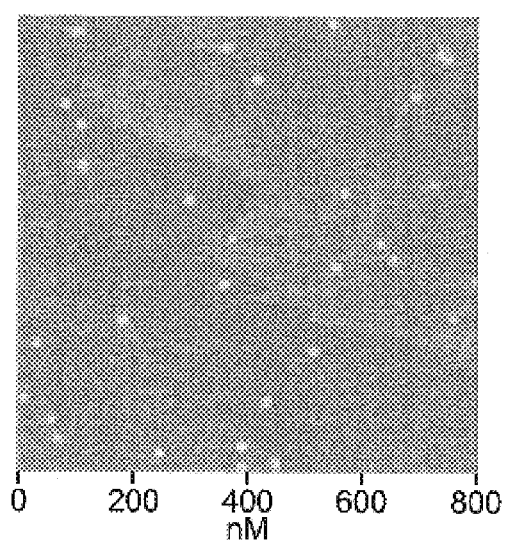
FIG. 10 A tapping mode AFM image of biotin-PEG-$NH_2$ (1b [See FIG. 5], Mw~1700) spin-coated on mica. In the absence of 1b (See FIG. 5), spin-coating of the solvent only did not produce these particles.
Figure 11:
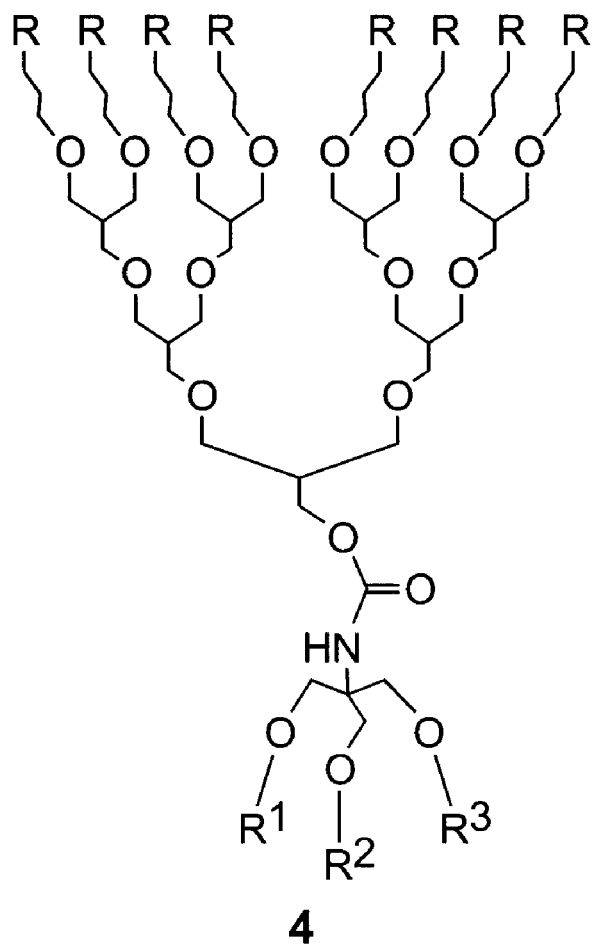
FIG. 11 Multifunctional tip molecules of the present invention.
Figure 11:
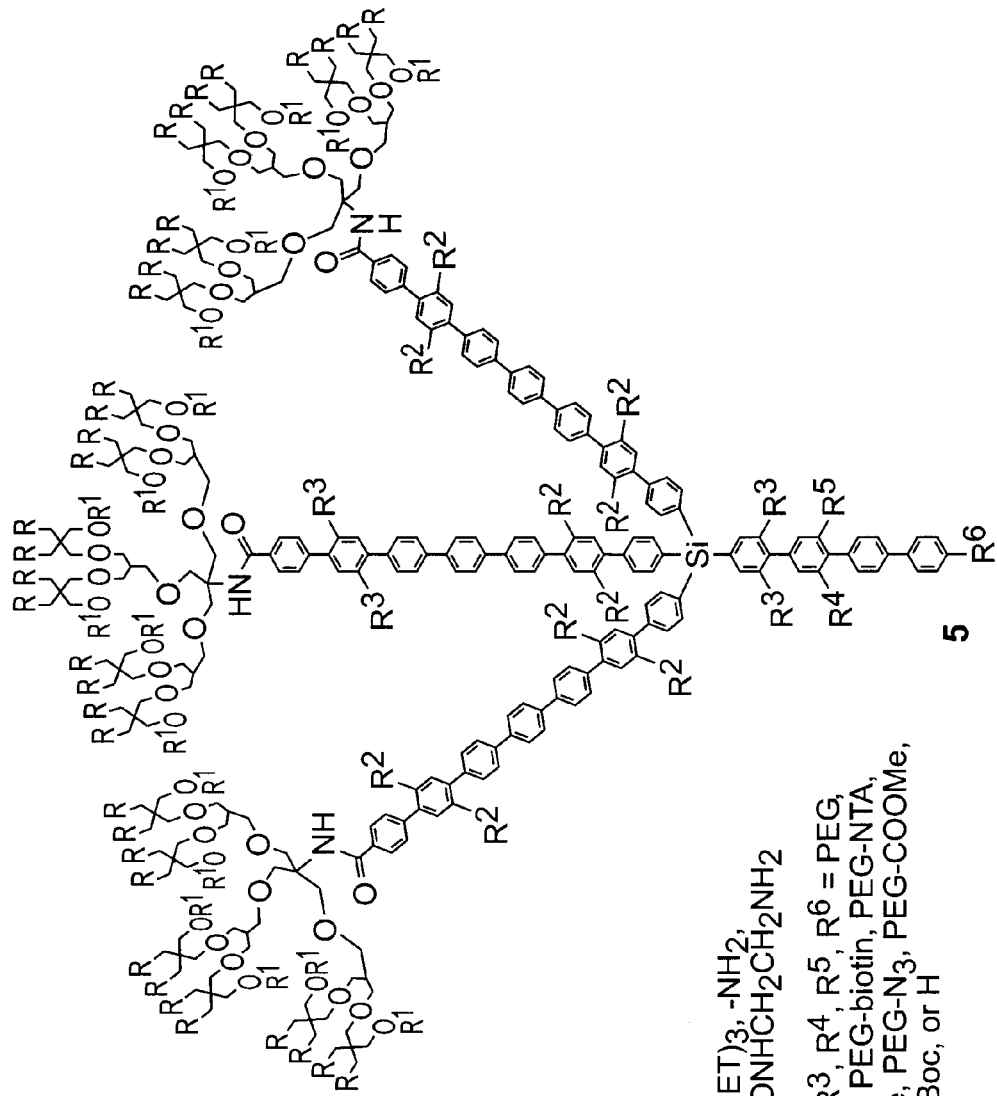

The second approach forms the basis of the chip-based technology for practical preparation of SMATs as to be described below. Specifically, the tip molecules 1 (FIG. 5) are deposited on a mica or flat gold surface with a sufficiently low concentration ensuring most of the molecules on the surface were well isolated, as shown in FIG. 9A. With an activated tip, AFM images of the surface are taken by fast scanning to avoid picking up the molecules. The tip is then located at a molecule, and kept in contact with it for a few seconds to allow formation of the amide bond with the molecule before pulling off the surface. This approach is similar to the one described in FIG. 9A. However, here the molecules 1 (FIG. 5) are isolated on the flat surface and the active group (NH$_2$) is at the terminal of the molecule. The chance for the tip to bond with only one molecule (1) is higher and the resulting SMAT is better defined than the one shown in FIG. 9A. However, the drawback of the present system is that it is very difficult to bond the molecule to the AFM tip. This is due to the presence of only one NH$_2$ group in 1 (FIG. 5) that can form a covalent bond with the activated tip, which requires a long contact time resulting in significant drift. Applicants anticipated this problem to be overcome by using the dendron 2 or 3 (FIG. 5) as the tip molecule that is terminated with multiple "sticky" groups—such molecules rapidly bind to the activated tip apex first via hydrogen bonding followed by formation of Si—O covalent bonds. The synthesis of 2 (FIG. 5) is eminent, and Applicants expect the synthesis of 3 (FIG. 5) soon after. One concern Applicants had involved the AFM tip and how easily it would pick up the sticky tip molecules during the first imaging for locating the isolated tip molecules. Applicants did find that, under normal scanning conditions, carbosilane dendron molecules physisorbed on mica could be picked up by the AFM tip, as indicated by lower image resolution during the subsequent scan. However, Applicants have demonstrated that fast scanning could eliminate this problem, and Applicants can easily obtain high resolution AFM images resolving individual carbosilane dendron molecules with up to 81 highly sticky SiCl$_3$ terminal groups. These hydrophobic carbosilane dendrons strongly interacted with the protein and hence are not suitable for use as tip molecules. Nevertheless, the above model studies clearly show that the approach using dendritic molecules designed for reducing non-specific interaction, such as 2, 3 (FIG. 5) and future generations of tip molecules such as found in FIG. 11, promise to be a reliable way to prepare high quality SMATs.

A major obstacle for application of SMATs in single molecule biochemistry or nanobiology is the lack of a reliable method to prepare uniform SMATs. Applicants have developed a chip-based technology for rapid and reproducible preparation of selected SMATs by AFM users. The protocol is outlined in FIG. 13. On the basis of our preliminary results, Applicants assert that development of this protocol into a routine procedure for AFM users to prepare and evaluate their own SMATs is feasible. It represents an ultimate solution to the supply of well-defined and specific SMATs to the community. In addition, the preparation is low cost since the chip can be reused many times. Since each modification step is followed by an evaluation step performed on the same chip as outlined below, the quality of the SMATs prepared by this technique is well controlled. The same standards are used for the evaluation, the results obtained with these tips are then comparable.

Figure 13:
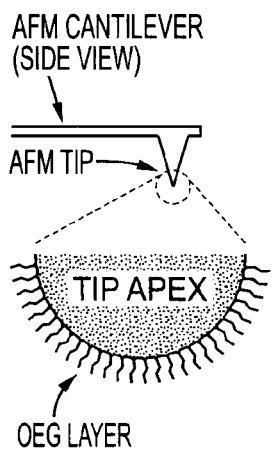
FIG. 13. Illustration of the chip-based technology for rapid, reproducible, and economical preparation of custom SMATs. The general procedure for attaching a tip molecule at the apex of an OEG-coated AFM tip (top left) is illustrated at the upper part of the figure (steps 1–5). All these steps are performed on a chip loaded on an AFM. The lower part of the figure shows the top view of the chip containing all necessary components for fabrication of a wide variety of SMATs: from regions A–E, an Au electrode (A) for step 1; a SAM presenting OH surface (B) for step 2; an array of a variety of tip molecules (C1–C12) for tethering to the activated AFM tip (step 3); region D contains an array of polymer brushes carrying $RNMe_2$ groups for catalyzing the completion of the covalent bonding of the molecule to the tip, and films presenting a high density of a binding partner (not shown) of the SMATs for evaluating the SMAT (step 4); and finally an array of empty wells (E) for custom deposition of reagents for attachment of other functional moieties to the SMAT (step 5). By moving the AFM cantilever sequentially to regions (A–E) as guided by an optical microscope, the preparation and evaluation of SAMTs are carried out rapidly and reliably. Since each SMAT takes only one tip molecule from the chip, the chip can be reused for many times.
Figure 13:
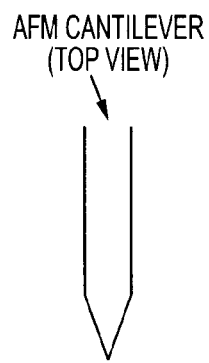
Figure 13:
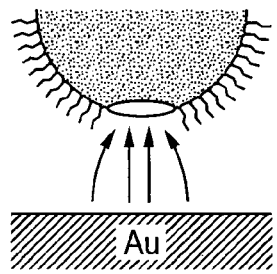
Figure 13:
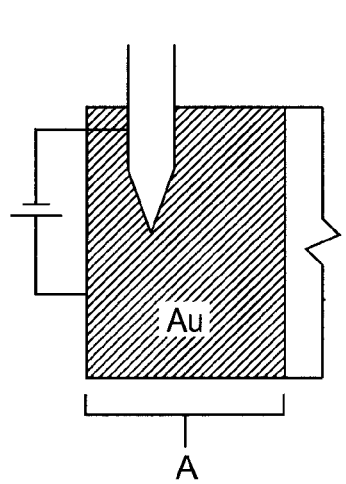
Figure 13:
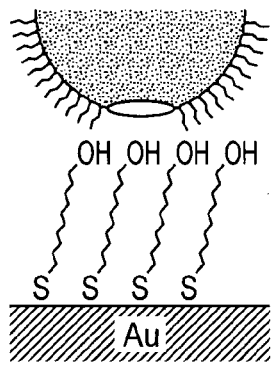
Figure 13:
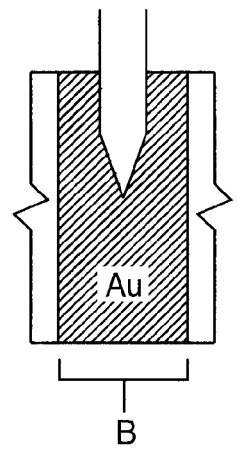
Figure 13:
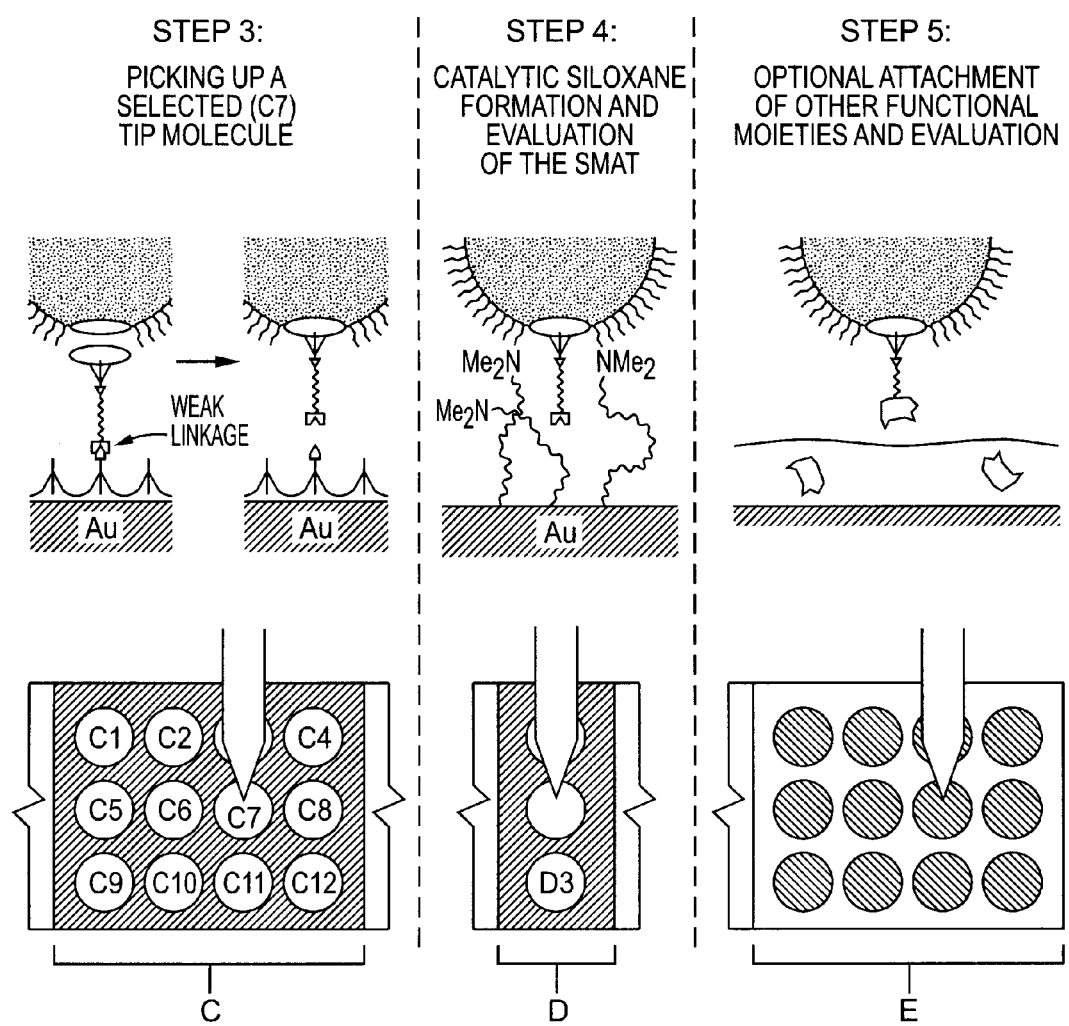

The procedure begins by coating commercial silicon AFM tips with a monolayer of suitable molecules. The coating process can be performed in a large scale as previously described. To prepare a SMAT, both a coated cantilever and a preparation chip (FIG. 13) are loaded to an AFM followed by the steps 1–5 carried out with the AFM as illustrated in FIG. 13.

Step 1 selectively generates an active spot at the tip apex, and the size of the spot is evaluated in step 2. The two steps are performed on the Au electrode (region A) and the OH-terminated SAM (region B, FIG. 12), respectively. The procedure is reliable (see Section C), and can be completed in a few minutes.

Step 3 is performed in region C containing an array of spots that are about 50 microns in diameter. With the markers and an optical microscope, the individual spots are easily located. Each spot presents the same dendron tip molecules that are isolated and tethered to the surface through a linker at the focal point of the dendron. The design of a variety of new dendron-based tip molecules is described in the next section. One of the new design elements is for the tethering the molecule on the chip surface via a weak linkage (FIG. 13, Step 3). When the molecule is picked up by the AFM tip and a strong bond between the two is established, the tip with the molecule is pulled off the chip surface and the weak linkage is broken. The breaking of the linkages leaves an active group such as (histidine)$_6$-Ni(II)-nitrilotriacetic acid (His$_6$-Ni-NAT) to the SMAT for site-specific bioconjugation. The single breakage event observed in the force-extension curve is used to verify the attachment of the single molecule.

After engaging the tip on the selected spot (e.g., C7 in FIG. 13), AFM images of a small area are taken by fast scanning to avoid binding the molecules. The tip is then located on a particle that is likely to be an isolated molecule. The molecule is then picked up using the fly-fishing mode (Reference FIG. 9). Advances in the design of tip molecules will contain units forming strong intramolecular hydrogen bonds that serve as internal gauche to ensure that the right molecule is picked up.

After step 3, the tip molecule first binds to the AFM tip apex via non-covalent interactions, e.g., multiple hydrogen bonding between the Si(OEt)$_3$ groups in the tip molecule and the surface silanol groups. This is followed by siloxane formation via condensation of the two groups. The condensation is greatly accelerated in the presence of amine. Hence, the tip is engaged to the spot (D2, FIG. 13) containing flexible (liquid-like) polymer brushes tethering a high density of RNMe$_2$ groups (FIG. 13, step 4), and the tip is kept in contact with the amine for some time to complete the condensation to form a robust SMAT. The SMAT is then evaluated in a spot containing a high density of its bind partner by examining its interaction with the surface through the characteristic force-extension curves.

The last step (step 5) is for custom derivatization of the SMAT. An array of a variety of reagents, such as acid and base, are tethered to the solid surface via a flexible linker (similar to ion exchange resin). The SMAT is brought in contact with the film to carry out single molecule reactions, such as cleavage of the flexible linker. When surface-bound reagents are not suitable, the derivatizaiton can be carried out in a well in the region E of the chip for custom deposition of a micro-droplet of reagent solution. The SMAT is brought in contact with the droplet for attaching other specialized functional moieties such as a DNA, enzyme, or ligand.

Figure 14:
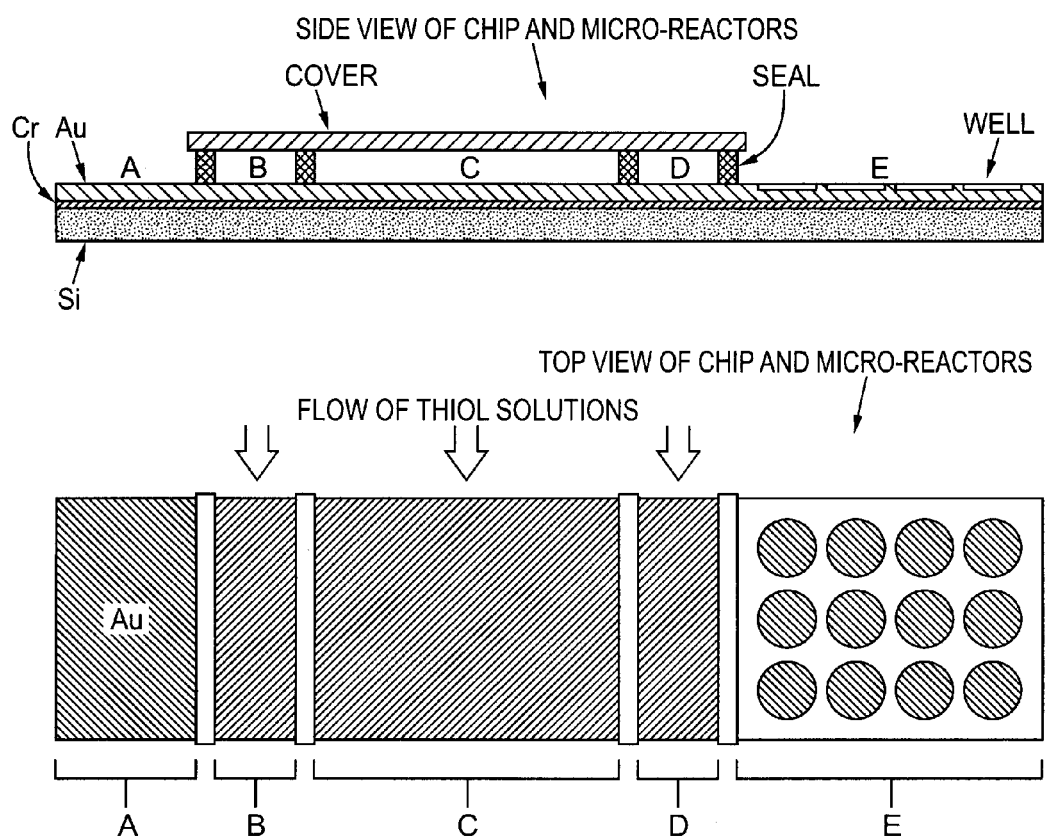
FIG. 14. Protocol for preparation of the SMAT-fabrication-chip. The chip is prepared on a silicon wafer. Part of the wafer (region E) contains an array of micro-wells (~50 μm in diameter) that are generated by standard micro-fabrication process. The rest of the wafer is coated with a gold film. Prior to growth of self-assembled monolayers (SAMs), the gold film is annealed to generate an atomically flat Au(111) surface. Different regions (A–D) on the surface are defined by a PTDMS stamp that also generates sealed compartments B–D. Three thiol solutions are then injected into the compartments to form the corresponding SAMs. In particular, the SAM in regions C contains diluted active groups for tethering tip molecules that are well isolated. After step 1, the stamp is removed, and the solutions of tip molecules and reagents are then spotted on the regions C and D to generate arrays of a variety of tip molecules and reagents. Upon washing out excess of reagents, the chip is ready to use. This spotting method has been intensively used in the preparation of biochips.
Figure 14:
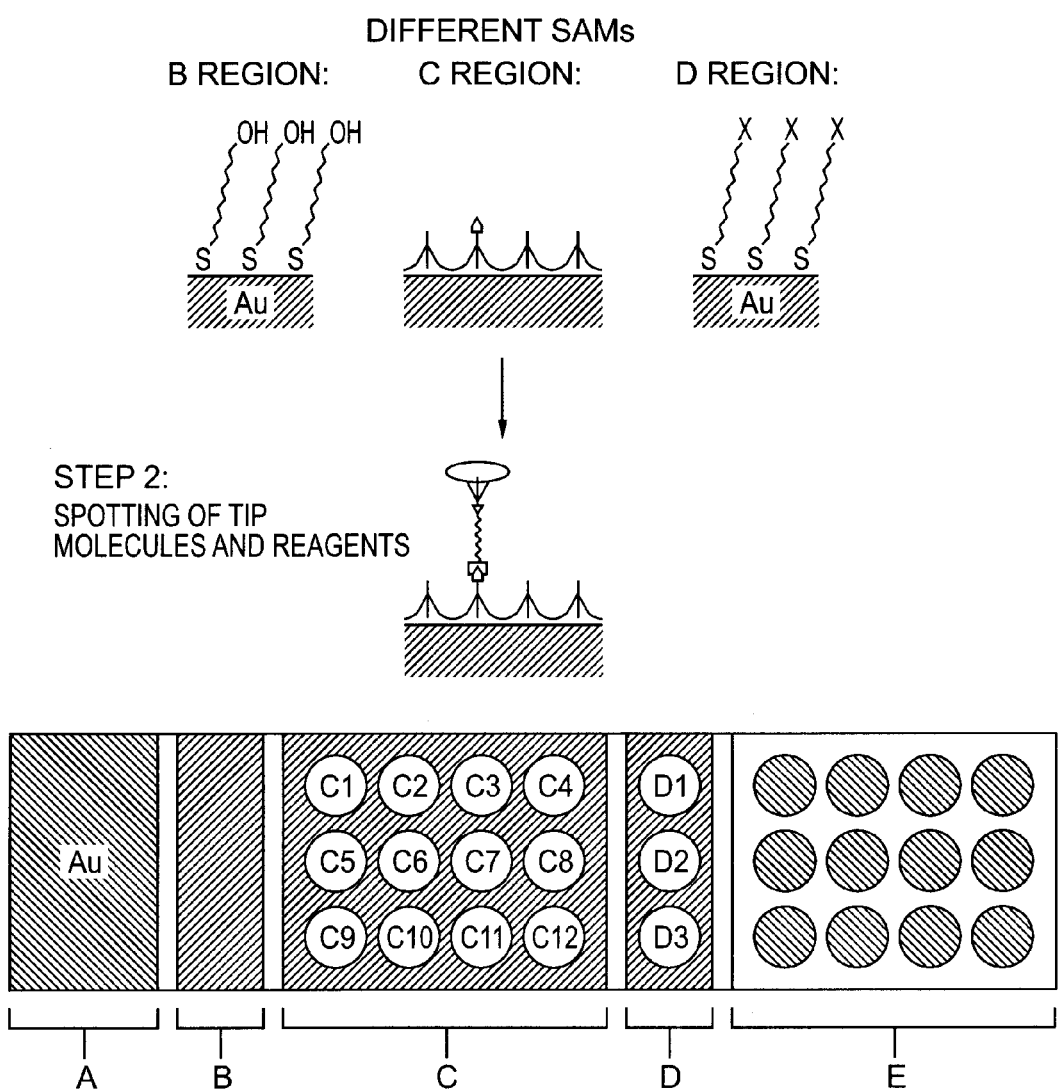

The long-term goal is to develop a technique for large-scale production of the above chips available to AFM users. The protocol is illustrated in FIG. 14. Overall, the array of tip molecules and reagents are prepared by spotting on several self-assembled monolayers (SAMs) of thiolates on a gold film. Regions B and D are for evaluation and derivatization of the tip. The two SAMs in regions B and D present a high density of active groups, e.g. —OH in B, and —NH$_2$ in D for attaching a variety of functional groups such as binding partner of SMATs, acid, and base. These SAMs are standard and quite easy to prepare, and the chemistry for subsequent derivatization is well-known. The most challenging task is to prepare region C where the tip molecules are located. Applicants choose Au(111) as the substrate surface, since the Si(OEt)$_3$ groups in the tip molecule do not interact with the surface, and atomically flat Au(111) surfaces with a wide terrace are quite easy to prepare to facilitate the localization of the large tip molecules by AFM. The tip molecules are tethered to the active groups on the SAM grown on region C, for example, Ni-NTA-functionalized tip molecules to (His)$_6$-tagged SAM [Dittrich, P. S. & Schwille, P. Photobleaching and stabilization of fluorophores used for single-molecule analysis with one- and two-photon excitation. *Appl. Phys. B-Lasers & Optics* 73, 829 (2001); Maher, R. C., Cohen, L. F. & Etchegoin, P. Single molecule photo-bleaching observed by surface enhanced resonant Raman scattering (SERRS). *Chem. Phys. Lett.* 352, 378 (2002)]; the NTA-Ni-(His)$_6$ complex are stable in the presence of thiol groups. A crucial requirement for this SAM is that the spacing between the (His)$_6$ groups has to be controlled so that the tethered tip molecules are sufficiently isolated to prevent attachment of more than one molecule to the AFM tip. To meet this requirement, Applicants have demonstrated a new concept for controlling the spacing between functional molecules in SAMs using a mixture of inert and functionalized dendrons as the adsorbates.

The tip molecules may aggregate through siloxane formation. This may lead to the attachment of more than one molecule to the AFM tip. For this reason, Applicants use Si(OEt)$_3$ instead of the more moisture-labile SiCl$_3$ and Si(OMe)$_3$ groups as the rim of the dendritic tip molecule. Also, the synthesis and deposition will be conducted with anhydrous solvents and in a nitrogen environment.

The storage and transportation may cause contamination of the chip. In particular, if nano-meter-sized particles with a polar surface are deposited on the chip, they may be picked up by the AFM tip. This problem may be solved by storing the chips in Teflon containers cleaned by H$_2$SO$_4$/H$_2$O$_2$/H$_2$O followed by NH$_3$/H$_2$O$_2$/H$_2$O solutions. Applicants have found that ultra-flat films stored in these containers remained nearly particle-free after 6 months.

During the pickup process, attachment of an immobilized tip molecule to an AFM tip may be hampered by drift and creeping. One way to reduce this problem is to speed up the pickup process using tip molecules possessing more sticky groups at the rim of the dendron. Also, using a long PEG linker should facilitate the molecule to remain in contact with the drifting tip, but the spacing between the tip molecules on the chip has to be adjusted accordingly to prevent dimerization. It is also possible to use a certain interaction force as a feedback control to compensate the drift and lock the location of the tip above the molecule.

Figure 15:
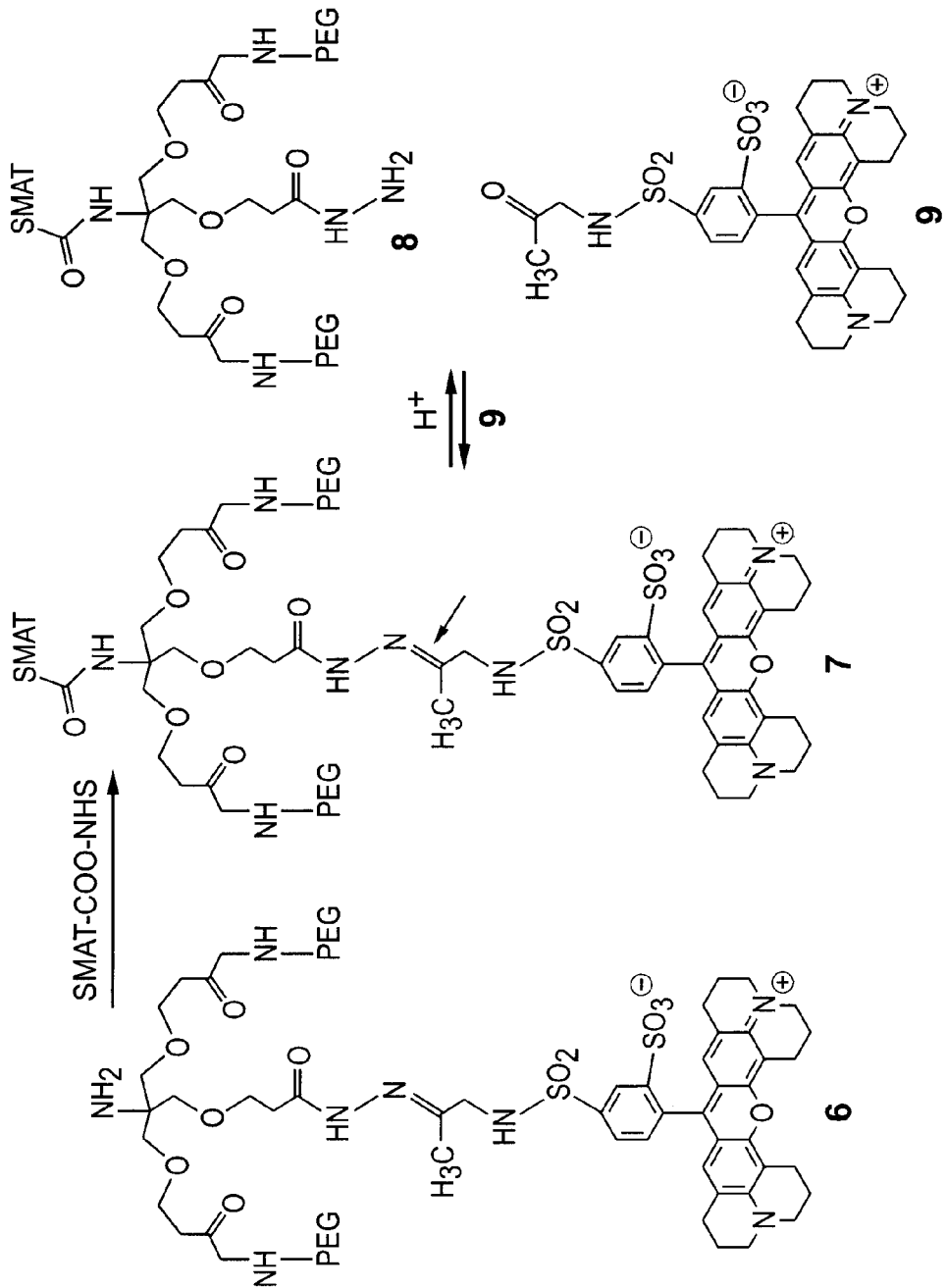
FIG. 15. Method for replacing bleached dyes
Figure 16:
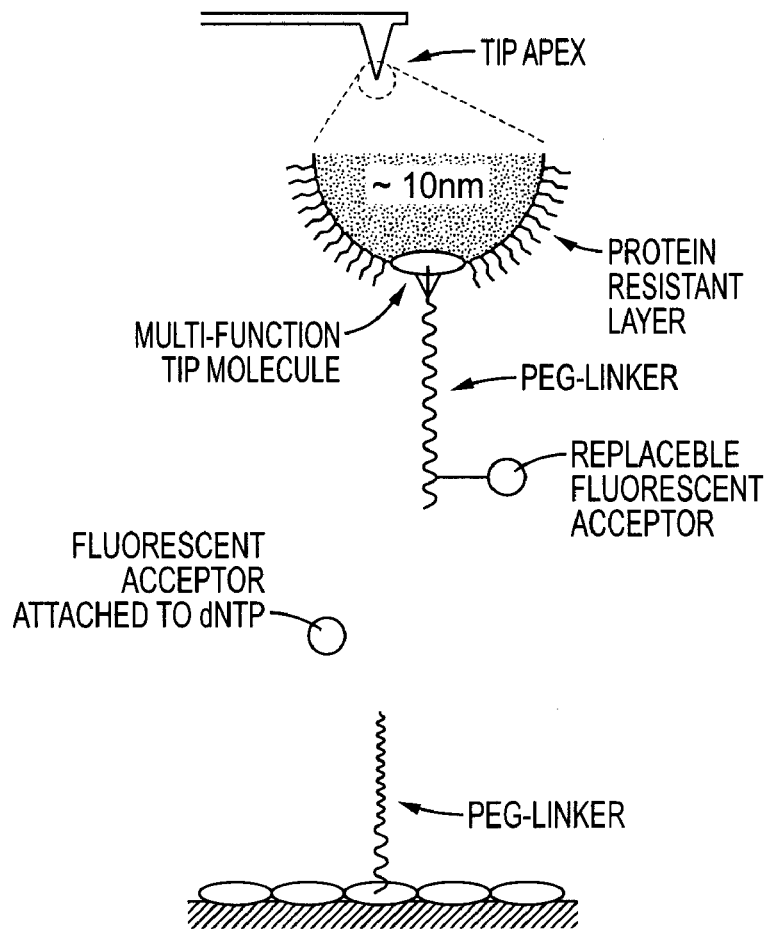
FIG. 16. Illustration of a system for performing pulling experiment with a polymerase molecule that is site-specifically linked to the SMAT and the dendron monolayer. The structure shown is the large fragment of Taq DNA polymerase I with an overlay of the open and close form (from the Cambridge Database). The arrow indicates the DNA template.

Photo-bleaching is the major concern for FRET-AFM [Hamann, H. F., Gallagher, A. & Nesbitt, D. J. Near-field fluorescence imaging by localized field enhancement near a sharp probe tip. *Appl. Phys. Lett.* 76, 1953 (2000); Azoulay, J., Debarre, A., Richard, A. & Tchenio, P. Quenching and enhancement of single-molecule fluorescence under metallic and dielectric tips. *Europhys. Lett.* 51, 374 (2000)]. To minimize and slow-down photo-bleaching, Applicants will identify suitable dyes that possess enhanced photo-stability. In addition, Applicants will use $O_2$ scavengers, since $O_2$ is the primary source of photochemical degradation of dyes in many systems [Hibner, U. & Alberts, B. Fidelity of DNA replication catalyzed in vitro on a natural DNA template by the T4 bacteriophage multi-enzyme complex. *Nature* 285, 300 (1980)]. Although these practices should prolong the lifetime of the SMATs designed for FRET-AFM, the single fluorophore in these SMATs may still be bleached easily. Therefore, it is highly desirable to develop methods that allow rapid replacement of the photo-bleached dye molecule in these SMATs so that the valuable SMATs can be reused. More importantly, the replacement should ideally be conducted in situ so that the same location of the sample can be studied using the same SMAT. Included in this invention is the use of a linkage, which can be cleaved and reformed under mild physiological conditions, to connect a fluorescent dye to a surface. Specifically, the use of an acid-labile linkage, hydrazone linkage, for this purpose is claimed. The linkage may also contain bio-compatible moiety such as PEG to mask the dye from contacting with the sample. As an example, the fluorescent reagent 6 (FIG. 15) is derived from the popular dye, Texas Red sulfonyl chloride (the lower part of 6, FIG. 15). Through a hydrazone linkage, the dye is linked to a tris base derivative with two PEG side chains to reducing the non-specific interaction of the dye. The molecule is conjugated to the carboxyl group(s) of a SMAT to form 7 (FIG. 15). After the dye is photo-bleached, it can be rapidly cleaved from 7 at the hydrazone linkage under mild acidic conditions (pH 4–5) to form 8 (FIG. 15). Since the hydrolysis of hydrazone derivatives is highly reversible, upon introduction of the dye derivative 9 (FIG. 15), the fluorescent SMAT 7 (FIG. 15) is regenerated. Applicants believe that this method for in situ replacement of the bleached fluorophores will find applications in single molecule studies with fluorescence microscopy.

Silicon Surface Modification

Research into the deposition of poly(ethylene glycol) [PEG] or oligo(ethylene glycol) [OEG] monoloayers onto flat silicon surfaces was initiated by using the reported methods for thermally [A. B. Sieval, V. Vleeming, H. Zuilhof, E. J. R. Sudhölter, *Langmuir* 1999, 15, 8288] or photo-induced hydrosilylation [R. L. Cicero, M. R. Linford, C. E. D. Chidsey, *Langmuir* 2000, 16, 5688], but the resulted films displayed a relatively high contact angle hysteresis (>50) and a low protein resistivity (>20% monolayer adsorption of fibrinogen). Applicants then developed a practical procedure for photo-induced surface hydrosilylation, in which only a small amount of the alkenes without solvent is used for coating a 1×1 $cm^2$ wafer under a 254 nm UV-lamp. The method developed has been described in detail and may be found in the Examples section below. The developed procedure improves the quality of the EG films. The improved quality is the result of the use of a small amount of EG derivatives which facilitates the removal of the trapped water even under a moderate vacuum (3 milliTorr).

Figure 19:
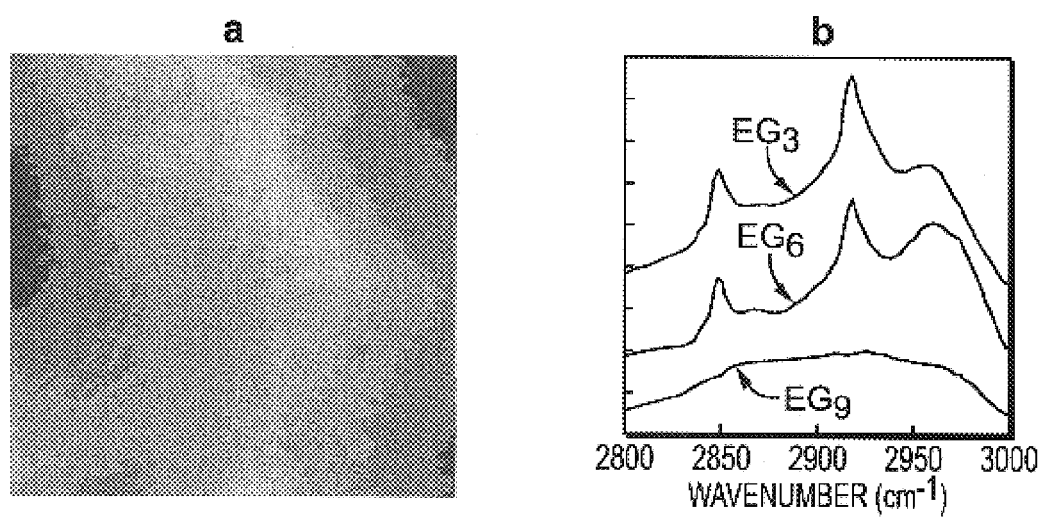
FIG. 19. Tapping-mode AFM image (1×1 µm², 10 nm contrast) of a $EG_9$ film (a) and FTIR-ATR spectra (2800–3000 cm$^{-1}$) of $EG_3$, $EG_6$ and $EG_9$ films (b) on Si(111).

The advancing/receding contact angles $(\theta_a/\theta_r)$ of water were 59°/56° for the $EG_3$ films, substantially higher than the values of 49°/46° for both $EG_6$ and $EG_9$ films (Table 3). Both contact angles and hysteresis $(\Delta\theta)$ of the $EG_3$ films are lower than those of $EG_3$-terminated thiolate self-assembled monolayers (SAMs) on Au or Ag $(\theta_a/\theta_r: 62/52°)$ [K. L. Prime, G. M. Whitesides, *J. Am. Chem. Soc.* 1993, 115, 10714; P. Harder, M. Grunze, R. Dahint, G. M. Whitesides, P. E. Laibinis, *J. Phys. Chem. B* 1998, 102, 426]. The low $\Delta\theta(\sim3°)$ for all films indicates smooth and homogeneous surfaces. This is confirmed by the AFM images, e.g., FIG. 19*a*, showing the atomic steps of the underlying substrate surface. The ellipsometric thickness (Table 3) of the $EG_3$, $EG_6$, and $EG_9$ films were in good agreement with the estimated thickness of 22, 29 and 37 Å for the monolayers with all trans methylene chains tilted ~45° from the surface and helical OEG chains oriented normal to the surface [M. R. Linford, P. Fenter, P. M. Eisenberger, C. E. D. Chidsey, *J. Am. Chem. Soc.* 1995, 117, 3145; P. Harder, M. Grunze, R. Dahint, G. M. Whitesides, P. E. Laibinis, *J. Phys. Chem. B* 1998, 102, 426]. The absorbances in the FTIR-ATR spectra (FIG. 19*b*) of the EG films include those at ~2965 ($CH_3$ asymmetric stretch), ~2930 ($OCH_2$ asymmetric stretch), ~2930 ($OCH_2$ asymmetric stretch), 2918 (alkyl $CH_2$ asymmetric stretch), ~2870 ($OCH_2$ symmetric stretch), 2849 (alkyl $CH_2$ symmetric stretch), and ~2810 $cm^{-1}$ ($CH_3$ symmetric stretch), consistent with those for the EG-terminated thiolate films on Au and Ag [P. Harder, M. Grunze, R. Dahint, G. M. Whitesides, P. E. Laibinis, *J. Phys. Chem. B* 1998, 102, 426]. For the $EG_3$ and $EG_6$, films, both the alkyl $CH_2$ stretches at 2918 and 2849 $cm^{-1}$ indicate a highly ordered environment for the methylene chains [R. G. Synder, M. Maroncelli, H. L. Strauss, V. M. Hallmark, *J. Phys. Chem.* 1986, 90, 5623]. Research demonstrated that increasing the number of EG units from 6 to 9 results in broadening of all bands in the C—H stretching region and the appearance of a very broad

TABLE 3

Advancing and receding contact angles of water
$(\theta_a/\theta_r, °)$ and ellipsometric thicknesses
$(T_e, Å)$ for $EG_3$, $EG_6$, and $EG_9$ films on Si(111)
before and after treatment with a fibrinogen solution

| Absorbate | Before protein adsorption | | After protein adsorption | |
|---|---|---|---|---|
| | $\theta_a/\theta_r, °$ | $T_e, Å$ | $\theta_a/\theta_r, °$ | $T_e, Å$ |
| $EG_3$ | 59/56 | 23 | 80/20 | 65 |
| $EG_6$ | 49/46 | 27 | 52/47 | 30 |
| $EG_9$ | 49/46 | 33 | 50/46 | 34 | absorbance (FIG. 19*b*), similar to those reported for poly (ethylene glycol) (PEG) films [X.-Y. Zhu, D. R. Staarup, R. C. Major, S. Danielson, V. Boiadjiev, W. L. Gladfelter, B. C. Bunker, A. Guo, *Langmuir* 2001, 17, 7798]. Vanderah et al. showed that, for the OEG thiolate SAMs on Au(111), broadening of bands in this region correlates with less ordered OEG chains [D. J. Vanderah, G. Valincius, C. W. Meuse, *Langmuir* 2002, 18, 4674]. The conformations (helical vs. non-helical) and ordering of OEG chains can be probed by the bands in the 950–1400 cm$^{-1}$ region for thiolate SAMs on Au or Ag [P. Harder, M. Grunze, R. Dahint, G. M. Whitesides, P. E. Laibinis, *J. Phys. Chem. B* 1998, 102, 426; D. J. Vanderah, G. Valincius, C. W. Meuse, *Langmuir* 2002, 18, 4674]. However, this method failed in the system due to the strong background adsorption in this region.

Figure 20:
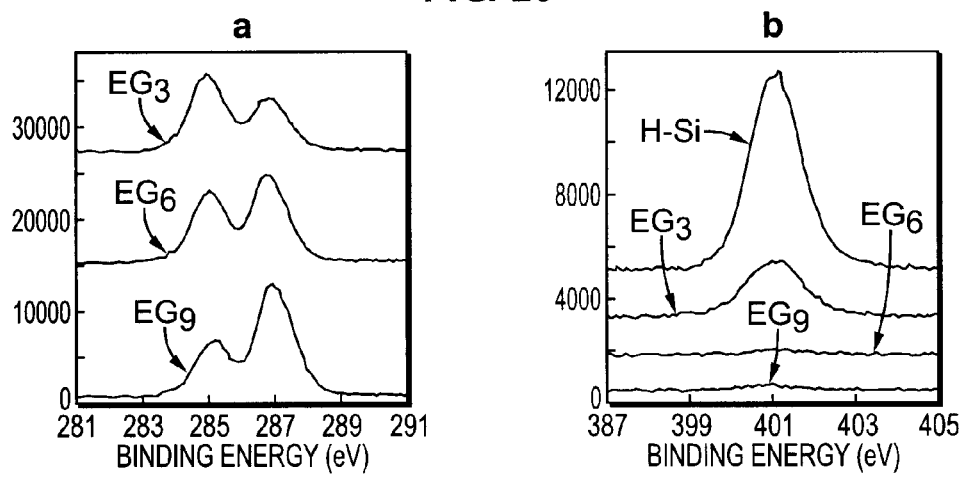
FIG. 20. XPS of films derived from $EG_3$, $EG_6$, and $EG_9$ on Si(111): C 1 s region before (a) and N 1s region after (b) immersion in protein solution.

The carbon 1 s narrow-scan X-ray photoelectron spectra (XPS) of the films show two C 1s peaks (FIG. 20a). The one at higher binding energy (~287 eV) is assigned to the carbon atoms that are adjacent to an oxygen atom, and the one at ~285 eV is assigned to the rest of the carbon atoms. The ratios of the integrated areas of the deconvoluted C 1s signals of the films between two types of carbon atoms— those adjacent to an oxygen atom (C—O, 287 eV) and those not (C—C, 285 eV)—are in good agreement with the expected ratios: 7:10 vs 8:10 for EG$_3$; 13:10 vs 14:10 for EG$_6$; 20:10 vs 20:10 for EG$_9$. In addition, the relative intensity of C 1s peaks for EG$_3$/EG$_6$/EG$_9$ is 0.7:0.9:1, close to the expected value (0.6:0.8:1).

To examine the protein adsorption properties, the films were immersed in a 0.1% solution of fibrinogen in 0.01 M phosphate-buffered saline (PBS) at pH 7.4 and 20–25° C. for 1 hour. The samples were then washed several times with Millipore water for removal of non-adsorbed protein and salts, followed by drying with a stream of N$_2$. For comparison, a freshly prepared H—Si(111) substrate was also subjected to the above conditions. As expected, fibrinogen readily absorbed on the hydrophobic H—Si(111) surface, resulting in a film with an ellipsometric thickness of 60 Å and $\theta_a/\theta_r$ (H$_2$O) of 80°/20°, corresponding to a monolayer of fibrinogen [The size of the protein is ~60×60×450. Å. M. Malmsten, B. Lassen in *Proteins at Interfaces II* (Eds.: T. A. Horbett, J. L. Brash), American Chemical Society, Washington D.C., 1955, 228]. In contrast to the corresponding EG$_3$-terminated thiolate SAMs on Au that reduce adsorption of fibrinogen to 2% of monolayer [K. L. Prime, G. M. Whitesides, *J. Am. Chem. Soc.* 1993, 115, 10714; P. Harder, M. Grunze, R. Dahint, G. M. Whitesides, P. E. Laibinis, *J. Phys. Chem. B* 1998, 102, 426], and the EG$_3$-modified silicon AFM tips that reduced the nonspecific adhesion forces with proteins by 3–6 times [C. M. Yam, Z. Xiao, J. Gu, S. Boutet, C. Cai, *J. Am. Chem. Soc.* 2003, 125, 7498], the EG$_3$ layers on silicon (111) still absorbed substantial amounts of the protein as shown by a large decrease of water contact angles (Table 3) and a large increase of ellipsometric thickness (~40 Å) corresponding to 60% monolayer. Applicants also measured the surface density of the absorbed protein by XPS (FIG. 20b) that is more sensitive than ellipsometry. Assuming a full monolayer adsorption of fibrinogen on H—Si(111), the ratio ($I_{EG}/I_{HSi}$) of the integrated areas of the N 1 s peaks at ~401 eV arisen from the absorbed protein on the EG films ($I_{EG}$) and H—Si(111) ($I_{HSi}$) corresponds to the degree of protein adsorption on the OEG surfaces. This method gives 30% monolayer adsorption of fibrinogen on the EG$_3$ films. The higher value measured by ellipsometry may be due to the errors associated with the adsorption of water and the change of reflective index of the films upon protein adsorption. The lower protein resistance for the corresponding EG$_3$ films on Si(111) than on Au(111) surfaces may be due to the larger spacing between the alkyl chains on Si(111). Theoretical and experimental results have shown that the optimal packing density is 0.5–0.55 alkyl chains per surface silicon on Si(111) surface [M. R. Linford, P. Fenter, P. M. Eisenberger, C. E. D. Chidsey, *J. Am. Chem. Soc.* 1995, 117, 3145; R. L. Cicero, M. R. Linford, C. E. D. Chidsey, *Langmuir* 2000, 16, 5688; A. B. Sieval, B. van den Hout, H. Zuilhof, E. J. R. Sudhölter, *Langmuir* 2001, 17, 2172]. Using the XPS and thickness data and the reported equation [R. L. Cicero, M. R. Linford, C. E. D. Chidsey, *Langmuir* 2000, 16, 5688], it was estimated that the coverage of our EG$_3$, EG$_6$ and EG$_9$ films to be about 0.37–0.39 molecules per surface Si-atom, substantially lower than that of the OEG thiolate SAMs on Au(111) (33.6 vs 21.3 Å$^2$/molecule) [M. R. Linford, P. Fenter, P. M. Eisenberger, C. E. D. Chidsey, *J. Am. Chem. Soc.* 1995, 117, 3145; P. Harder, M. Grunze, R. Dahint, G. M. Whitesides, P. E. Laibinis, *J. Phys. Chem. B* 1998, 102, 426]. The low density of the EG$_3$ films on Si(111) may facilitate the penetration of the protein through the short OEG layer into the hydrophobic alkyl layer, thus increase the adsorption of the protein. Prolonging the OEG chain was theorized to improve the protein resistance. Indeed, the EG$_6$ and EG$_9$ films almost completely resisted the adsorption of fibrinogen, as shown by the small increase of thickness (3 Å and 1 Å) and the nearly unchanged contact angles (Table 3). XPS measurements also show that both the EG$_6$ and EG$_9$ films on Si(111) resisted ~97% of protein adsorption, comparable to the EG-terminated thiolate SAMs on Au (111) which also displayed increasing protein resistance with longer OEG chain length [K. L. Prime, G. M. Whitesides, *J. Am. Chem. Soc.* 1993, 115, 10714; B. Zhu, T. Eurell, R. Gunawan, D. Leckband, *J. Biomed. Mater. Res.* 2001, 56, 406].

The Applicants also prepared another absorbate, namely EG$_7$, in an efficient way (see Examples). Compared to EG$_3$ and EG$_6$, films derived from EG$_7$ are more efficient in resisting non-specific adsorption of proteins. EG$_7$ is also more economical to prepare than EG$_9$, and both possess a similar resistivity to protein adsorption. The following summarizes the results obtained with films prepared from EG$_7$ using the same method.

Characterization and Protein Resistance of the EG$_7$ films on Si(111). The advancing/receding contact angles of water ($\theta_{a/r}$) for the EG$_7$ films were 49°/47°, comparable to those for EG$_6$ and EG$_9$ films. The low hysteresis ($\Delta\theta$=2–3°) for the films indicates smooth and homogeneous surfaces. The ellipsometric thickness of the films was in good agreement with the estimated thickness of 32 Å for the monolayers with all trans methylene chains tilted ~45° from the surface and helical OEG chains oriented normal to the surface. The carbon 1 s narrow-scan X-ray photoelectron spectra (XPS) of the EG$_7$ films show two C 1 s peaks, similar to those of the EG$_3$, EG$_6$ and EG$_9$ films. The one at higher binding energy (~287 eV) is assigned to the carbon atoms that are adjacent to an oxygen atom, and the one at lower binding energy (~285 eV) is assigned to the rest of the carbon atoms. The ratios of the integrated areas of the deconvoluted C 1s signals of the films between two types of carbon atoms— those adjacent to an oxygen atom (C—O, 287 eV) and those not (C—C, 285 eV)—are in good agreement with the expected ratios: 15.6:10 vs 16:10. We measured the surface density of the adsorbed protein by XPS that is more sensitive than ellipsometry. Assuming a full monolayer adsorption of fibrinogen on H—Si(111), the ratio ($I_{EG}/I_{HSi}$) of the integrated areas of the N 1 s peaks at ~401 eV arisen from the adsorbed protein on the EG films ($I_{EG}$) and H—Si(111) ($I_{HSi}$) corresponds to the degree of protein adsorption on the OEG surfaces. The EG$_7$ films almost completely resisted the adsorption of fibrinogen. Although ellipsometry measurements did not show any protein adsorption, XPS measurements show that the $EG_7$ films on Si(111) resisted ~98% of protein adsorption, comparable to the $EG_9$ films.

Stability Tests of $EG_7$ Films on H—Si(111)

The Applicants have preformed stability tests (Table 4) for $EG_9$ and $EG_7$ films on H—Si(111) under a wide variety of conditions such as in water (100° C.), PBS buffer at pH 7.4 and 9 (r.t., 37° C.), acid (r.t., 100° C.), and base (r.t., 100° C.). Specifically, both films were not damaged even after immersion in $H_2O$ and 2.5 M $H_2SO_4$ at 100° C. for 1 hour, as indicated by nearly the same values of $\theta_{a/r}$ and $T_e$ of the films. More importantly, the films were also stable under physiological conditions (PBS buffer, pH=7.4, 37° C.). After immersion in PBS at room temperature for 1 week and at 37° C. for 1 day, $\theta_{a/r}$ and $T_e$ of the films remained unchanged. The films were also stable under strong acidic conditions and moderate basic conditions, although they began to deteriorate after 1 day immersion in 1 M NaOH.

TABLE 4

Physical Properties of EG films on Si(111) Before and After Stability Tests

| EG films | stability test | $\theta_{a/r}$ (deg) | $T_e$ (Å) |
|---|---|---|---|
| $EG_9$ | initial | 49/46 | 33 |
|  | 1 day air/r.t. | 49/46 | 34 |
|  | 1 h $H_2O$/100° C. | 49/46 | 34 |
|  | 1 h 2.5 M $H_2SO_4$/100° C. | 48/45 | 32 |
| $EG_7$ | initial | 49/47 | 29 |
|  | 1 day air/r.t. | 49/47 | 29 |
|  | 1 week air/r.t. | 51/49 | 28 |
|  | 1 week PBS buffer/r.t. | 48/46 | 28 |
|  | 1 day PBS buffer/37° C. | 49/47 | 29 |
|  | 3 day pH 9/r.t. | 48/46 | 29 |
|  | 1 day pH 9/37° C. | 49/47 | 30 |
|  | 1 day 2.5 M $H_2SO_4$/r.t. | 48/45 | 28 |
|  | 1 h 1 M NaOH/r.t. | 47/44 | 27 |
|  | 1 day 1 M NaOH/r.t. | 60/30 | 23 |
|  | 1 h 1 M NaOH/50° C. | 50 | 18 |

$EG_7$ Films on H—Si(111) vs H—Si(100)

Table 5 displays the physical properties of the $EG_7$ films on both H—Si(111) and H—Si(100) surfaces prepared by photo-activated hydrosilylation with varied reaction time. Upon exposure to UV-254 nm radiation under ~0.1 mTorr for 30–60 min, the $EG_7$ films on H—Si(111) exhibited $f_{a/r}$=49°/47° and $T_e$=29 Å. Under the same radiation conditions, the $EG_7$ films on H—Si(100) gave $\theta_{a/r}$=51°/46° and $T_e$=21 Å, indicating that the deposition was not completed. Prolonging the exposure time to 60–120 min resulted in $\theta_{a/r}$=49°/47° and $T_e$=27 Å, which are comparable to the films on Si(111). The optimal time of UV-radiation on Si(111) and Si(100) substrate surfaces are different, probably due to their different surface structures. 40% aqueous $NH_4F$ treatment of a Si(111) wafer provides the atomically flat H—Si(111), whereas dilute aqueous HF treatment of a Si(100) wafer yields the (100) dihydride capped silicon surface. Under the respective optimal UV-radiation conditions, the $EG_7$ films on both H—Si(111) and H—Si(100) surfaces exhibited similar resistance to protein adsorption, as shown by the insignificant change of thickness and contact angle after a 1 h immersion in 0.1% solution of fibrinogen in 0.01 M PBS at pH 7.4 and 20–25° C.

TABLE 5

Physical Properties of EG7 films Grown on H—Si(111) and H—Si(100) by Photo-activated Hydrosilylation with UV-254 nm Radiation under Different Period of Time

| film | reaction time (min) | before protein adsorption | | after protein adsorption | |
|---|---|---|---|---|---|
|  |  | $\theta_{a/r}$ (deg) | $T_e$ (Å) | $\theta_{a/r}$ (deg) | $T_e$ (Å) |
| $EG_7$/H—Si(111) | 30–60 | 49/47 | 29 | 49/46 | 29 |
| $EG_7$/H—Si(100) | 30 | 51/46 | 21 | 80 | 60 |
|  | 60 | 49/47 | 27 | 48/45 | 28 |
|  | 120 | 48/46 | 27 | 49/45 | 30 |

In conclusion, atomically flat and homogenous alkyl layers presenting OEG can be readily prepared on H—Si (111) surfaces by photo-induced hydrosilylation of OEG-terminated alkenes using our procedure. The films with more than six EG units reduced adsorption of fibrinogen to ~3% monolayer. Applicants expect that the protein resistance of these films can be further improved by increasing the coverage of the films, accomplishable through reduction of the oxygen and water contents by increasing the vacuum of the system. This method will find application in devices employing silicon as a platform for fabrication of the devices where the platform is in contact with the biological samples.

Moreover, the present invention is not limited to Si(111) surfaces. Applicants have also modified other H-terminated silicon substrates, such as porous silicon, with OEG monolayers.

EXAMPLES

The following examples are provided to illustrate the present invention. The examples are not intended to limit the scope of the present invention and they should not be so interpreted. Amounts, if any, are in weight parts or weight percentages unless otherwise indicated.

Scanning Probe Microscope Tips

Example 1

A1. Synthesis of Tip Molecules 1

The tip molecules 1 (FIG. 5) are poly(ethylene glycol) (PEG) end-capped with a sticky head group (e.g. $NH_2$ group) and a functional group. They are readily synthesized by standard conjugation chemistry. For example, compounds 1a–d (Scheme 1) are synthesized from PEG-560 and PEG-1450 following the steps shown in Scheme 1. As an example, the procedure for the synthesis of 1b is given below.

Scheme 1. Synthesis of 1a–d.

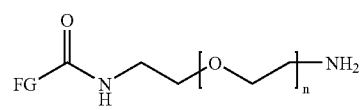

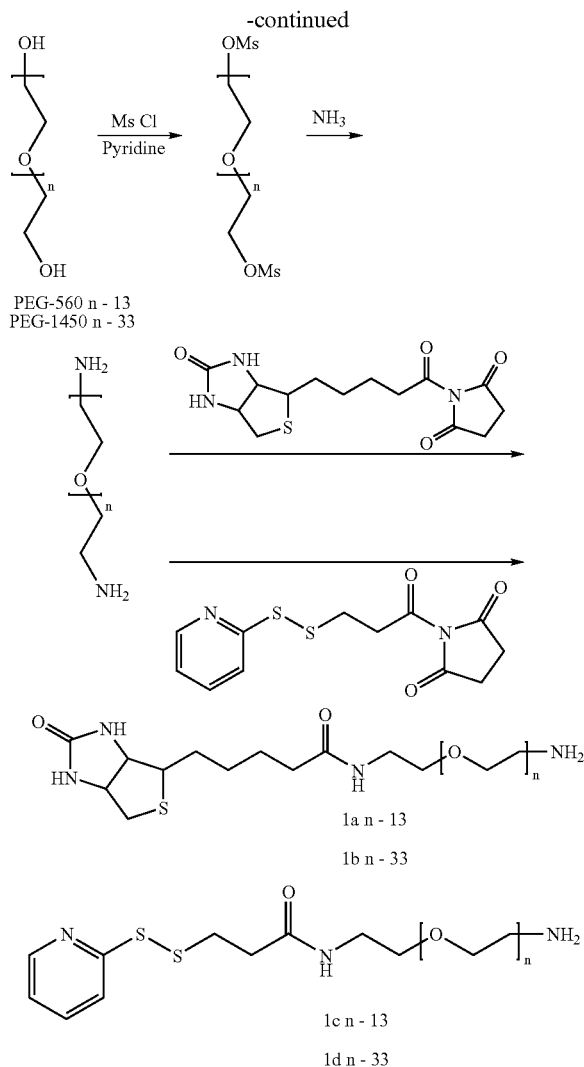

PEG-560 n - 13
PEG-1450 n - 33

1a n - 13
1b n - 33

1c n - 13
1d n - 33

Synthesis of NH$_2$-PEG-NH$_2$

A 100 mL round bottom flask, equipped with a magnetic stir bar, distillation head, condenser and receiver flask, was charged with of poly(ethylene glycol) (MW~1450, PEG-1450) (3.02 g, 2.07 mmol) and dry toluene (30 mL) under N$_2$. The mixture was stirred at 120° C., and about one third of the toluene was distilled out. The solution was then allowed to cool to room temperature, and the distillation head, condenser and receiver flask were removed. The solution was cooled to 0° C. in an ice bath prior to the addition of anhydrous CH$_2$Cl$_2$ (6 mL), N,N,N',N'-tetramethylpropanediamine (0.81 g, 6.21 mmol) and mesylchloride (0.71 g, 6.21 mmol). The reaction mixture was stirred overnight at room temperature. The mixture was vacuum filtered to eliminate the precipitate, and the filtrate was concentrated in vacuo. The residue was transferred to a Nalgene bottle and stirred with an aqueous NH$_4$OH solution (28–30%, 15 mL) for 3 days. The solvent was evaporated in vacuo. The residue was purified by flash column chromatography (silica gel, MeOH/NH$_4$OH 9:1) to yield 1.5 g (50%) of NH$_2$-PEG-NH$_2$ as a light yellow solid.

$^1$H NMR (300 MHz, CDCl$_3$): 2.85 (t, 4H, J=4.8 Hz), 3.49 (t, 4H, J=4.5 Hz), 3.63 (m, ~122H).

MALDI-TOF-MS (m/z): M$^+$ average calcd: 1448; average found: 1454.

Biotin-N-hydrosuccinimide ester (NHS-biotin)

Biotin (800 mg, 3.27 mmol) and N-hydrosuccimide (480 mg, 4.17 mmol) were added to a round bottom flask already charged with dry DMF (8 mL). In another flask, DCC (640 mg, 3.10 mmol) was dissolved in dry DMF (2 mL). The DCC solution in DMF was then added to the biotin solution with a syringe, and the mixture was stirred at room temperature overnight. The mixture was vacuum filtered. The filtrate was concentrated in vacuo and precipitated with ether. The product was then filtered and dried under vacuum to give NHS-biotin as a white powder (0.85 g, 77%). $^1$H NMR (300 MHz, d$_6$-DMSO): 6.44 (s, 1H, NH), 6.38 (s, 1H, NH), 4.30 (m, 1H, —CHCH2S—), 4.14 (m, 1H, —CHCHS—), 3.10 (m, 1H, —CHCHS—), 2.81 (s, 4H, —COCH$_2$CH$_2$CO—), 2.74 (d, 1H, J=11.4 Hz, one of —CHCH$_2$S—), 2.69 (t, 2H, J=7 Hz, —CH$_2$COO—), 2.57 (d, 1H, J=11.1 Hz, one of —CHCH$_2$S—), 1.62 (m, 4H, —CH$_2$CH$_2$CH$_2$CH$_2$CO—), 1.43 (m, 2H, —CHCH$_2$CH$_2$CH$_2$CH$_2$CO—).

NH$_2$-PEG-biotin (1b)

NHS-biotin (77 mg, 0.26 mmol) and PEG-diamine (300 mg, 0.207 mmol) were added to a round bottom flask already charged with dry DMF (5 mL) and Et$_3$N (145 mg, 1.43 mmol). The reaction mixture was stirred at room temperature overnight. The solvent was evaporated in vacuo and the crude product was purified by flash column chromatography (silica gel, MeOH/NH$_4$OH 9:1). $^1$H NMR (300 MHz, CDCl$_3$): 6.82 (s, 1H, NH), 5.82 (s, 1H, NH biotin), 5.19 (s, 1H, NH biotin), 4.51 (m, 1H, CHCH$_2$S), 4.33 (m, 1H, CHCHS), 3.87 (m, 2H, CONHCH$_2$CH$_2$O), 3.4–3.6 (broad s, PEG and CH$_2$CH$_2$NH$_2$), 2.8–2.9 (CH$_2$CH$_2$NH$_2$ and CHCH$_2$S overlapped with signals from impurities), 2.23 (t, 2H, J=7.2 Hz, CH$_2$CONH), 1.70 (m, 4H, CH$_2$CH$_2$CH$_2$CH$_2$CO), 1.45 (m, CHCH$_2$CH$_2$CH$_2$CH$_2$CO). MALDI-TOF-MS (m/z): M+average calcd: 1674; average found: 1658.

Example 2

A2. Synthesis of Tip Molecules 2

The tip molecules 2 (FIG. 5) consisting of a polyether dendron with many surface active groups and a PEG linker with a functional terminal group (e.g., 1a–d). The two parts are synthesized separately and will be joined by amide bond formation as outlined in Scheme 2.

Polyether dendrons were first described by Frechet's group. Applicants followed the general methods developed by them (Grayson, S. M.; Frechet, J. M. J. J. Am. Chem. Soc. 2000, 122, 10335) for the synthesis of the dendron precursors such as (BnO)$_8$-[G-3]—OH (Scheme 2) The unique feature in our design of 2 (FIG. 5) is the incorporation of surface-active ("sticky") groups to the periphery of the Frechet-type dendrons. An example of the synthesis of such compounds is given below.

General: All air or water-sensitive reactions were carried out under a dry nitrogen atmosphere using Schlenk technique. Solvents were generally dried and distilled prior to use. Flash chromatography was carried out on silica gel (200–400 mesh from Natland International Corp.). All $^1$H and $^{13}$C NMR spectra were recorded in deuterated chloroform using residual chloroform as internal standard.

Methallyl dichloride (Aldrich), benzyl alcohol (Aldrich), sodium hydride (Aldrich), 0.5 M 9-BBN solution in THF (Aldrich) and 30% hydrogen peroxide (Aldrich) were used as received.
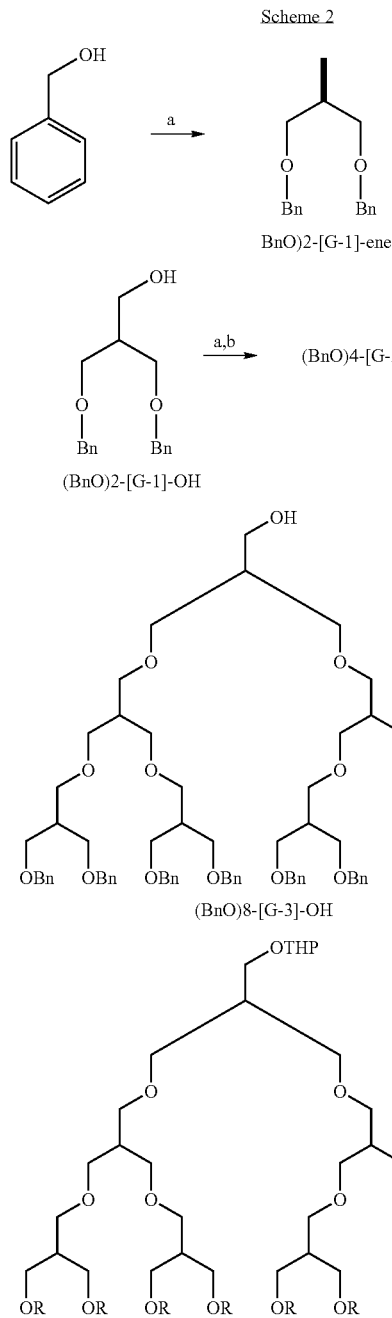
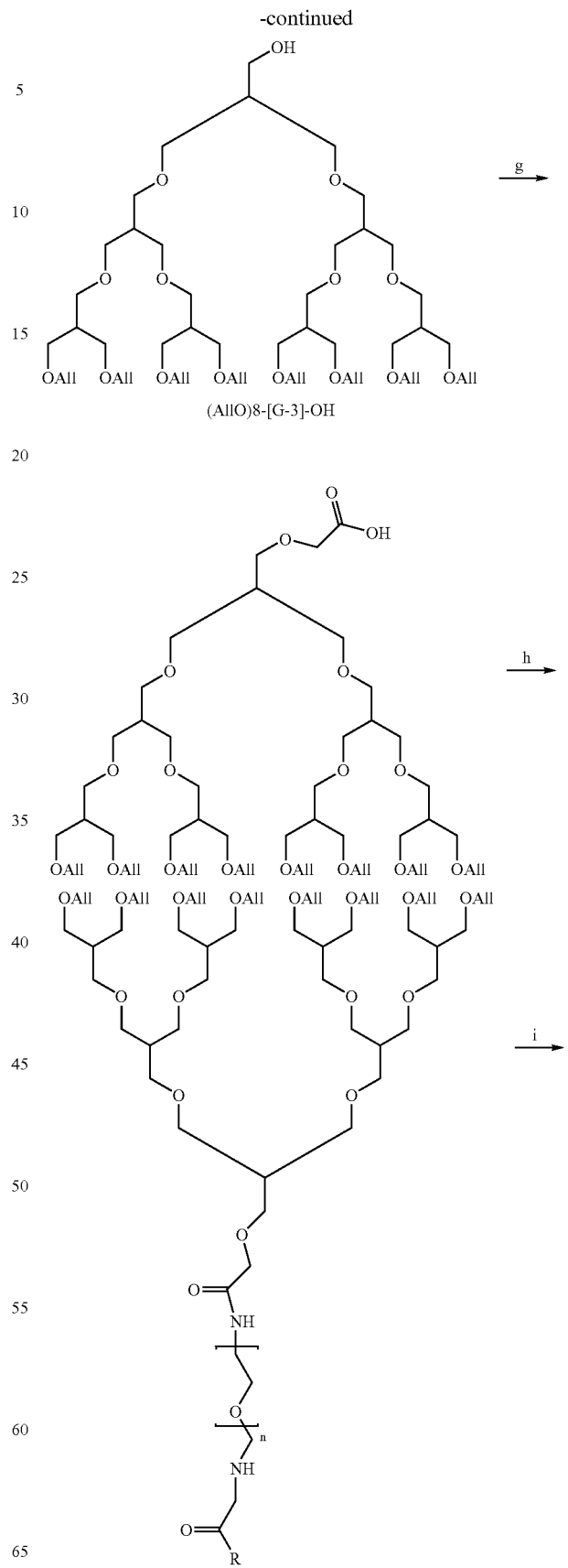

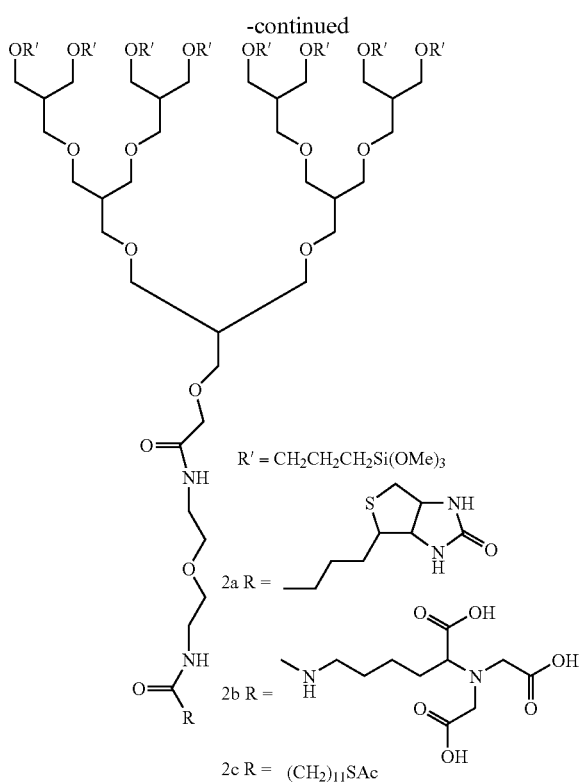

(a) NaH, MDC, THF, 65° C. (b) i) 9-BBN, THF, 0° C.; ii) H$_2$O$_2$, NaOH. (c) DHP, PPTS, CH$_2$Cl$_2$. (d) 4 atm H$_2$, 10% Pd/C, basic alumina, THF/EtOH. (e) AllylBr, NaH, THF, 65° C. (f) PPTS, EtOH, 50° C. g) BrCH$_2$COO-t-Bu, HaH, THF; p-tol-SO$_3$H, H$_2$O. h) 1. i) HSi(OMe)$_3$, Pt/C.

(BnO)$_2$[G-1]-ene

A solution of benzyl alcohol (9.516 g, 88 mmol, 2.2 equiv) in anhydrous THF (88 mL) was added to a mixture of NaH (2.223 g, 2.2 equiv) and methallyl dichloride (5.0 g, 40 mmol) in N$_2$. The mixture was stirred at room temperature for ~15 min and overnight at ~65° C. After cooling to room temperature, the reaction mixture was treated with H$_2$O and extracted twice with ethyl ether. The organic layers were combined and dried over anhydrous MgSO$_4$. After filtration and concentration of the filtrate, the residue was distilled using a bulb-to-bulb distillation apparatus to give (BnO)$_2$—[G-1]-ene as a colorless oil (10.73 g, 100%). $^1$H NMR (CDCl$_3$, 300 MHz): 4.08 (m, 4H), 4.52 (s, 4H), 5.27 (m, 2H), 7.25–7.38 (m, 10H); $^{13}$C NMR (CDCl$_3$, 75 MHz): 71.08, 72.35, 114.00, 127.51, 127.65, 128.32, 138.51, 143.08.

(BnO)$_2$-[G-1]-OH

A solution of (BnO)$_2$-[G-1]-ene (10.197 g, 38.00 mmol) in anhydrous THF (38 mL) were placed in a dry round bottom flask and cooled to 0° C. with an ice bath. To this flask while stirring, 0.5 M 9-BBN solution in THF (83.6 mL, 41.88 mmol, 1.1 equiv.) was added slowly, and the mixture was stirred at 0° C. for 2 h. The reaction mixture was then quenched with 3 M aqueous NaOH (57.0 mL, 171.0 mmol, 4.5 equiv) followed by addition of 30% H$_2$O$_2$ (12.92 g, 114.0 mmol, 3.0 equiv), and stirred at room temperature for 1 hour. The reaction was saturated with K$_2$CO$_3$ and extracted twice with ether. The organic layers were dried over anhydrous MgSO$_4$, and the solvent was removed in vacuo. Flash column chromatography (silica gel, ethyl acetate/hexanes 1:20 to 3:10) gave (BnO)$_2$-[G-1]-OH as a colorless liquid (9.39 g, 86.3%). $^1$H NMR (CDCl$_3$, 300 MHz): 2.19 (m, 1H), 3.62 (m, 4H), 3.80 (d, 2H, J=5.1 Hz), 4.51 (s, 4H), 7.26–7.38 (m, 10H); $^{13}$C NMR (CDCl$_3$, 75 MHz): 41.91, 63.92, 70.22, 73.52, 127.59, 127.61, 128.39, 138.38.

(BnO)$_4$—[G-2]-ene

NaH (0.529 g, 20.95 mmol, 2.2 equiv) and methallyl dichloride (1.19 g, 9.523 mmol) were placed in a dry round bottom flask in N$_2$. To this mixture was added a solution of (BnO)$_2$-[G-1]-OH (6.00 g, 20.9 mmol, 2.2 equiv.) in anhydrous THF (21 mL). The mixture was stirred at room temperature for 15 min and left overnight at ~65° C. After cooling to room temperature, the reaction mixture was quenched with water and extracted twice with ethyl ether. The combined organic layers were dried over anhydrous MgSO$_4$ and the solvent was removed in vacuo. Flash column chromatography (silica gel, ethyl acetate/hexanes 1:20 to 3:10) yielded (BnO)$_4$-[G-2]-ene as a colorless liquid (5.08 g, 85%). $^1$H NMR (CDCl$_3$, 300 MHz): 2.29 (m, 2H), 3.52 (d, 4H, J=6.0 Hz), 3.58 (d, 8H, J=6.0 Hz), 3.95 (s, 4H), 4.51 (s, 8H), 5.15 (s, 2H), 7.26–7.38 (m, 20H);

$^{13}$C NMR (CDCl$_3$, 75 MHz): 40.43, 68.75, 71.72, 73.08, 113.37, 127.43, 127.50, 128.29, 138.55, 142.95.

(BnO)$_4$-[G-2]-OH

Anhydrous THF (6 mL) and (BnO)$_4$-[G-2]-ene (3.624 g, 5.80 mmol) were placed in a dry round bottom and cooled to 0° C. with an ice bath. To this flask, 0.5 M 9-BBN solution in THF (12.76 mL, 6.38 mmol, 1.1 equiv.) was added slowly and the mixture was stirred at 0° C. for 2 hours. The reaction mixture was then quenched with 3 M aqueous NaOH (8.70 mL, 26.1 mmol, 4.5 equiv) followed by addition of 30% H$_2$O$_2$ (1.97 g, 17.4 mmol, 3.0 equiv) and stirred at room temperature for 1 hour. The reaction was saturated with K$_2$CO$_3$ and extracted twice with ether. The combined organic layers were dried over anhydrous MgSO$_4$, and the solvent was removed in vacuo. Flash column chromatography (silica gel, ethyl acetate/hexanes 1:20 to 3:10) yielded (BnO)$_4$-[G-2]-OH as a colorless liquid (3.52 g, 94%). $^1$H NMR (CDCl$_3$, 300 MHz): 2.07 (m, 1H), 2.23 (m, 2H), 3.40–3.56 (m, 16H), 3.69 (d, 2H, J=5.1 Hz), 4.48 (s, 8H), 7.24–7.38 (m, 20H); $^{13}$C NMR (CDCl$_3$, 75 MHz): 40.39, 41.31, 64.31, 68.76, 69.91, 71.21, 73.13, 127.48, 127.53, 128.28, 138.51.

(BnO)$_8$-[G-3]-ene

NaH (0.092 g, 3.64 mmol, 2.2 equiv) and methallyl dichloride (0.207 g, 1.655 mmol) were placed in a dry round bottom flask. To the mixture was added (BnO)$_4$-[G-2]-OH (2.34 g, 3.64 mmol, 2.2 equiv) in anhydrous THF (4 mL). The mixture was stirred at room temperature for 15 min and left overnight at ~65° C. After cooling to room temperature, the reaction mixture was quenched with water and extracted twice with ethyl ether. The organic layers were dried over anhydrous MgSO$_4$ and the solvent was removed in vacuo. Flash column chromatography (silica gel, ethyl acetate/ hexane, 1:20 to 3:10) yielded (BnO)$_8$—[G-3]-ene as a colorless liquid (2.02 g, 91%). $^1$H NMR (CDCl$_3$, 300 MHz): 2.13 (m, 2H), 2.25 (m, 4H), 3.39 (d, 4H, J=7.2 Hz), 3.41 (d, 8H, J=6.3 Hz), 3.47 (d, 8H, J=6.0 Hz), 3.54 (d, 16H, J=6.3 Hz), 3.88 (s, 4H), 4.48 (s, 16H), 5.11 (s, 2H), 7.24–7.38 (m, 40H); $^{13}$C NMR (CDCl$_3$, 75 MHz): 40.37, 40.50, 68.86, 69.54, 71.78, 73.12, 112.94, 127.41, 127.48, 128.29, 138.67, 143.08.

(BnO)-[G-3]-OH

Anhydrous THF (3 mL) and (BnO)$_8$-[G-3]-ene (1.86 g, 1.39 mmol) were placed in a dry round bottom flask and cooled to 0° C. in an ice bath. To this flask, 0.5 M 9-BBN solution in THF (3.06 mL, 1.529 mmol, 1.1 eguiv) was added slowly and allowed to stir at 0° C. for 2 hours. The reaction mixture was then quenched with 3 M aqueous NaOH (2.08 mL, 6.25 mmol, 4.5 equiv) followed by addition of 30% $H_2O_2$ (0.473 g, 4.17 mmol, 3.0 equiv) and stirred at room temperature for 1 hour. The reaction was saturated with $K_2CO_3$ and extracted twice with ether. The organic layer was dried over anhydrous $MgSO_4$, and the solvent was removed in vacuo. Flash column chromatography (silica gel, ethyl acetate/hexanes, 1:20 to 1:1) gave (BnO)$_8$-[G-3]-OH as a colorless liquid (1.77 g, 94%). $^1$H NMR (CDCl$_3$, 300 MHz): 1.57 (m, 1H), 2.06 (m, 2H), 2.23 (m, 4H), 3.32–3.42 (m, 16H), 3.45 (d, 8H, J=5.7 Hz), 3.52 (d, 16H, J=6.0 Hz), 3.66 (d, 2H, J=4.8 Hz), 4.47 (s, 16H), 7.22–7.38 (m, 40H); $^{13}$C NMR (CDCl$_3$, 75 MHz): 40.17, 40.38, 41.25, 64.08, 68.74, 69.49, 69.52, 69.88, 71.18, 73.09, 127.43, 127.50, 128.30, 138.56.

(BnO)$_8$-[G-3]-OTHP

A mixture of (BnO)$_8$-[G-3]-OH (407 mg, 0.300 mmol), PPTS (7.5 mg, 0.030 mmol), DHP (30.3 mg, 0.36 mmol) and $CH_2Cl_2$ (3 mL) was stirred at room temperature for 24 hours. The mixture was extracted twice with ether, washed with aqueous $NaHCO_3$ and dried over anhydrous $MgSO_4$. The solvent was removed in vacuo. Flash column chromatography (silica gel, hexanes/ethyl acetate 4:1) gave (BnO)$_8$-[G-3]-OTHP as colorless liquid (0.431 g, 100%). $^1$H NMR (CDCl$_3$, 300 MHz): 1.40–1.85 (m, 6H), 2.04–2.18 (m, 3H), 2.23 (m, 4H), 3.32–3.42 (m, 16H), 3.45 (d, 8H, J=6.3 Hz), 3.52 (d, 16H, J=5.7 Hz), 3.70–3.85 (m, 4H), 4.47 (s, 16H), 4.50–4.65 (m, 1H), 7.22–7.38 (m, 40H); $^{13}$C NMR (CDCl$_3$, 75 MHz): 19.48, 25.46, 30.60, 40.21, 40.22, 40.39, 61.99, 65.82, 68.76, 69.47, 69.51, 69.59, 69.60, 73.05, 98.91, 127.41, 127.48, 128.26, 138.58.

(HO)$_8$-[G-3]-OTHP

A suspension of (BnO)$_8$-[G-3]-OTHP (322 mg, 0.224 mmol) and 10% Pd/C (56 mg) in THF/EtOH (1:1, 6 mL) was placed in a 20 ml test tube. The system was vacuumed and filled with Hydrogen. The mixture was stirred under 4 atm of hydrogen gas for 24 hours. Additional 10% Pd/C (2×28 mg) were added twice and the mixture was stirred for 24 hours after each addition. The catalyst was removed from the reaction mixture via vacuum filtration through Celite. The solvent was removed in vacuo to give (HO)$_8$-[G-3]-OTHP as a viscous liquid (0.125 g). $^1$H NMR (CDCl$_3$, 300 MHz): 1.40–1.85 (m, 6H), 1.90–2.03 (m, 3H), 2.05–2.22 (m, 4H), 2.25–2.60 (br, 8H), 3.38–3.54 (m, 20H), 3.62 (d, 8H, J=5.4 Hz), 3.78 (d, 16H, J=6.0 Hz), 4.54–4.60 (m, 1H).

(AllylO)$_8$-[G-3]-OTHP

A mixture of (HO)$_8$-[G-3]-OTHP (190 mg, 0.264 mmol), THF (5 mL), NaH (100 mg) and allyl bromide (0.511 mg, 4.23 mmol) was stirred at 65° C. for 24 hours. The reaction mixture was quenched with water, extracted twice with ether, and dried over anhydrous $MgSO_4$. Flash column chromatography (silica, hexane/AcOEt 6:1) gave (allylO)$_8$-[G-3]-OTHP as a colorless oil (218 mg, 79%). $^1$H NMR (CDCl$_3$, 300 MHz): 1.40–1.85 (m, 6H), 2.05–2.25 (m, 7H), 3.28–3.43 (m, 16H), 3.45 (d, 8H, J=6.0 Hz), 3.48 (d, 16H, J=5.7 Hz), 3.70–3.90 (m, 4H), 3.94–4.03 (m, 16H), 4.53–4.58 (m, 1H), 5.12–5.34 (m, 16H), 5.83–5.98 (m, 8H); $^{13}$C NMR (CDCl$_3$, 75 MHz): 19.48, 25.49, 30.61, 40.20, 40.25, 40.39, 61.98, 65.84, 68.72, 69.45, 69.50, 69.61, 69.69, 72.01, 98.92, 116.55, 134.99.

(AllylO)$_8$-[G-3]-OH

A mixture of (HO)$_8$-[G-3]-OTHP (218 mg, 0.210 mmol), PPTS (8.0 mg, 0.032 mmol) and anhydrous EtOH (2.0 mL) was stirred at 50° C. for 24 hours. The mixture was extracted with ether, washed with aqueous $Na_2CO_3$, and dried over anhydrous $MgSO_4$. Flash chromatography (silica gel, ethyl acetate/hexanes 1:2) gave (allylO)$_8$-[G-3]-OH as a colorless liquid (172 mg, 86%). $^1$H NMR (CDCl$_3$, 300 MHz): 2.04–2.22 (m, 7H), 3.30–3.52 (m, 40H), 3.68–3.76 (m, 3H), 3.90–3.98 (m, 16H), 5.13–5.30 (m, 16H), 5.83–5.97 (m, 8H); $^{13}$C NMR (CDCl$_3$, 75 MHz): 40.18, 40.35, 41.33, 64.07, 68.70, 69.46, 69.48, 69.87, 71.21, 72.04, 116.61, 134.95.

Example 3

A3. Synthesis of tip molecules 3

The syntheses of the tripod-shaped tip molecules 3 are underway. The syntheses are based on the general methods that Applicants have reported (Deng, X.; Mayeux, A.; Cai, C. *J. Org. Chem.* 2002, 67, 5278).

B. Modification of Silicon AFM Tips with an OEG Layer

General:

Toluene (GR grade, EM Science) was distilled over Na. Mesitylene (99%, Acros) was vacuum distilled and degassed using glassware that are cleaned by Piranha solution ($H_2O_2$/$H_2SO_4$=1:3) at 80° C. for 30 min. Petroleum ether (GR grade, EM Science) and dichloromethane (GR grade, EM Science) were distilled using glassware that were cleaned by Piranha solution. Buffer-HF-Improved (Transene), ethanol (100%, AAPER), DMF (anhydrous, 99.8%, Aldrich), $H_2SO_4$ (GR grade, EM Science), $H_2O_2$ (30%, J. T. Baker), PBS buffer (pH 7.4, Sigma), N,N-disuccinimidyl carbonate (Aldrich), OTS (95%, Gelest), BSA (Sigma), fibrinogen (Sigma), avidin (Sigma), streptavidin (Sigma), and biotin-labeled-BSA (Sigma) were used without further purification.

Measurement is performed in an air-conditioned room at 24° C. with a relative humidity of 39%. Ultrasharp SC12 silicon cantilevers from Silicon-MDT are used in this example of tip modification. The reflective side of cantilever is coated with Al.

Preparation of OEG-Coated Tips by Surface-Hydrosilylation:

The cantilevers are placed in a Teflon holder, and the holder is then placed in a Piranha solution at 80° C. for 30 min. The holder is taken out and placed in abundant Millipore $H_2O$. After rinsing with Millipore $H_2O$, the holder with the cantilevers is dried with a stream of particle-free $N_2$. It is then place in buffer-HF solution at room temperature for 10 s, taken out from the solution, and immediately blow to dry with a stream of $N_2$.

A solution of $CH_2$=$CH(CH_2)_9(OCH_2CH_2)_3OCH_3$ (OEG-alkene) of 1 mM concentration in mesitylene is prepared in a Schlenk tube. The clean hydrogen-terminated AFM cantilevers (in the Teflon holder) are immersed in the OEG-alkene solution, and the solution is heated in an oil bath to reflux for 2 hours under $N_2$. After cooling to room temperature, the tips were taken out and rinsed sequentially with petroleum ether, ethanol, and dichloromethane and finally drying with a stream of pure $N_2$.

Preparation of OEG-coated Tips by Siloxane Formation:

Solution of $SiCl_3(CH_2)_{11}(OCH_2CH_2)_3OCH_3$ (OEG-SiCl$_3$) of 2 mM concentration in dry toluene was prepared in a Schlenk tube. Silicon cantilevers in a Teflon holder are cleaned by Piranha solution as described above. They are then immersed in the OEG-SiCl$_3$ solution at room temperature for 6 hours under N$_2$. The tips were taken out and rinsed with toluene, followed by drying with a stream of N$_2$, and annealing in an oven at 110° for 30 min.

Evaluation of the Tips:

Tip size and shape: After each modification step, a cantilever is taken out from the sample holder, and used for imaging a standard, e.g., protein arrays, NioProbe (from Aurora NanoDevices). Three codes are used for blind tip estimation: 1) Auto Tip Qual (DI); 2) Deconvol (Silicon-MDT); 3) a free software provided by Brian A. Todd and Steven J. Eppell at Case Western Reserve University (Surface Science 2001, 491, 473).

Interaction with proteins: Force-extension curves are obtained with the tip being evaluated on mica surface in air at 40% relative humidity, or on protein surfaces which are prepared using the following methods.

Preparation of OTS-Coated Si Substrates:

Si wafers were cleaned with Piranha solution at 80° C. for 1 hour, followed by rinsing with abundant H$_2$O, and drying in an oven at 110° C. for 15 min.

Solution of OTS of 1 mM concentration in dry toluene was prepared in a Schlenk tube. The cleaned OH-terminated Si substrates were immersed in the OTS solution at room temperature for 18 hours under N$_2$. The substrates were taken out and rinsed with toluene, followed by drying with a stream of N$_2$, and annealing in an oven at 110° C. for 30 min.

Preparation of BSA-, Fibrinogen-, and Avidin-Coated Si Substrates:

Solutions of proteins (BSA, fibrinogen, and avidin) of 0.1 mg/1 ml concentration in PBS buffer were prepared in cleaned vials. The OTS-coated Si substrates were immersed in the respective protein solution at room temperature for 18 hours. The substrates were taken out and rinsed with H$_2$O, followed by drying with a stream of N$_2$.

Selective Activation at the Tip Apex:

An OEG-coated cantilever is mounted to an AFM, engaged to an Au (111) surface, and located on a flat region. A voltage pulse of 300 mV for 2 second is applied between the tip and the Au substrate. The tip is then evaluated by obtaining force-distant curves on mica surface in air at 40% relative humidity, or on a OH-terminated SAM in a buffer solution to estimate the number of COOH groups at the tip apex.

Activation of COOH Groups to COONHS Groups at the Tip Apex:

Solution of N,N-disuccinimidyl carbonate (DSC) of 1% (w/w) concentration in DMF was prepared in a Schlenk tube. The COOH-terminated AFM tips prepared as above are placed in a Teflon holder, and immersed in the DSC solution at room temperature for 10 min under N$_2$. The tips are taken out and rinsed with DMF, followed by drying with a stream of N$_2$.

Biotin-SMATs:

Solution of NH$_2$-PEG-biotin of 1 mM concentration in DMF was prepared in a Schlenk tube. The AFM tips containing COONHS groups at the tip apex (prepared as above) are placed in a Teflon holder, and immersed in the NH$_2$-PEG-biotin solution at room temperature for 15 min under N$_2$. The tips were taken out and rinsed with DMF, followed by drying with a stream of N$_2$. The tips are then used to obtain the force-extension curves with a streptavidin surface (see below) in PBS buffer.

Preparation of Streptavidin Surfaces:

The OTS-coated Si substrates were immersed in a solution of biotin-labeled-BSA (Sigma) of 0.1 mg/1 ml concentration in PBS buffer at room temperature for 18 h. The substrates were taken out and rinsed with H$_2$O, followed by drying with a stream of N$_2$.

The biotin-labeled-BSA-coated Si substrates were immersed in a solution of streptavidin of 0.05 mg/1 ml concentration in PBS buffer at room temperature for 18 hours. The substrates were taken out and rinsed with H$_2$O, followed by drying with a stream of H$_2$O.

Figure 17:
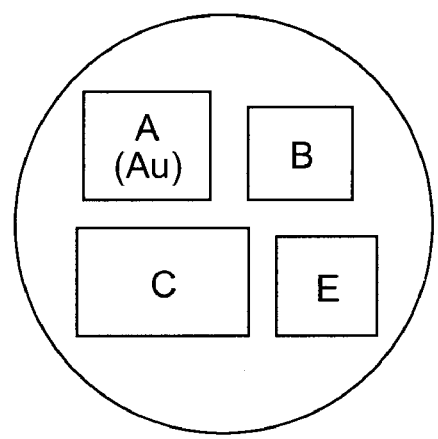
FIG. 17. Illustration of the simplest version of "chips" for modification of silicon-containing SPM tips that have been coated with an ultra-thin layer of suitable organic molecules.
Figure 18:
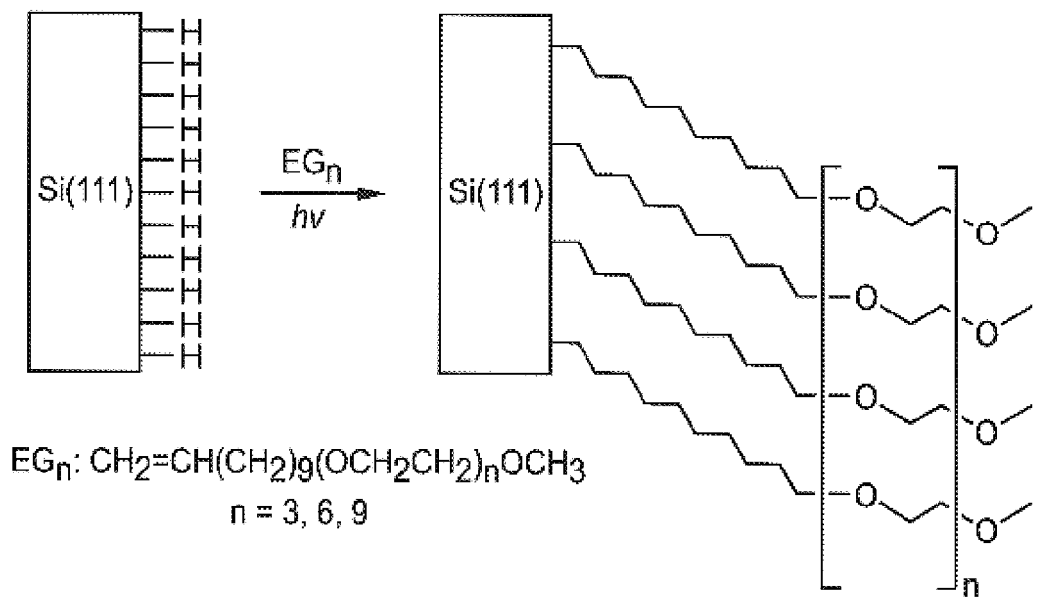
FIG. 18. Representation of hydrosilylation of $EG_3$, $EG_6$, and $EG_9$ on H-terminated Si(111) surfaces.

Prototype Chips for Tip Modification:

The simplest version of "chips" for modification of silicon-containing SPM tips that have been coated with a ultra-thin layer of suitable organic molecules is illustrated in FIG. 17. Parts A–E are attached to an AFM sample holder (a disk) using double-sided tapes. For preparing Parts A and B, small pieces (about 0.5×0.5 cm) are cut from a silicon substrate coated with a Au layer prepared by thermal evaporation of 10 Å of Cr followed by 1000 Å of Au to a silicon substrate. They are placed in a Teflon sample holder and washed with Piranha solution. Some of the samples are used to prepare part B by immersing in a 1 mM solution of HO(CH$_2$)$_{16}$SH in toluene overnight and rinsing the sample thoroughly with toluene and ethanol. To prepare Part C, a freshly cleaved mica substrate (about 1×1 cm) is placed in a spin-coating apparatus. A drop of a 10$^{-6}$ M solution of biotin-PEG-NH$_2$ in THF is deposited at the center of the mica substrate which is immediately spun at 2000 rpm for 2 min. Part E has a streptavidin surface, and is prepared on a small piece of silicon substrate using the above described method.

Silicon Surface modification

Example 4

Synthesis of EG$_6$, EG$_7$, EG$_9$

Scheme 3. Synthetic route to EG$_6$, EG$_7$, and EG$_9$.

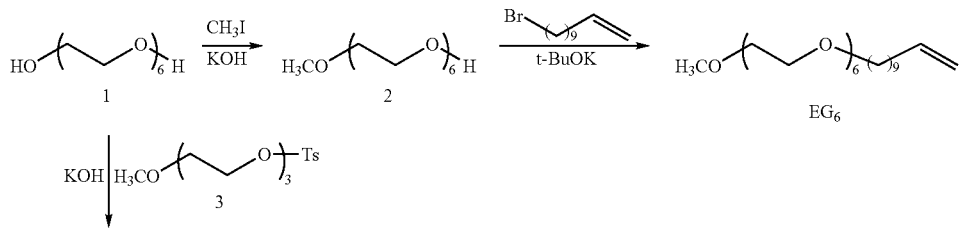

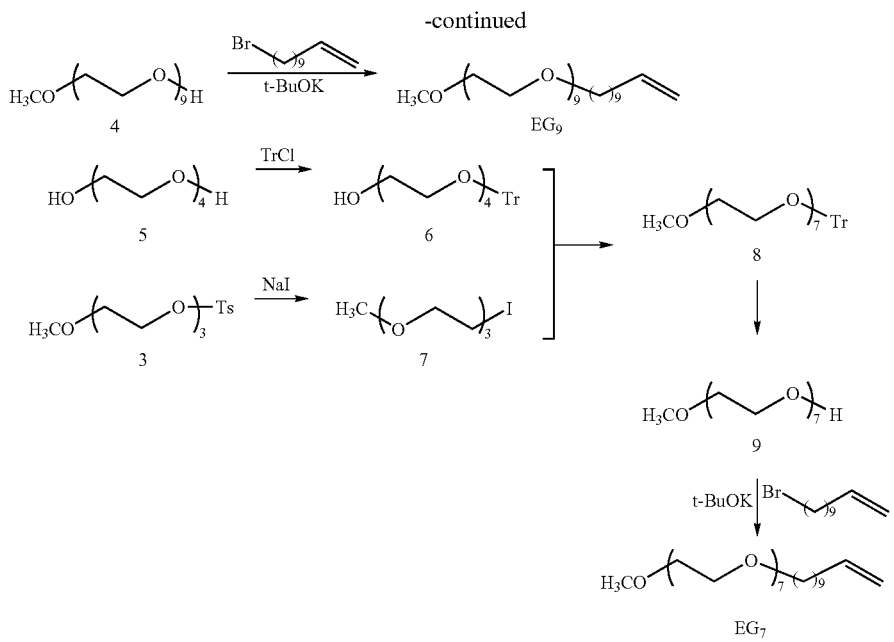

Hexaethylene glycol monomethyl ether (2) [P. Fischer, C. Schmidt, H. Finkelmann, *Macromol. Rapid Commun.* 1995, 16, 435]. A suspension of hexa(ethylene glycol) (1, 5.64 g, 20.0 mmol) and KOH (0.28 g, 5.00 mmol) in THF (20 mL) was reflux until KOH was dissolved. The solution was cooled to room temperature, treated with $CH_3I$ (0.37 mL, 6.0 mmol), stirred for 24 h at room temperature. The mixture was dried under vacuum. After addition of chloroform, the organic layer was washed with water (2×50 mL), dried over $Na_2SO_4$, concentrated under reduced pressure, and dried under high vacuum to give 2 [J. Yakovleva, R. Davidsson, A. Lobanova, M. Bengtsson, S. Eremin, T. Laurell, J. Emneux, *Anal. Chem.* 2002,74, 2994; L. Leoni, D. Attiah, T. A. Desai, Sensors, 2002, 2, 111; S. Sharma, R. W. Johnson, T. A. Desai, *Appl. Surf Sci.* 2003, 206, 218] as a pale-yellow oil (0.45 g, 31%).

Hexaethylene glycol methyl ω-undecenyl ether ($EG_6$) [P. Fischer, C. Schmidt, H. Finkelmann, *Macromol. Rapid Commun.* 1995, 16, 435]. A mixture of t-BuOK (0.665 g, 5.9 mmol), 2 (1.47 g, 4.95 mmol), tetrabutylammonium iodide (10 mg, 0.027 mmol), and 1'-bromo-undec-1-ene (2.31 g, 9.9 mmol) in THF (10 mL) was stirred at 70° C. for 12 h, cooled to r.t., and extracted with $Et_2O$, washed with water (2×15 mL), dried over $MgSO_4$, and concentrated. Flash chromatography ($CH_2Cl_2$/MeOH 250:3) gave $EG_6$ as a colorless oil (1.84 g, 83%). $^1H$ NMR (300 MHz, $CDCl_3$, 25° C., TMS): δ=1.29 (br. s, 12H), 1.85 (m, 2H), 2.03 (br q, J(H,H)=6.5 Hz, 2H), 3.37 (s, 3H), 3.53 (t, J(H,H)=6.5 Hz, 2H), 3.5–3.7 (m, 24H), 4.89–5.02 (m, 2H), 5.74–5.87 (m, 1H); $^{13}C$ NMR (75 MHz, $CDCl_3$, 25° C., TMS): δ=25.96, 28.80, 28.99, 29.31, 29.35, 29.41, 29.49, 33.69, 58.92, 69.91, 70.41, 70.46, 71.42, 71.81, 113.97, 139.11; MS m/z 471 (M+$Na^+$).

Nonaethylene glycol monomethyl ether (4) [C. Campbell, K. Viras, A. J. Masters, J. R. Craven, Z. Hao, S. G. Yeates, C. Booth, *J. Phys. Chem.* 1991, 95, 4647]. A mixture of dry hexa(ethylene glycol) 1 (14.5 g, 51.3 mmol) and KOH (0.78 g, 14 mmol) in THF (20 mL) was reflux until KOH was dissolved. The solution was cooled to room temperature, treated with the tosylate 3 [C. Selve, J.-C. Ravey, M.-J. Stebe, C. El Moudjahid, E. M. Moumni, J.-J. Delpuech, *Tetrahedron* 1991, 47, 411] (4.08 g, 12.8 mmol), and refluxed for 18 hours. The solvent was removed under vacuum, $CHCl_3$ was added and the organic phase was washed with water (2×50 mL), dried over $Na_2SO_4$, concentrated under reduced pressure, and dried under high vacuum to give 4 [C. Campbell, K. Viras, A. J. Masters, J. R. Craven, Z. Hao, S. G. Yeates, C. Booth, *J. Phys. Chem.* 1991, 95, 4647] as a pale yellow oil (6.2 g, 92%).

Nonaethylene glycol methyl ω-undecenyl ether ($EG_9$). Similar to the preparation of $EG_6$, $EG_9$ was obtained as an oil in 85% yield. $^1H$ NMR (300 MHz, $CDCl_3$, 25° C., TMS): δ=1.20 (br. s, 12H), 1.56 (m, 2H), 2.02 (br q, J=6.6 Hz, 2H), 3.37 (s, 3H), 3.44 (t, J=6.6 Hz, 2H), 3.5–3.7 (m, 36H), 4.90–5.02 (m, 2H), 5.74–5.88 (m,1H); $^{13}C$ NMR (75 MHz, $CDCl_3$, 25° C., TMS):

δ=25.96, 28.80, 29.00, 29.32, 29.35, 29.41, 29.50, 33.70, 58.94, 69.92, 70.45, 71.41, 71.80, 113.99, 139.13; MS m/z 603 (M+$Na^+$).

Compound 7. A mixture of tosyl-triethyleneglycol-monomethylether (3, 1 g, 3.14 mmol) and NaI (0.94 g, 6.29 mmol) in 15 ml of acetone was refluxed overnight under $N_2$. After cooling to room temperature, the acetone was removed under reduced pressure. Diethyl Ether was added, and the mixture was poured into water. The organic layer was separated, and the aqueous layer was extracted twice with ether. The combined organic layers were washed twice with water and once with saturated NaCl solution, then dried with magnesium sulfate, filtered and concentrated under reduced pressure. The crude product was purified by flash chromatography (methanol/dichloromethane 2:98) to give 7 (0.81 g, 94%). $^1H$ NMR ($CDCL_3$): δ=3.73–3.78 (t, 2H); 3.64–3.67 (m, 6H); 3.55–3.57 (m, 2H); 3.38 (s, 3H); 3.24–3.28 (t, 2H). Compound 6. To a mixture of tetra ethylene glycol (5, 13.93 g, 71.74 mmol) and dry pyridine (0.85 g, 11 mmol), tritylchloride (2.0 g, 7.2 mmol) was added and the reaction mixture was heated to 50° C., stirred under $N_2$ for 2 hours.

After cooling to room temperature, toluene was added, and the reaction mixture was poured into water. The organic phase was separated, and the aqueous layer was extracted twice with toluene. The combined organic layers were washed twice with water, dried with magnesium sulfate, filtered and concentrated under reduced pressure. The crude mixture was triturated with hexane to wash out the ditrytilated byproduct. The product 6 was obtained as viscous oil (2.48 g, 80%). $^1$H NMR (CDCL$_3$): δ=7.45–7.47 (m, 6H); 7.19–7.31 (m, 9H); 3.66–3.71 (m,12H); 3.57–3.61 (m, 2H); 3.21–3.25 (m, 2H).

Compound 8. A mixture of compound 6 (1.18 g, 2.71 mmol) and NaH (0.081 g, 3.38 mmol) in 5 ml of dry THF was stirred for 24 hours under N$_2$. Then 7 (0.74 g, 2.71 mmol) in 5 ml of dry THF was added dropwise while the reaction mixture was cooled to 0° C. in an ice bath. The reaction mixture was stirred at room temperature for 90 hours. The solvent was removed under reduced pressure. Ether was added, and the mixture was poured into water. The organic layer was separated, and the aqueous layer was extracted twice with ether. The combined organic layers were washed twice with water, then dried with magnesium sulfate, filtered and concentrated under reduced pressure. The crude product was further purified by flash chromatography (methanol/dichloromethane 2:98) to afford 0.65 g of compound 8 (41%). $^1$H NMR (CDCl$_3$): δ=7.45–7.47(m, 6H); 7.22–7.31 (m, 9H); 3.62–3.69 (m, 24H); 3.54–3.55 (m, 2H); 3.37 (s, 3H); 3.22–3.24 (m, 2H).

Monomethyl hepta(ethylene glycol) (9). A mixture of MeO(CH$_2$CH$_2$O)$_7$Tr (8, 0.44 g, 0.75 mmol), 10% Pd/C (50 mg) and acetic acid (0.1 ml) in 3 ml of ethanol was stirred under H$_2$ at 45° C. for 48 hours. With thin-layer chromatography the course of the reaction was followed. Upon completion of the reaction, the catalyst was filtered and washed with ethanol. The combined filtrate was concentrated under reduced pressure. The residue was dissolved in boiling methanol. Upon cooling the solution to −25° C., the byproduct triphenylmethane crystallized and was filtered. After concentration of the filtrate, the remaining oily product was stirred with dry hexane to remove the remaining traces of triphenylmethane. After purification by flash chromatography (methanol/dichloromethane 2:98), 0.16 g of compound 9 was obtained (62%).

$^1$H NMR (CDCl$_3$): δ=3.55–3.72 (m, 28H); 3.38 (s, 3H).

Hepta(ethylene glycol) methyl ω-undecenyl ether (EG$_7$). Monomethyl hepta(ethylene glycol) (1.637 g, 4.81 mmol) was slowly added to NaH (0.81 g, 33.75 mmol) in dry THF (8 ml) while stirring under N$_2$. To this mixture was added Bu$_4$NI (0.81 g, 0.48 mmol) and 11-bromo-1-undecene (4.2 ml, 16.78 mmol), and the mixture was refluxed for 20 hours under N$_2$. Iodomethane (3.42 g, 24.1 mmol) was added, and the mixture was refluxed for 1 hour. The reaction mixture was then refluxed with methanol for another hour. After cooling to room temperature, the mixture was concentrated under reduced pressure. Dichloromethane was added, and the mixture was poured into water. The organic layer was separated, and the aqueous layer was extracted twice with dichloromethane. The combined organic layers were washed twice with water, dried with magnesium sulfate, filtered and concentrated under reduced pressure. The crude product was purified by flash chromatography (ethyl acetate/hexane/methanol 50:48:2) to afford EG$_7$ (1.8 g, 76%). $^1$H NMR (CDCl$_3$): δ=5.80–5.82 (m, 1H); 4.90–5.01 (m, 2H); 3.52–3.65 (m, 26H); 3.41–3.46 (t, 2H); 3.37 (s, 3H); 2.02–2.04 (q, 2H); 1.54–1.57 (m, 4H); 1.30–1.36(m, 12H).

Example 5

Setting and Procedure for Photo-induced Surface Hydrosilylation.

Figure 21:
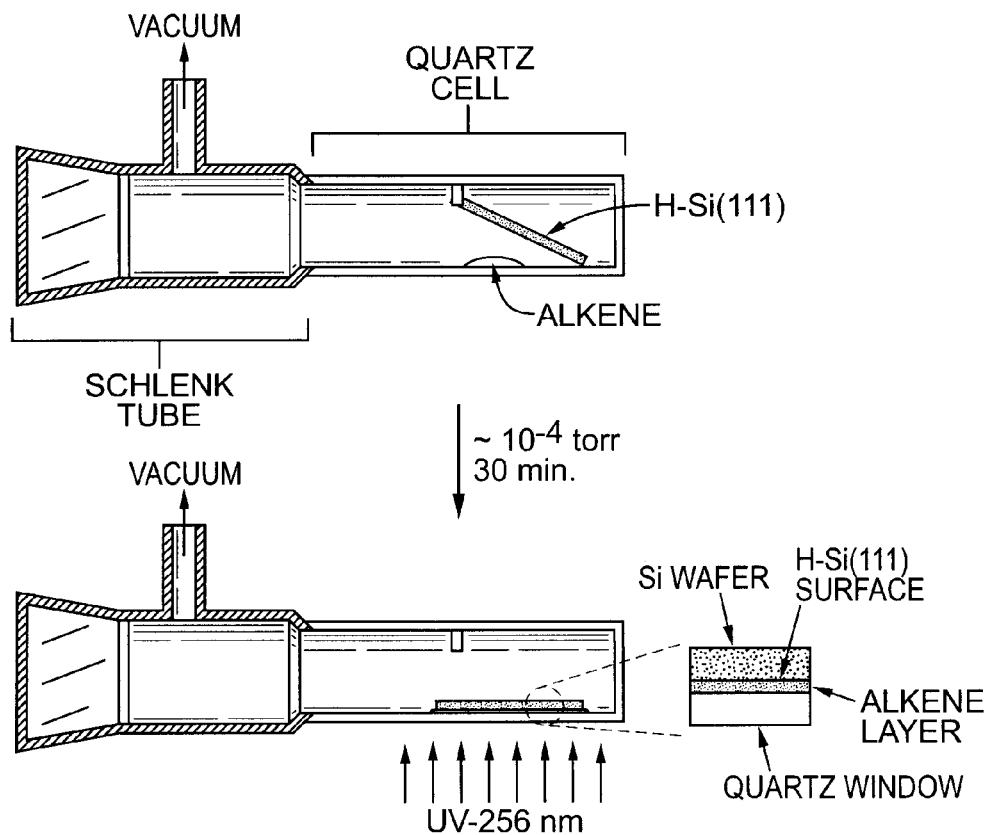
FIG. 21. Experimental Setup for Photo-induced Hydrosilylation on H—Si(111) Surfaces.

The apparatus was prepared by fusion of the open end of a five-side-polished quartz cell with the open bottom of a Schlenk tube (FIG. 21). It was cleaned with Piranha solution (H$_2$SO$_{4/30}$% H$_2$O$_2$ 3:1) at 80° C. for 30 min (Caution: Piranha reacts violently with organic compounds, and care should be taken while handling it), washed thoroughly with Millipore water, covered with aluminum foil and dried in a clean oven at 150° C. Atomically flat H—Si(111) surfaces were prepared similarly to the procedure described in literatures [M. A. Hines, *Int. Revs. Phys. Chem.* 2001, 20, 645; C. P. Wade, C. E. D. Chidsey, *Appl. Phys. Lett.* 1997, 71, 1679]. Briefly, single side polished and (111) oriented silicon wafers were cut into pieces of ca. 1×1 cm$^2$, cleaned with a Piranha solution (H$_2$SO$_4$/30% H$_2$O$_2$ 3:1) at 80° C. for 30 min, thoroughly washed with Millipore water, etched in 10% buffer-HF (Transene) for 10 min and then in 40% NH$_4$F for 15 min under N$_2$ purge, and dried immediately with a flow of nitrogen. The substrate was immediately placed inside a freshly cleaned and dried quartz cell, and tilted with the polished H—Si(111) surface facing downward (FIG. 21). A droplet (~1 mg) of the alkene in a pipette was carefully placed on the quartz window below the wafer but without touching it. After the cell was degassed at ~3×10$^{-3}$ Torr for 30 min, the substrate was allowed to fall down (by lightly tapping the cell) onto the droplet, forming a thin and homogeneous layer between the H—Si(111) surface and the quartz wall (FIG. 21). The H—Si(111) surface was illuminated for 30 min with a hand-hold 254 nm UV-lamp (Model UVLS-28, UVP) placed ~1 cm away from the cell. The sample was taken out and washed sequentially with petroleum ether, ethanol, and dichloromethane, followed by drying with a stream of N$_2$ gas.

ADDITIONAL REFERENCES INCLUDE

Sigal, G. B., Bamdad, C., Barberis, A., Strominger, J. & Whitesides, G. M. A self-assembled monolayer for the binding and study of histidine-tagged proteins by surface plasmon resonance. *Anal. Chem.* 68, 490 (1996);

Hainfeld, J. F., Liu, W., Halsey, C. M. R., Freimuth, P. & Powell, R. D. Ni-NTA-gold clusters target His-tagged proteins. *J. Struct. Bio.* 127, 185 (1999);

McMahn, S. A. & Burgess, R. R. Single-step synthesis and characterization of biotinylated nitrilotriacetic acid, a unique reagent for the detection of histidine-tagged proteins immobilized on nitrocellulose. *Anal. Biochem.* 236, 101 (1996).

Johnson, K. A. Conformational coupling in DNA polymerase fidelity. *Annu. Rev. Biochem.* 62, 685 (1993);

Perlow, R. A. & Broyde, S. Evading the proofreading machinery of a replicative DNA polymerase: induction of a mutation by an environmental carcinogen. *J. Mol. Bio.* 309, 519 (2001);

Weiss, K. K., Bambara, R. A. & Kim, B. Mechanistic role of residue Gln151 in error prone DNA synthesis by human immunodeficiency virus type 1 (HIV-1) reverse transcriptase (RT): pre-steady state kinetic study of the Q151N HIV-1 RT mutant with increased fidelity. *J. Bio. Chem.* 277, 22662 (2002);

Arion, D., Sluis-Cremer, N., Min, K. L., Abram, M. E., Fletcher, R. S. & Parniak, M. A. Mutational analysis of Tyr-501 of HIV-1 reverse transcriptase: effects on ribonuclease H activity and inhibition of this activity by N-acylhydrazones. *J. Bio. Chem.* 277, 1370 (2002);

Cherry, E., Liang, C., Rong, L., Quan, Y., Inouye, P., Li, X., Morin, N., Kotler, M. & Wainberg, M. A. Characterization of human immunodeficiency virus type-1 (HIV-1) particles that express protease-reverse transcriptase fusion proteins. *J. Mol. Bio.* 284, 43 (1998);

Doublie, S., Tabor, S., Long, A. M., Richardson, C. C. & Ellenberger, T. Crystal structure of a bacteriophage T7 DNA replication complex at 2.2 Å resolution. *Nature* 391, 251 (1998);

Brautigam, C. A. & Steitz, T. A. Structural and functional insights provided by crystal structures of DNA polymerases and their substrate complexes. *Curr. Opin. Struct. Biol.* 8, 54 (1998);

Delarue, M., Poch, O., Tordo, N., Moras, D. & Argos, P. An attempt to unify the structure of polymerases. *Protein Eng.* 3, 461 (1990). d) Joyce, C. M. & Steitz, T. A. Function and structure relationships in DNA polymerases. *Annu. Rev. Biochem.* 63, 777 (1994);

Eom, S. H., Wang, J. & Steitz, T. A. Structure of Taq polymerase with DNA at the polymerase active site. *Nature* 382, 278 (1996);

Li, Y., Korolev, S. & Waksman, G. Crystal structures of open and closed forms of binary and ternary complexes of the large fragment of *Thermus aquaticus* DNA polymerase I: structural basis for nucleotide incorporation. *EMBO J.* 17, 7514 (1998);

Li, X. Y. & McClure, W. R. Characterization of the closed complex intermediate formed during transcription initiation by *Escherichia coli* RNA polymerase. *J. Bio. Chem.* 273, 23549 (1998);

Patel, P. H. & Loeb, L. A. Multiple amino acid substitutions allow DNA polymerases to synthesize RNA. *J. Bio. Chem.* 275, 40266 (2000);

Patel, P. H. & Loeb, L. A. DNA polymerase active site is highly mutable: envolutionary consequences. *Proc. Natl. Acad. Sci. USA* 97, 5095 (2000);

Patel, P. H., Suzuki, M., Adman, E., Shinkai, A. & Loeb, L. A. Prokaryotic DNA polymerase I: evolution, structure, and 'base flying' mechanism for nucleotide selection. *J. Mol. Bio.* 308, 823 (2001);

Wilson, S. H., Sobol, R. W., Beard, W. A., Horton, J. K., Prasad, R. & Vande Berg, B. J. DNA polymerase β and mammalian base excision repair. *Cold Spring Harbor Symposia on Quantitative Biology* 65, 143 (2000);

Goodman, M. F. Hydrogen bonding revisited: geometric selection as a principal determinant of DNA replication fidelity. *Proc. Natl. Acad. Sci. USA* 94, 10493 (1997);

Dzantiev, L. & Romano, L. J. Differential effects of N-acetyl-2-aminofluorene and N-2-aminofluorene adducts on the conformational change in the structure of DNA polymerase I (Klenow fragment). *Biochemistry* 39, 5139 (2000); and Steitz, T. A. DNA polymerases: structural diversity and common mechanisms. *J. Bio. Chem.* 274, 17395 (1999).

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
    a) hydrogenating the surface of a silicon SPM tip to yield surface Si—H species; and
    b) attaching oligo-ethylene glycol derivatives directly to the silicon SPM tip surface via reaction with said Si—H species to yield a silicon SPM tip coated with a monolayer of ethylene glycol derivatives.

2. The method of claim 1, wherein said SPM tip coated with a monolayer of ethylene glycol derivatives comprises a tip size that is not significantly enlarged relative to uncoated silicon SPM tips.

3. The method of claim 1, wherein said SPM tip coated with a monolayer of ethylene glycol derivatives resists the adsorption of proteins.

4. The method of claim 1, further comprising the selective removal of oligo-ethylene glycol derivatives from the SPM tip, wherein said removal occurs at the tip apex.

5. The method claim 4, further comprising the addition of a molecule to the tip apex so as to provide for a single molecule atomic force microscope tip.

6. A chemically-modified SPM tip comprising:
    a) a silicon understructure; and
    b) a monolayer of oligo-ethylene glycol derivatives directly bonded to said silicon understructure.

7. The SPM tip of claim 6, comprising an apex.

8. The SPM tip of claim 7, further comprising a functional molecule anchored to the tip at the apex.

9. The SPM tip of claim 8, wherein the functional molecule comprises one or more functional moieties at defined locations of the molecule.

10. The SPM tip of claim 9, wherein the functional moieties are selected so as to have highly specific interactions with a sample at the level of single molecules.

11. The SPM tip of claim 9, wherein the functional moieties are selected such that they allow attachment of other suitable functional moieties.

12. A method comprising the steps of:
    a) providing a hydrogen-terminated silicon surface; and
    b) reacting said hydrogen-terminated silicon surface with oligo-ethylene glycol-terminated alkenes to yield a silicon surface comprising a bonded monolayer of oligo-ethylene glycol derivatives.

13. The method of claim 12, wherein it is the alkene that reacts with said hydrogen-terminated surface.

14. The method of claim 12, wherein the reaction between the hydrogen-terminated silicon surface and the oligo-ethylene glycol-terminated alkenes is thermally-induced.

15. The method of claim 12, wherein the reaction between the hydrogen-terminated silicon surface and the oligo-ethylene glycol-terminated alkenes is photolytically-induced.

16. The method of claim 15, wherein the photolytically-induced reaction between the hydrogen-terminated silicon surface and the oligo-ethylene glycol-terminated alkenes is patternable using a photomask.

17. The method of claim 12, wherein the reaction between the hydrogen-terminated silicon surface and the oligo-ethylene glycol-terminated alkenes comprises a silicon-carbon bond between the silicon surface and the bonded monolayer of oligo-ethylene glycol derivatives.

18. The method of claim 12, wherein the oligo-ethylene glycol-terminated alkenes comprise a formula, $CH_2=CH(CH_2)_{m1}(CF_2)_{m2}(OCH_2CH_2)_n$ OR, wherein m1>0, m2≧0, n≧3, and R is selected from the group consisting of $CH_3$, amide, ester, thiolate, disulfide, protected amino, hydroxy, thiol groups, and combinations thereof.

19. The method of claim 12, wherein the silicon surface is selected from the group consisting of a crystalline surface, a polycrystalline surface, a porous surface, and combinations thereof.

20. The method of claim 12, wherein the silicon surface is an SPM tip.

* * * * *